United States Patent
Kim et al.

(10) Patent No.: US 12,084,862 B2
(45) Date of Patent: Sep. 10, 2024

(54) LENGTH-DETERMINED STANDARDIZED REINFORCING BAR INTEGRATED WITH BUTT JOINT DEVICE, AND METHOD FOR CONSTRUCTING REINFORCING BAR STRUCTURE BY USING SAME

(71) Applicants: Yongkeun Kim, Incheon (KR); Taekyung Kim, Hwaseong-si (KR)

(72) Inventors: Yongkeun Kim, Incheon (KR); Taekyung Kim, Hwaseong-si (KR)

(73) Assignee: Yongkeun Kim, Incheon (KR)

( * ) Notice: Subject to any disclaimer, the term of this patent is extended or adjusted under 35 U.S.C. 154(b) by 0 days.

(21) Appl. No.: 18/279,845

(22) PCT Filed: Feb. 7, 2022

(86) PCT No.: PCT/KR2022/001843
§ 371 (c)(1),
(2) Date: Aug. 31, 2023

(87) PCT Pub. No.: WO2022/191442
PCT Pub. Date: Sep. 15, 2022

(65) Prior Publication Data
US 2024/0044138 A1 Feb. 8, 2024

(30) Foreign Application Priority Data

Mar. 11, 2021 (KR) .......................... 10-2021-0032135

(51) Int. Cl.
*E04C 5/01* (2006.01)
*E04C 5/16* (2006.01)

(52) U.S. Cl.
CPC ................ *E04C 5/01* (2013.01); *E04C 5/162* (2013.01)

(58) Field of Classification Search
CPC . E04C 5/01; E04C 5/162; E04C 5/163; E04C 5/125; B21H 3/02; F16B 7/182; F16L 15/002
See application file for complete search history.

(56) References Cited

U.S. PATENT DOCUMENTS 2,045,520 A * 6/1936 Davison ................ E21B 17/042
403/41
5,729,952 A * 3/1998 Dahl ....................... E04C 5/165
29/445

(Continued)

FOREIGN PATENT DOCUMENTS

| JP | 4427063 B2 | 3/2010 |
| JP | 2011-102488 A | 5/2011 |

(Continued)

OTHER PUBLICATIONS

International Search Report for PCT/KR2022/001843 mailed May 4, 2022 from Korean Intellectual Property Office.

*Primary Examiner* — Gisele D Ford
(74) *Attorney, Agent, or Firm* — Revolution IP, PLLC

(57) ABSTRACT

Disclosed are a length-determined standardized reinforcing bar integrated with a butt joint device, and a method of constructing a reinforcing bar structure by using the same, wherein after determining a material and a diameter of a reinforcing bar, a determined standardized length measurement, which is a length standard from one end to the other end, is determined and imparted to a reinforcing bar to be cut, and the reinforcing bar is cut to a determined standardized length in accordance with the imparted length measurement, and once the type of a butt joint device for butt-jointing the reinforcing bar cut to the determined standardized length is determined, the butt joint device is (Continued)

formed at, and integrated with, one end or both ends of the reinforcing bar cut to the standardized length by the determined standardized length.

5 Claims, 35 Drawing Sheets

(56) References Cited

U.S. PATENT DOCUMENTS

| | | | | |
|---|---|---|---|---|
| 6,688,071 | B1* | 2/2004 | Evers | E21D 21/0026 403/307 |
| 8,919,387 | B2* | 12/2014 | Martin | E21B 17/042 285/333 |
| 2003/0198513 | A1* | 10/2003 | Wang | B21K 1/70 403/362 |
| 2010/0171306 | A1 | 7/2010 | Gillot et al. | |
| 2015/0037090 | A1 | 2/2015 | Fukuda | |
| 2016/0177992 | A1* | 6/2016 | Lin | F16B 7/182 403/343 |
| 2019/0177976 | A1 | 6/2019 | Wakiyama et al. | |
| 2021/0254413 | A1* | 8/2021 | Campbell | F16L 15/06 |
| 2022/0260186 | A1* | 8/2022 | Foulogne | E21B 17/0423 |

FOREIGN PATENT DOCUMENTS

| | | |
|---|---|---|
| JP | 6373467 B1 | 8/2018 |
| KR | 10-1378723 B1 | 3/2014 |
| KR | 10-1541243 B1 | 8/2015 |
| KR | 10-2019-0064240 A | 6/2019 |
| KR | 10-2192741 B1 | 12/2020 |

* cited by examiner

[Figure 1]
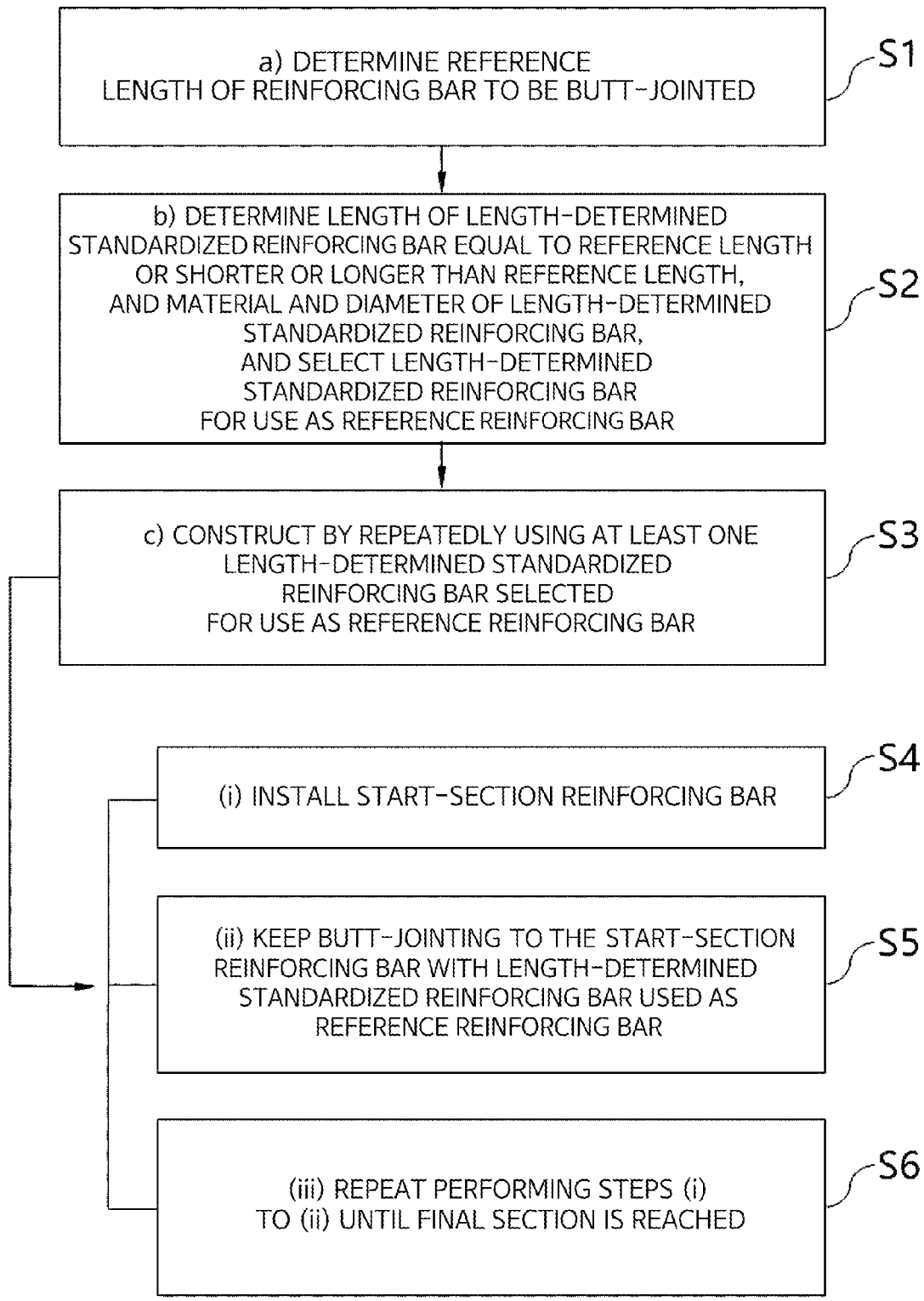

【Figure 2】
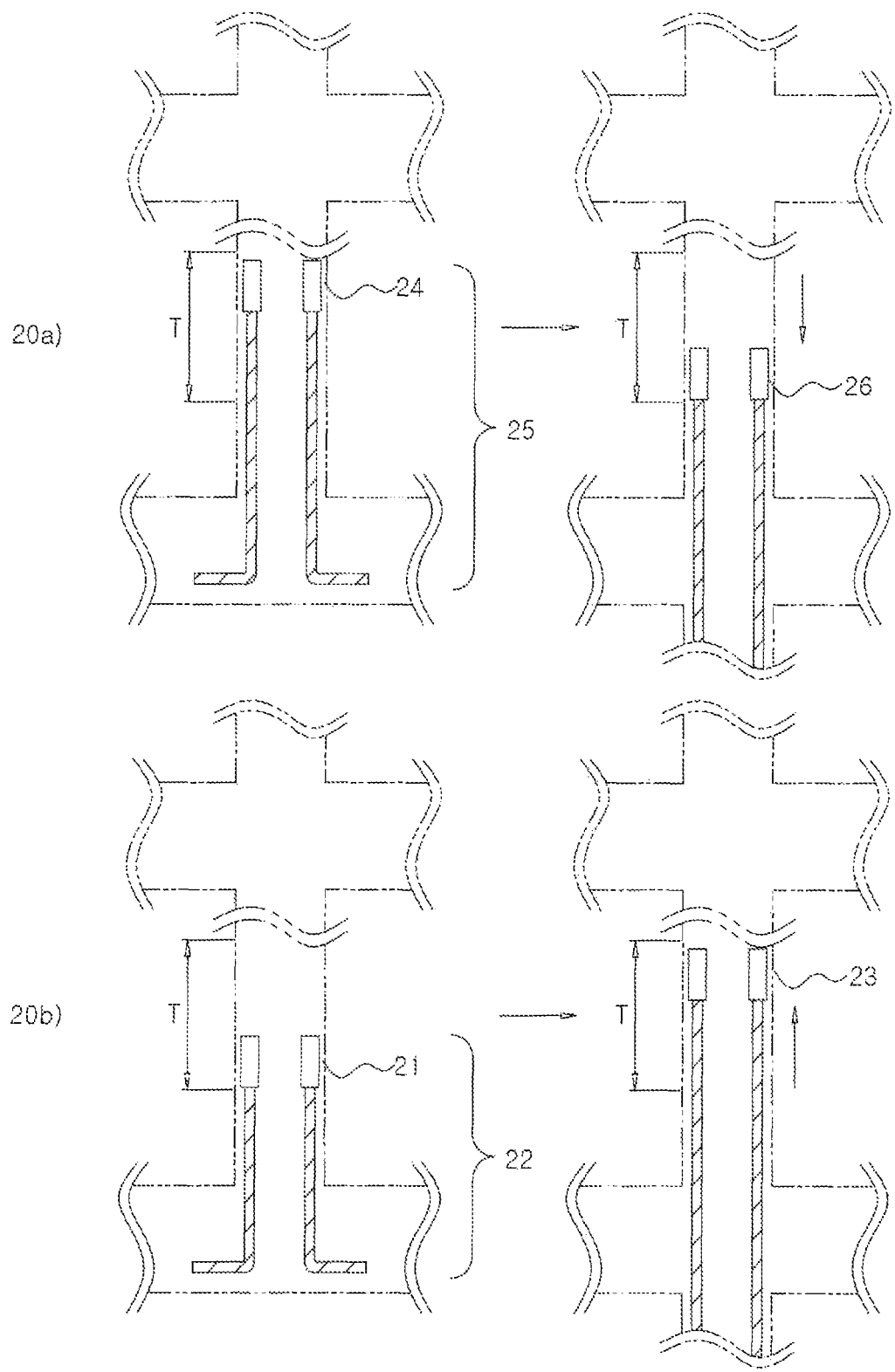

[Figure 3]
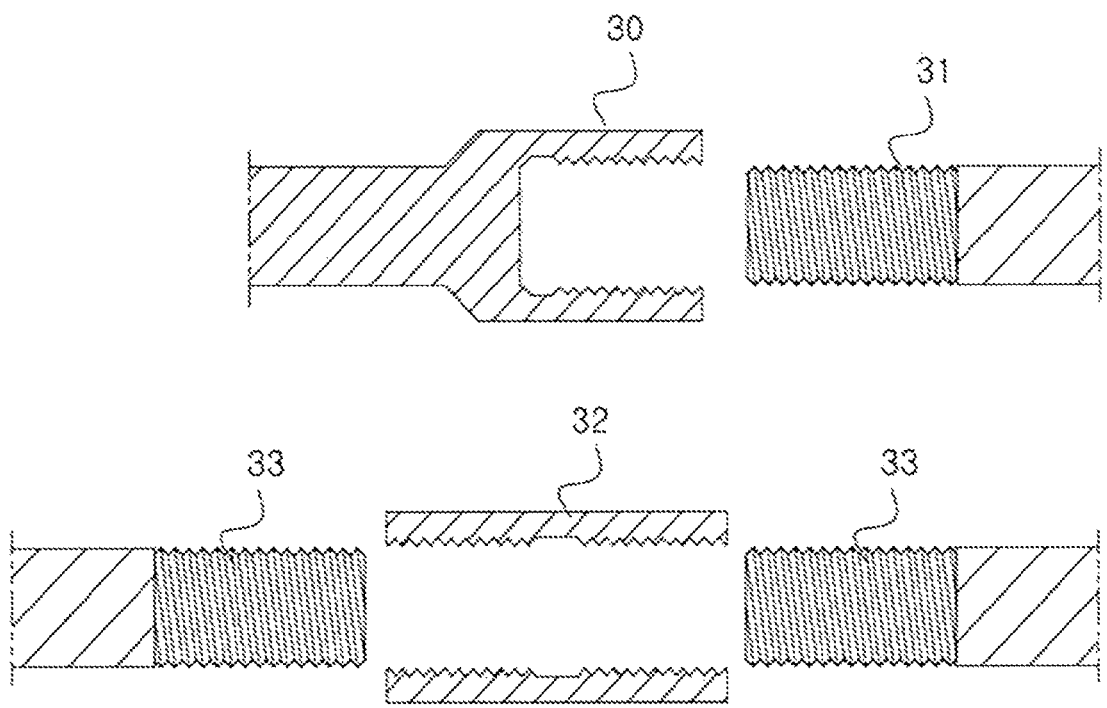

[Figure 4]
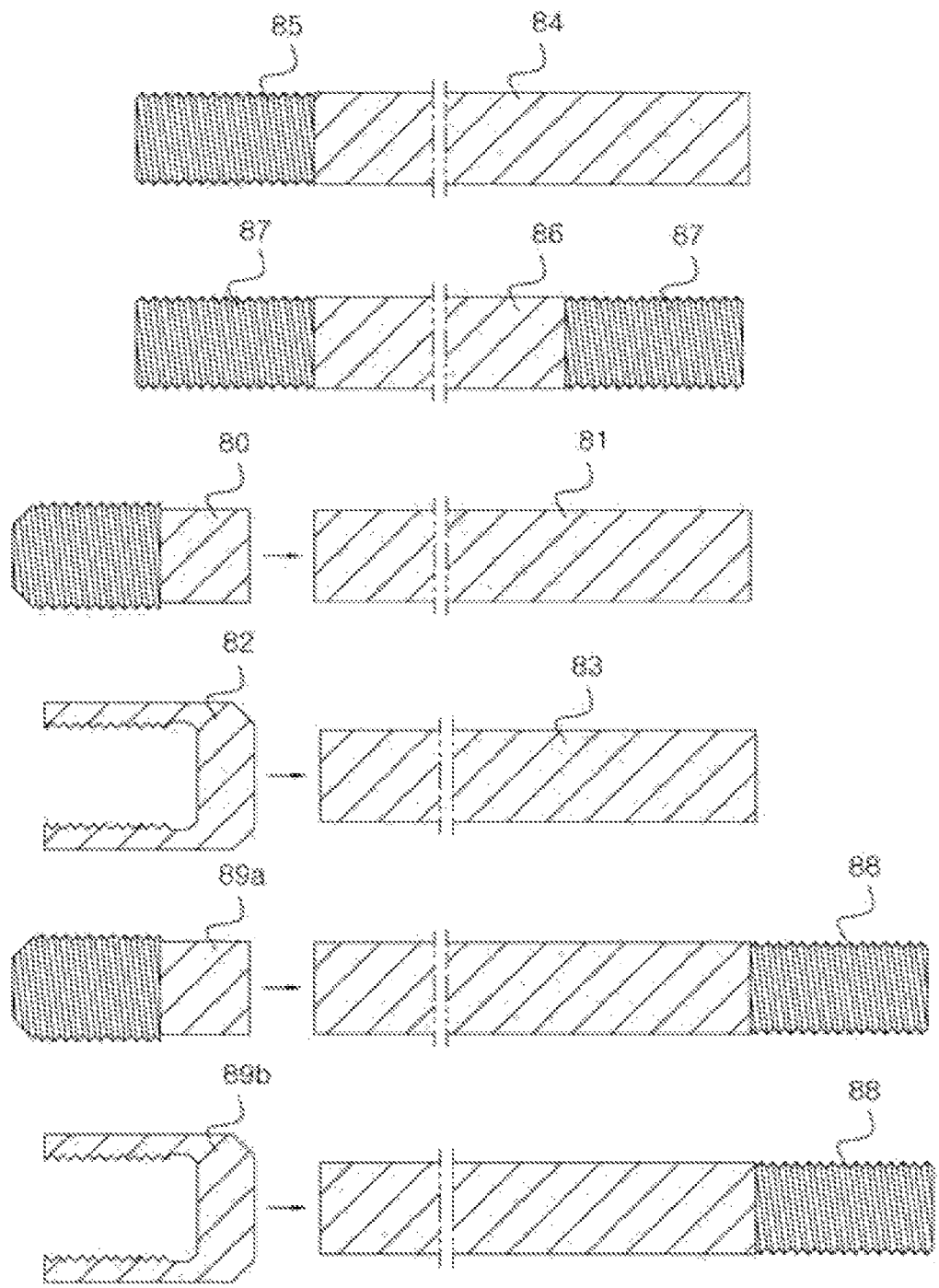

【Figure 5】
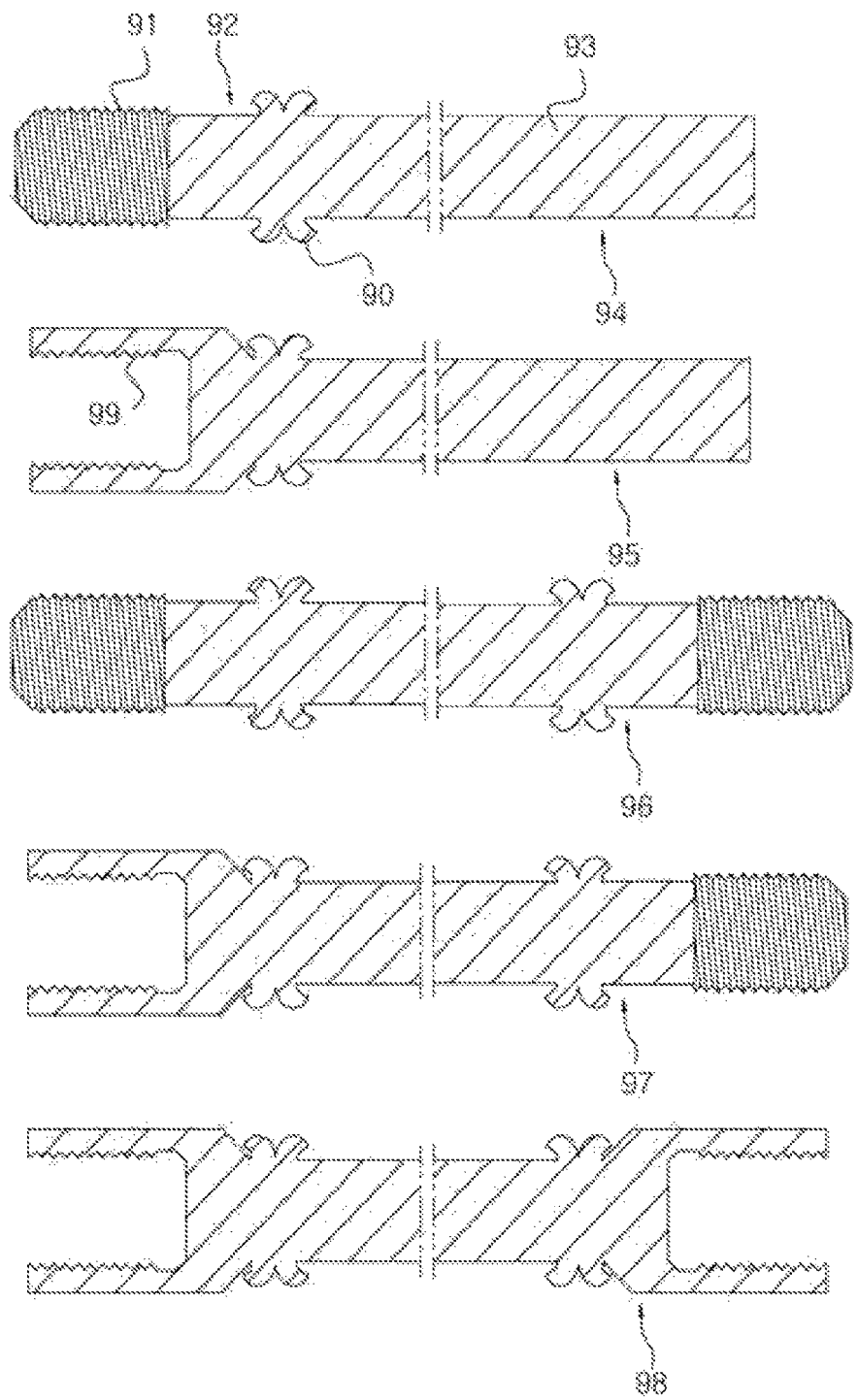

[Figure 6]
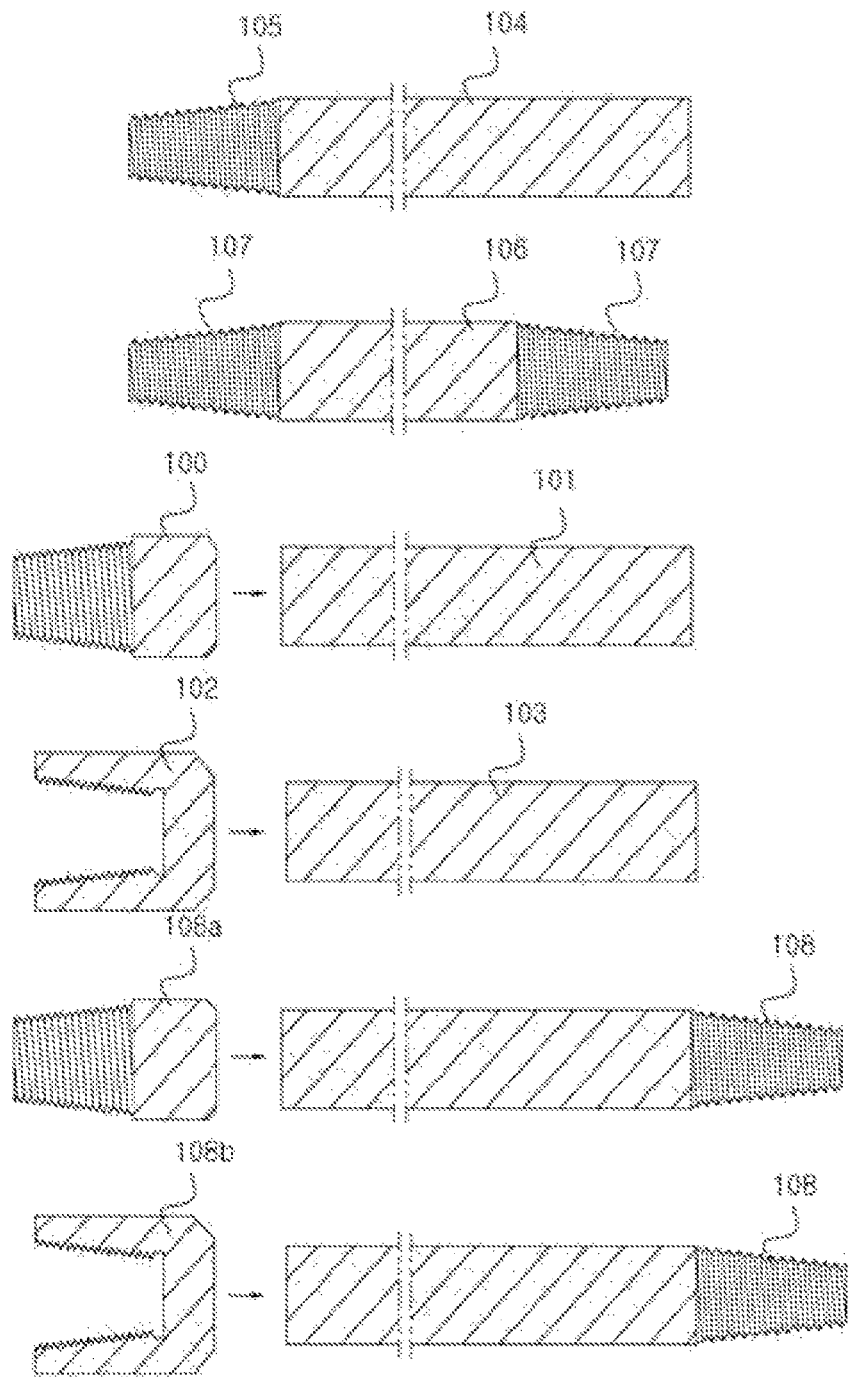

【Figure 7】
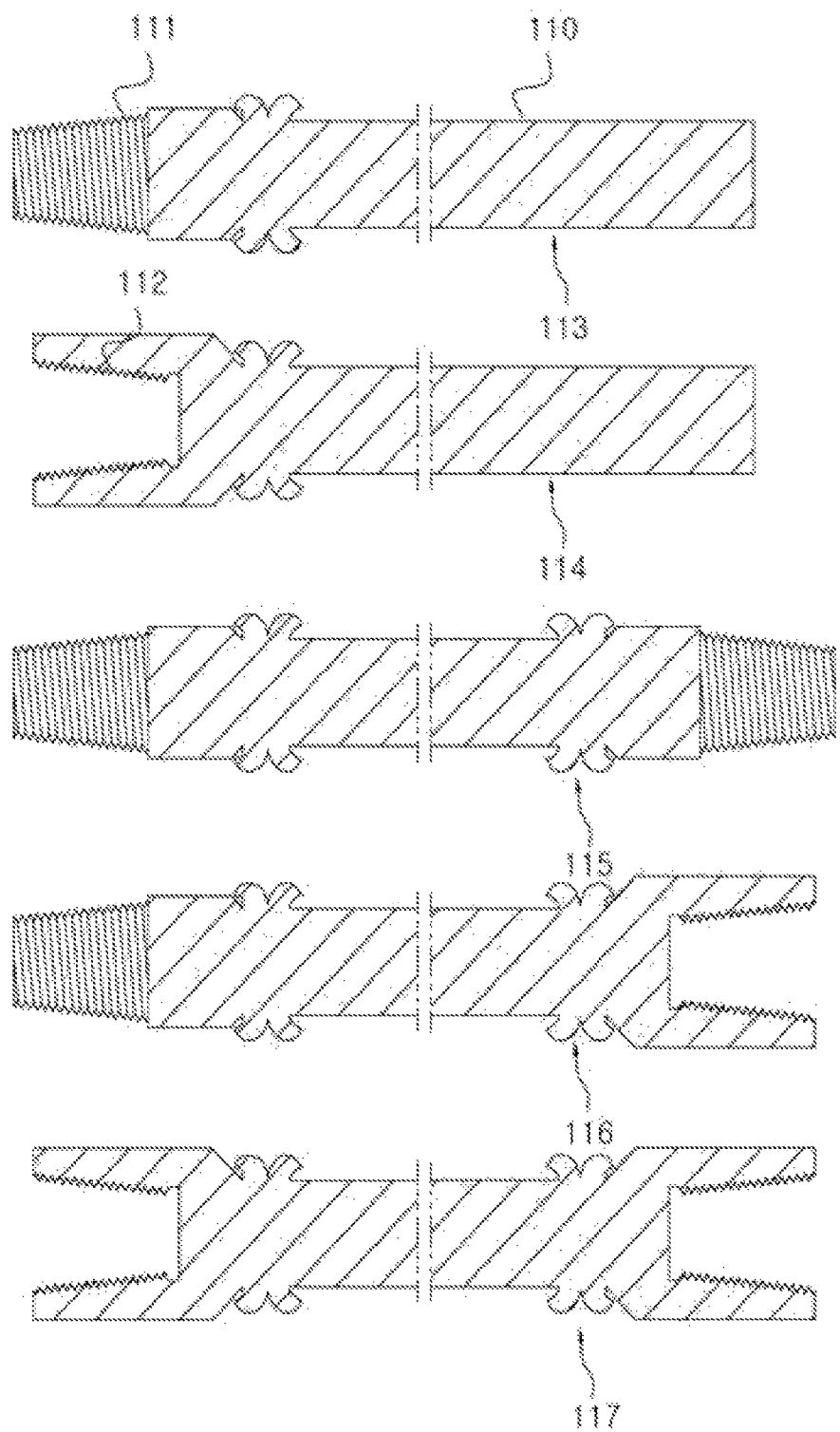

[Figure 8]
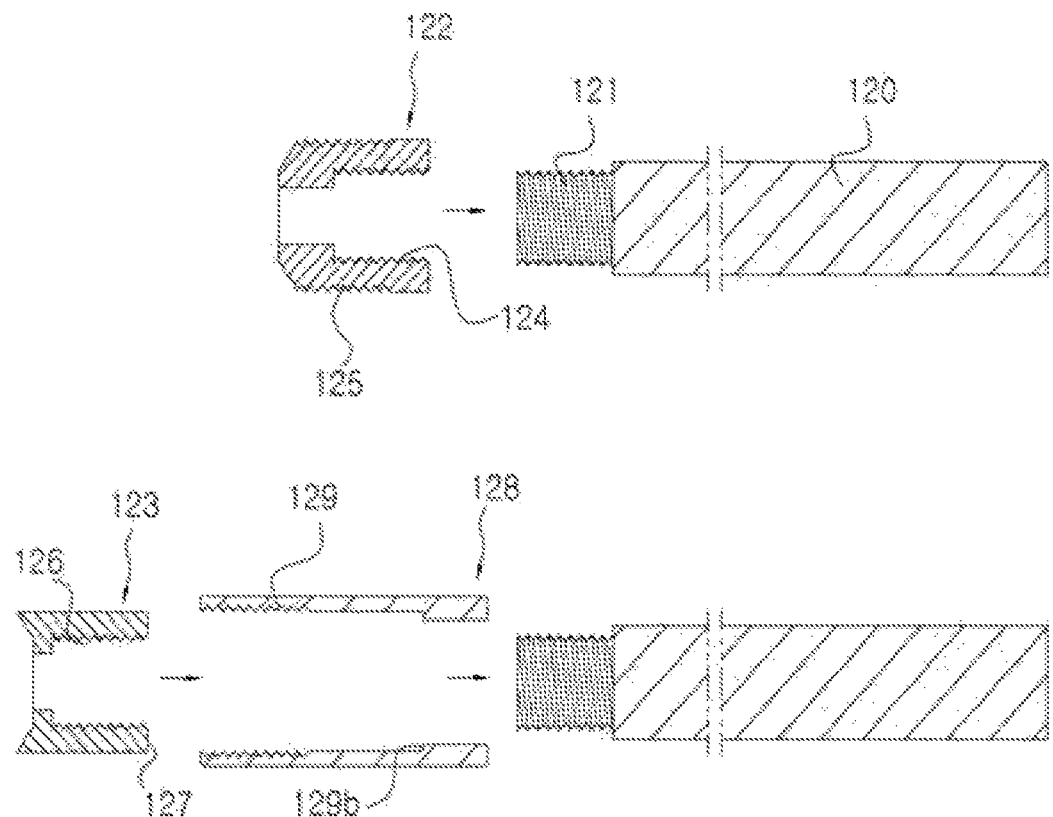

【Figure 9】
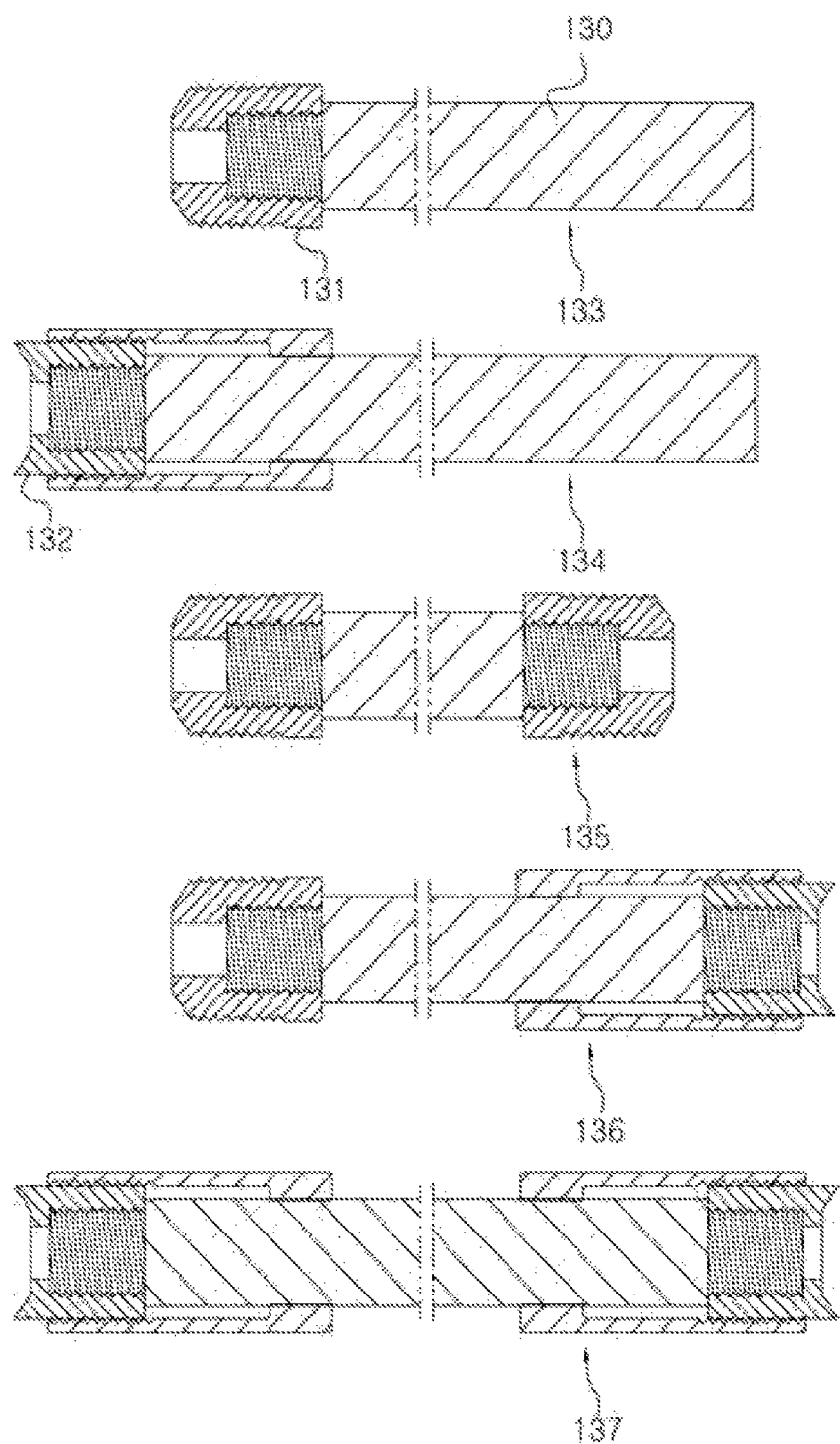

【Figure 10】
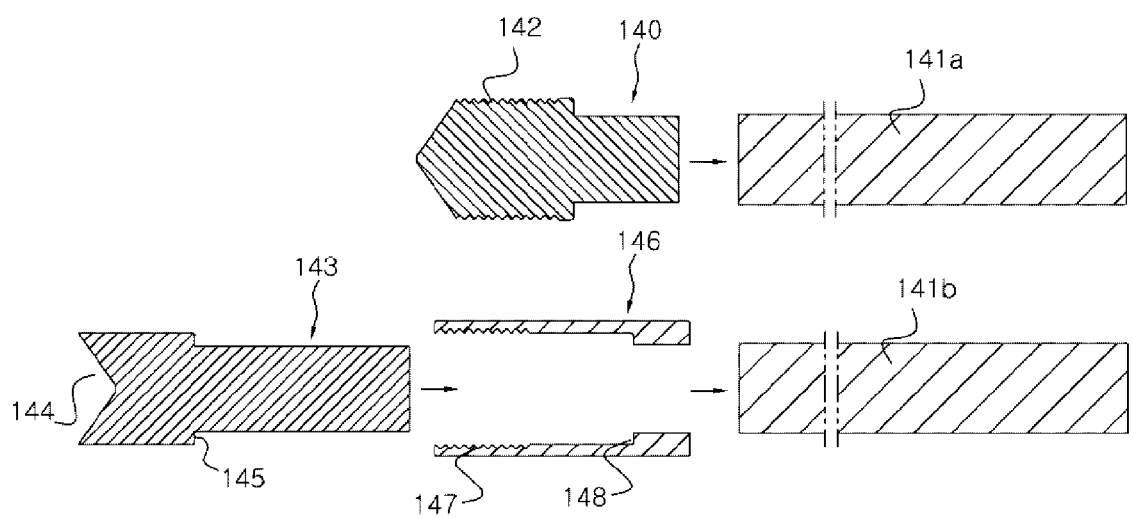

【Figure 11】
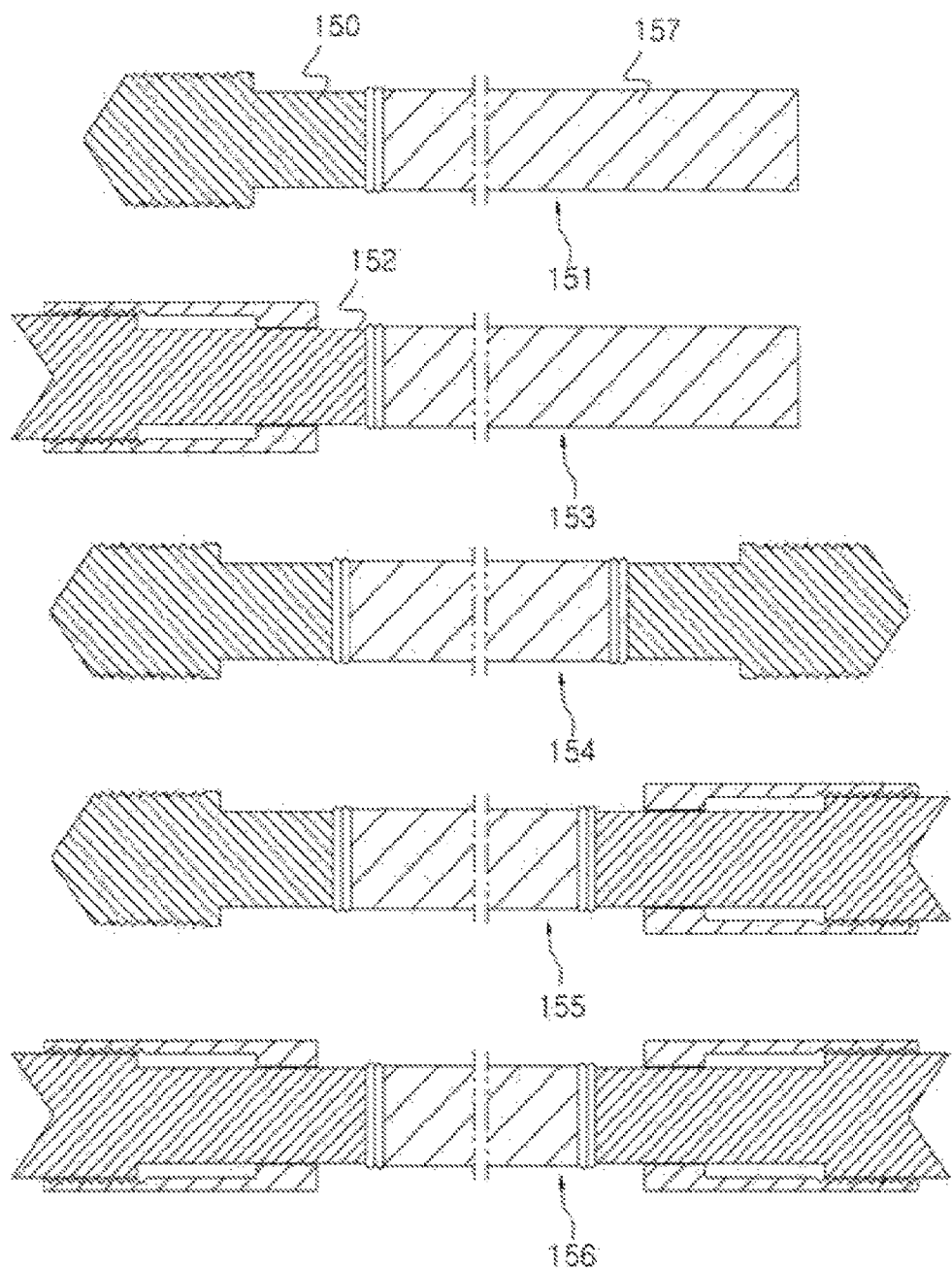

[Figure 12]
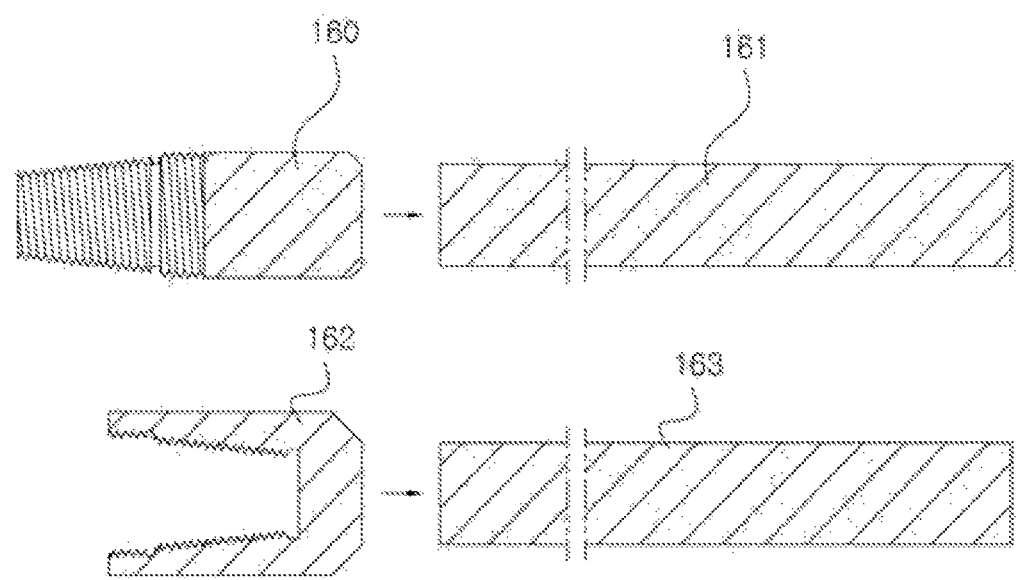

【Figure 13】
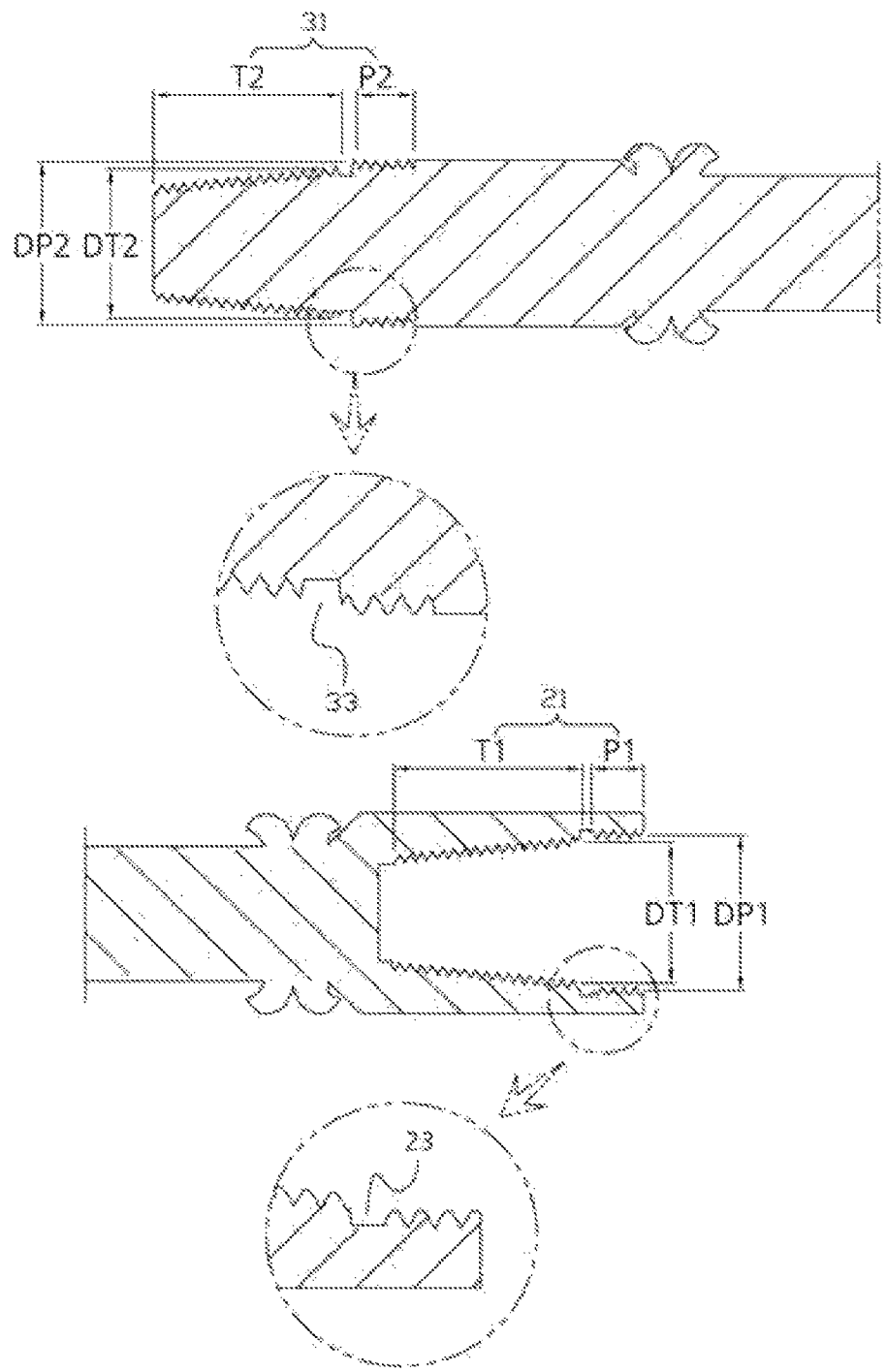

【Figure 14】
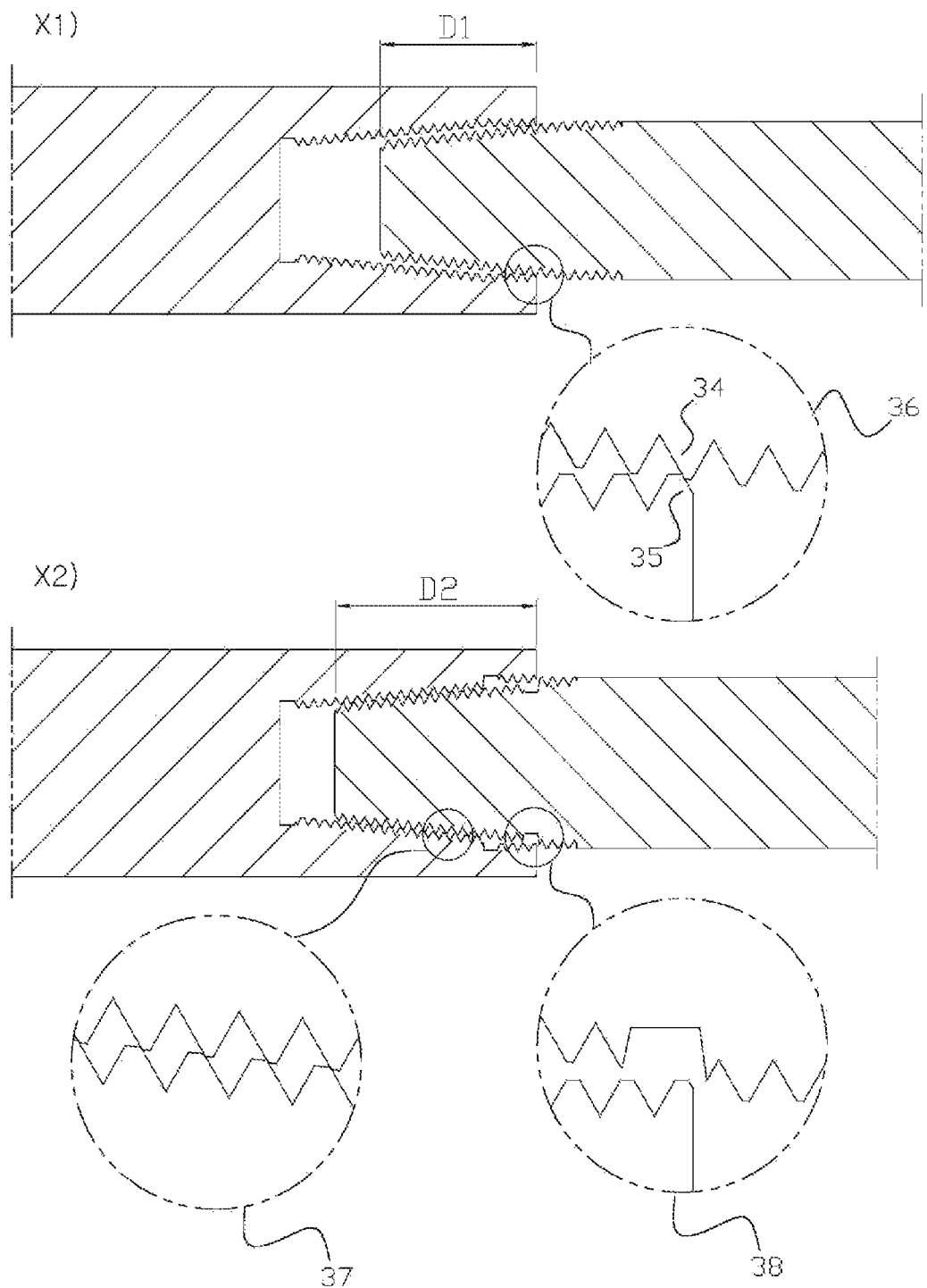

[Figure 15]
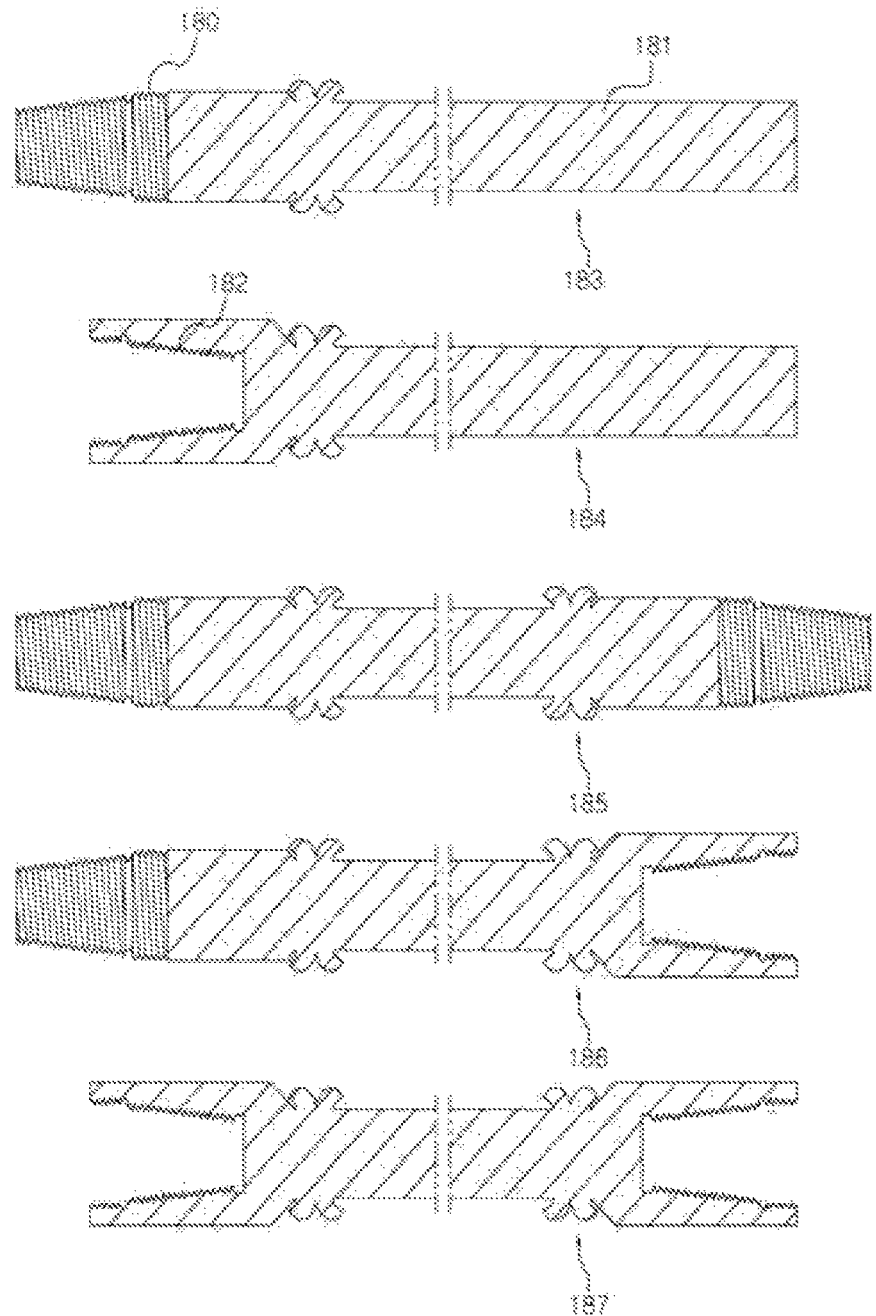

【Figure 16】
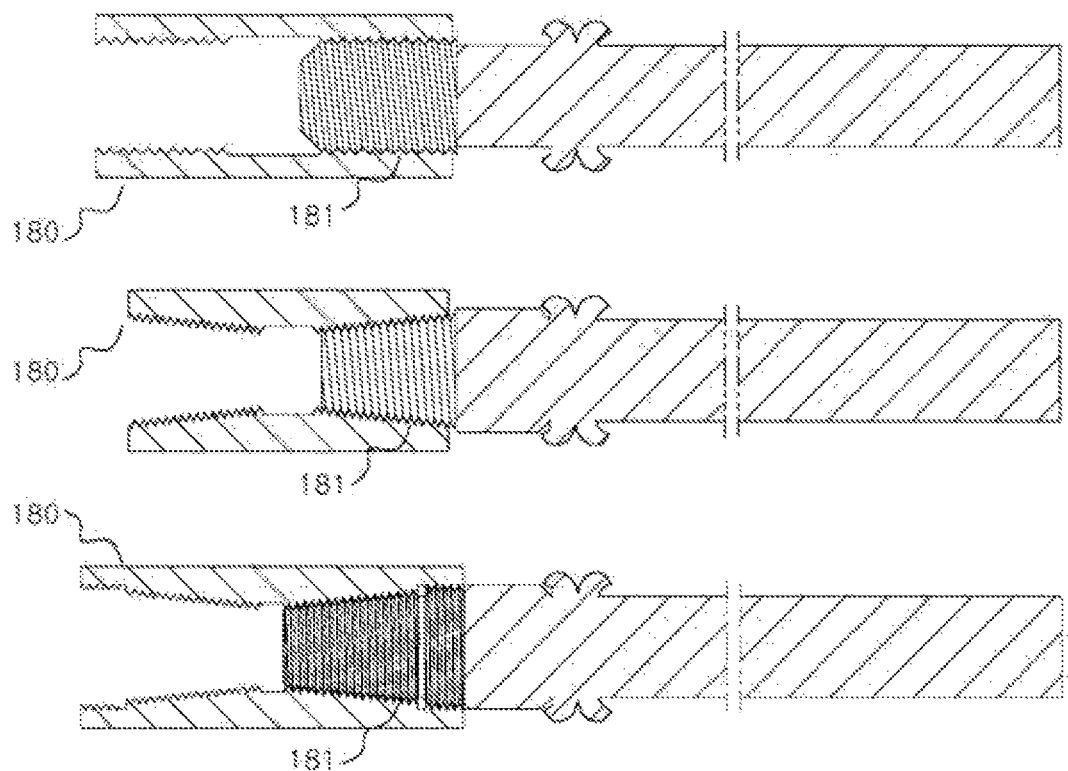

[Figure 17]
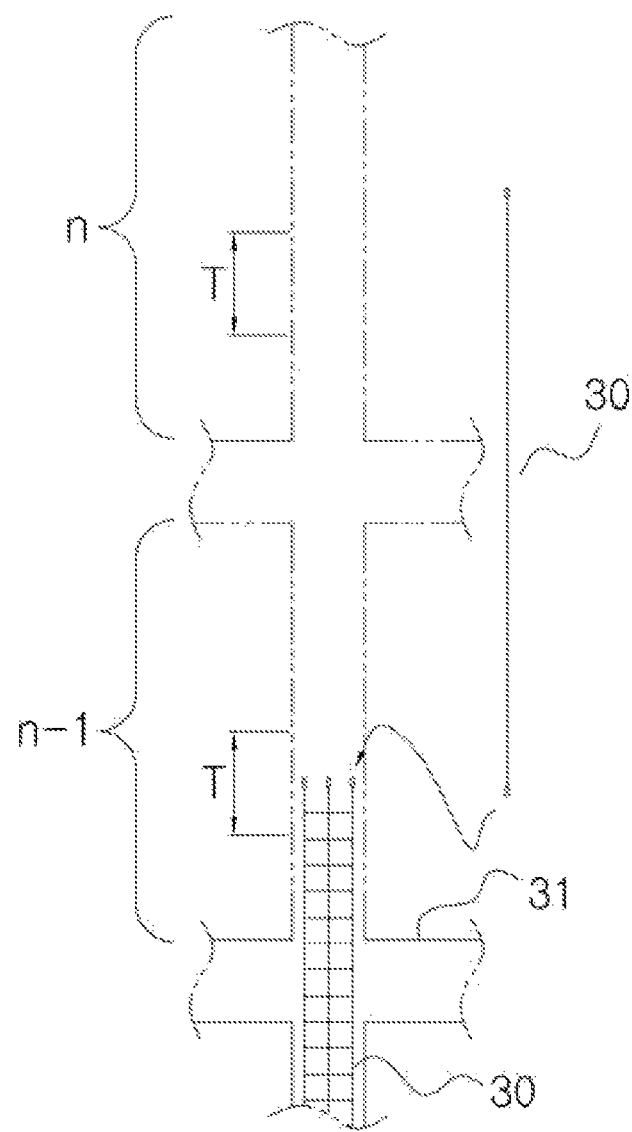

[Figure 18]
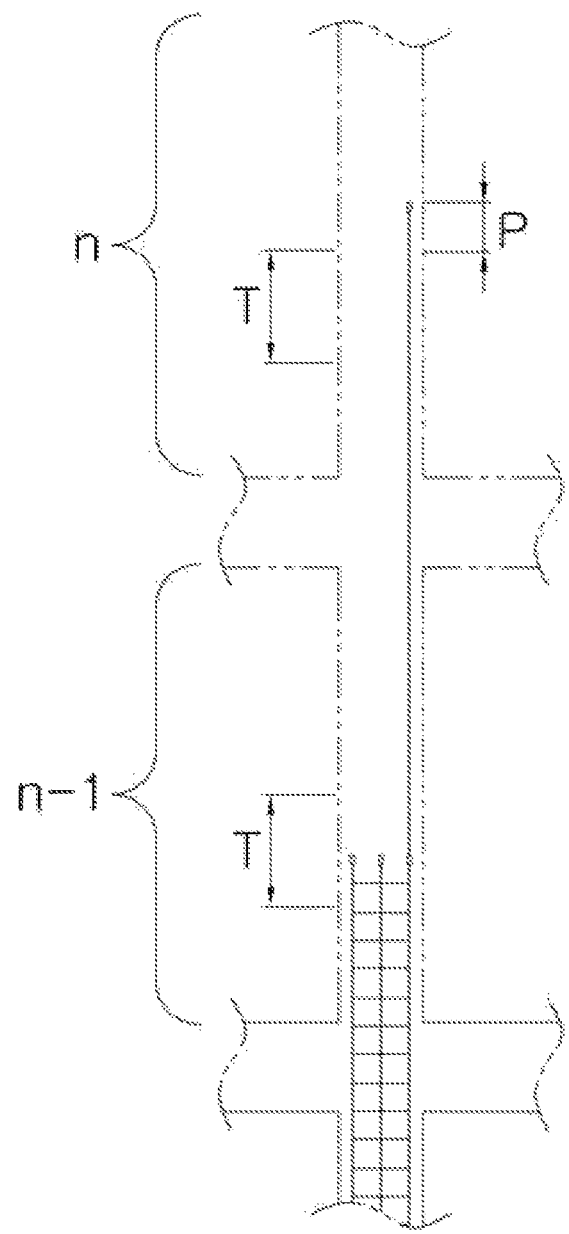

【Figure 19】
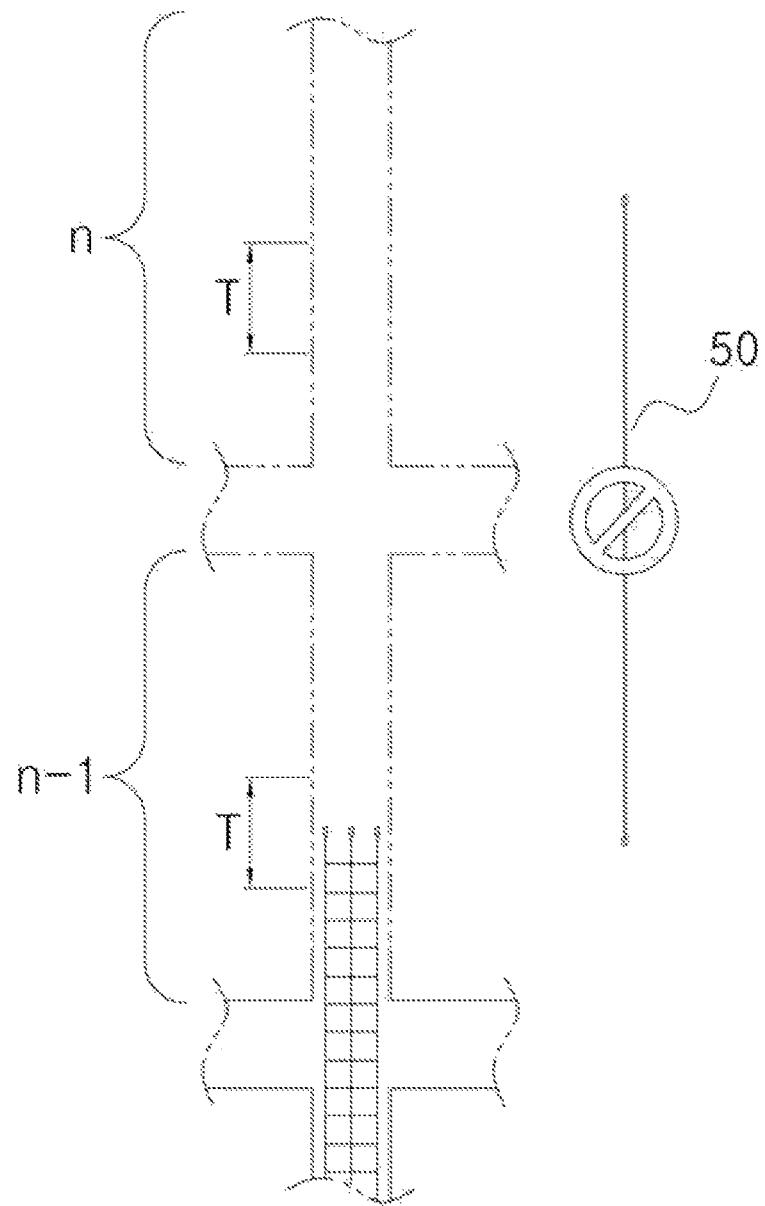

【Figure 20】
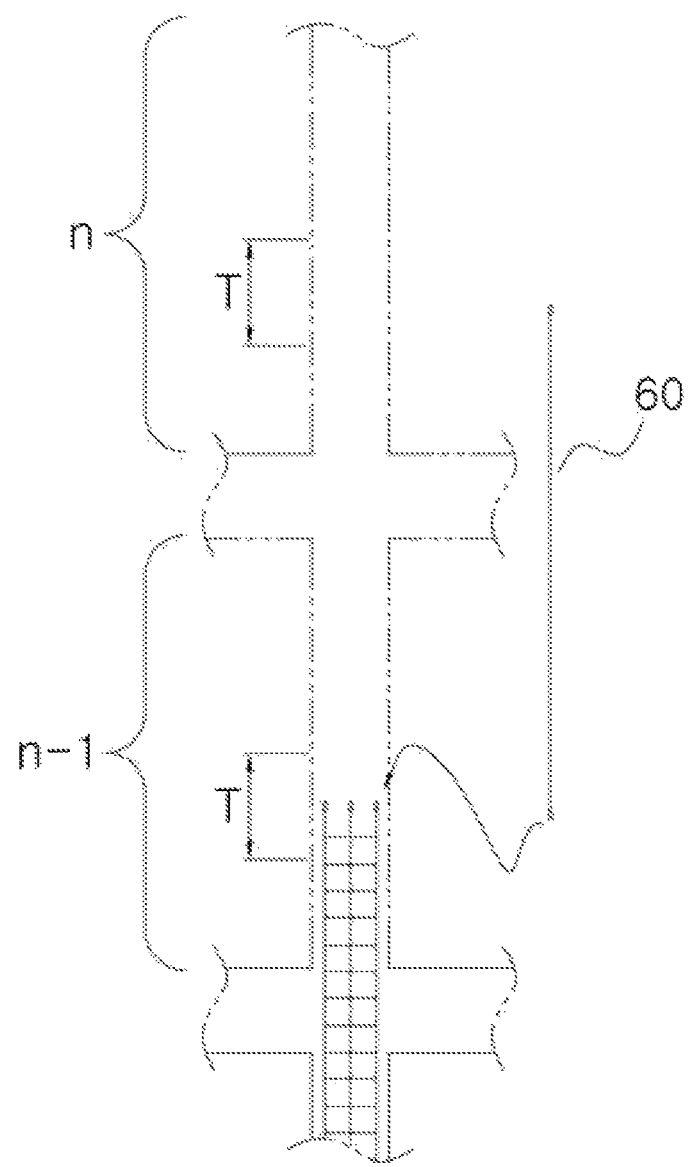

【Figure 21】
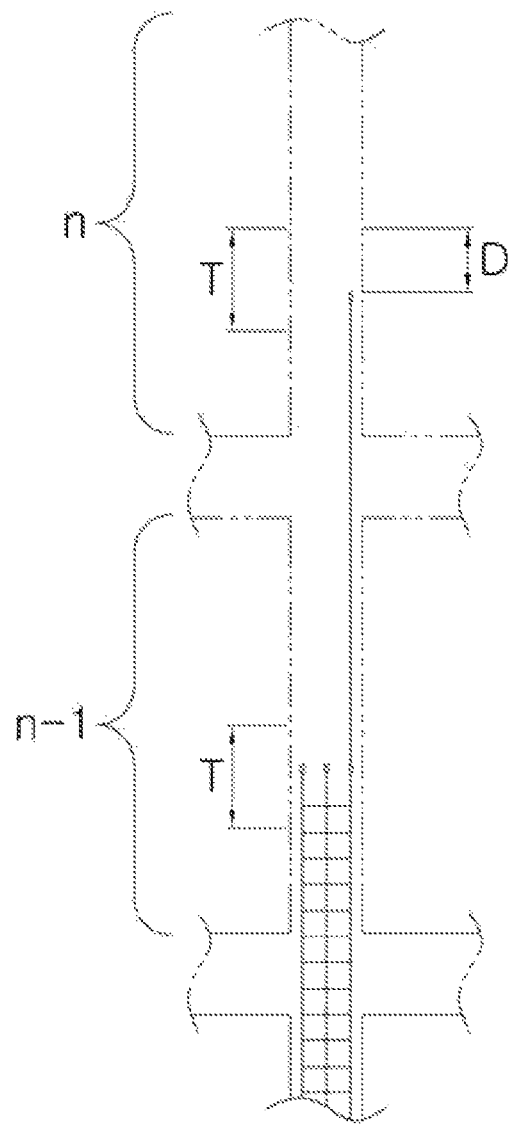

【Figure 22】
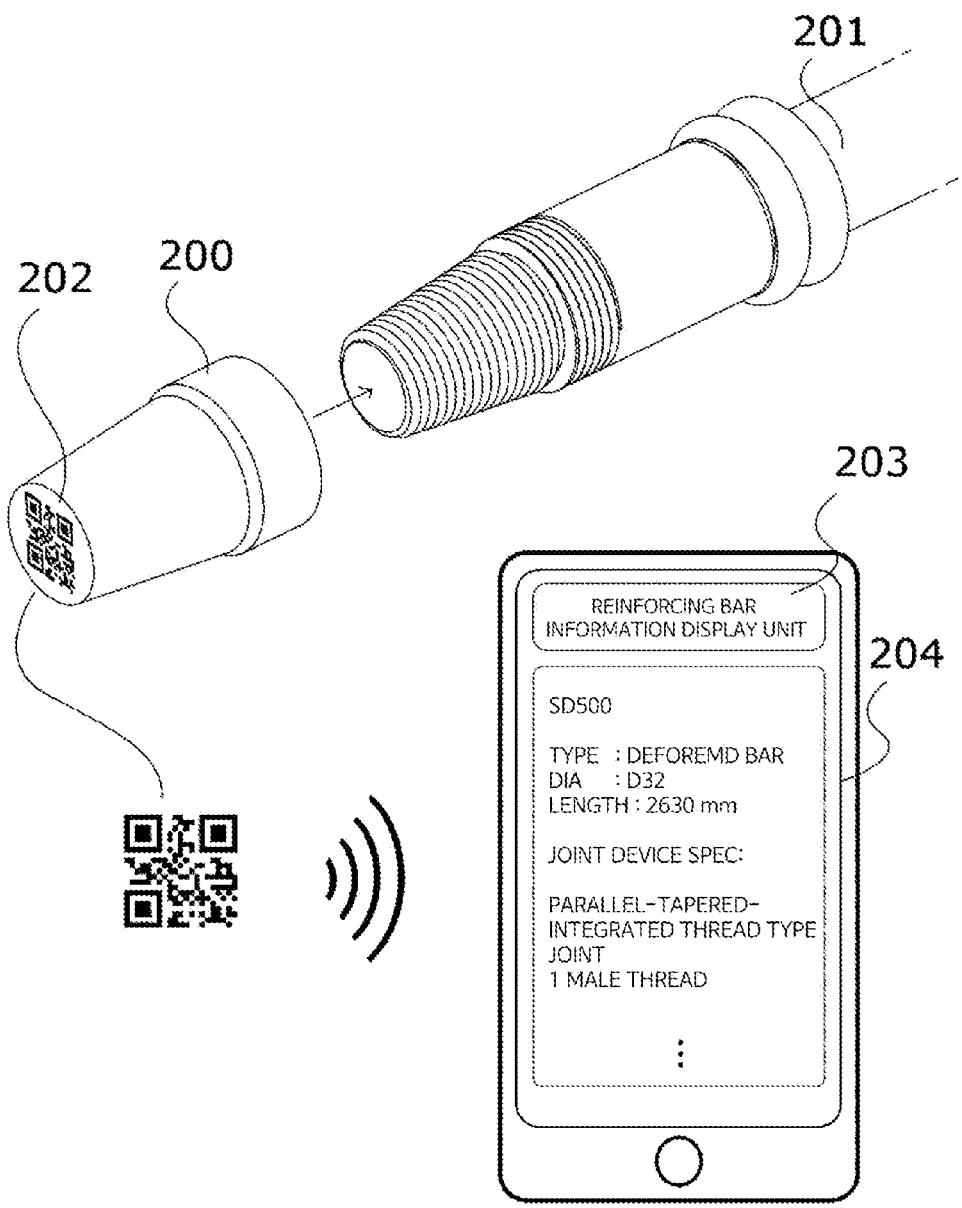

[Figure 23]
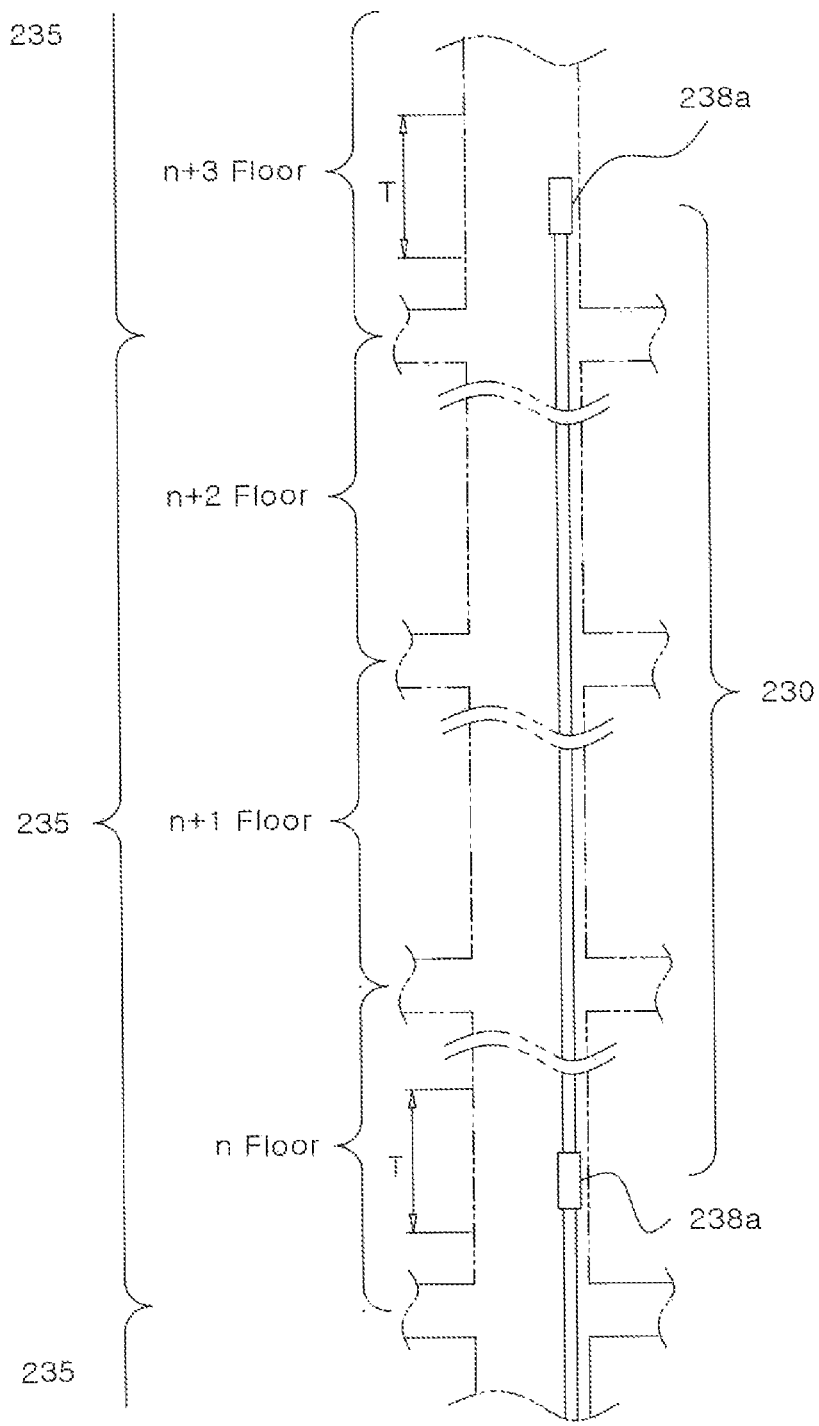

[Figure 24]
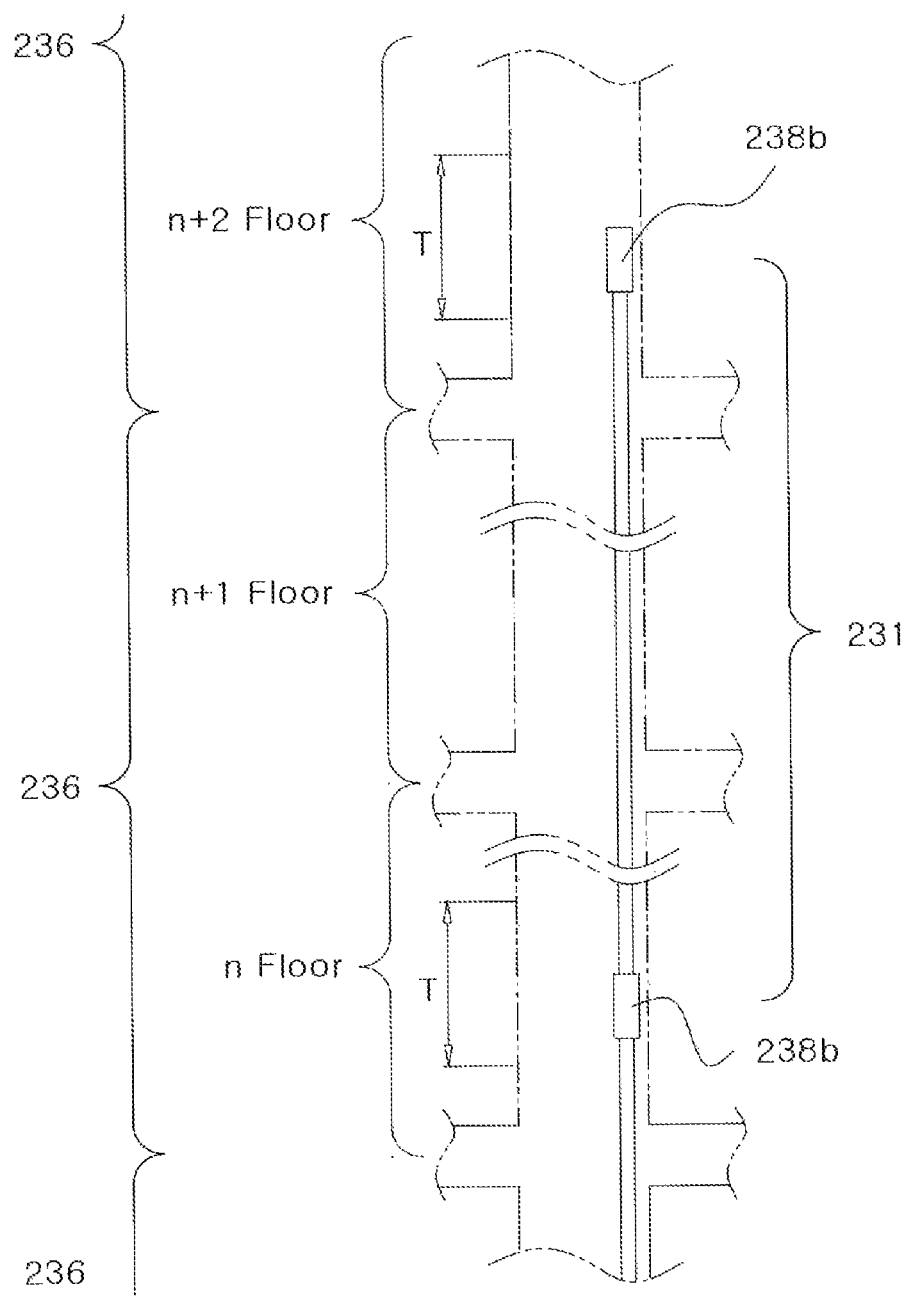

[Figure 25]
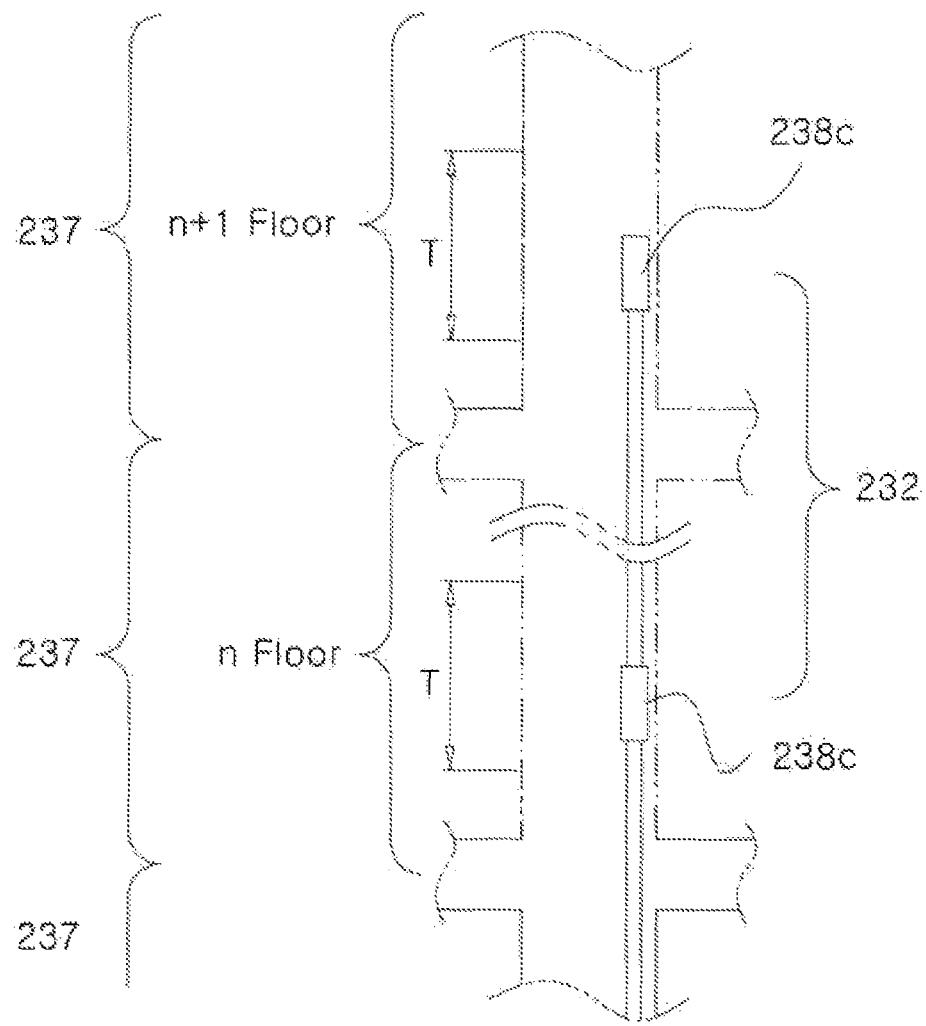

【Figure 26】
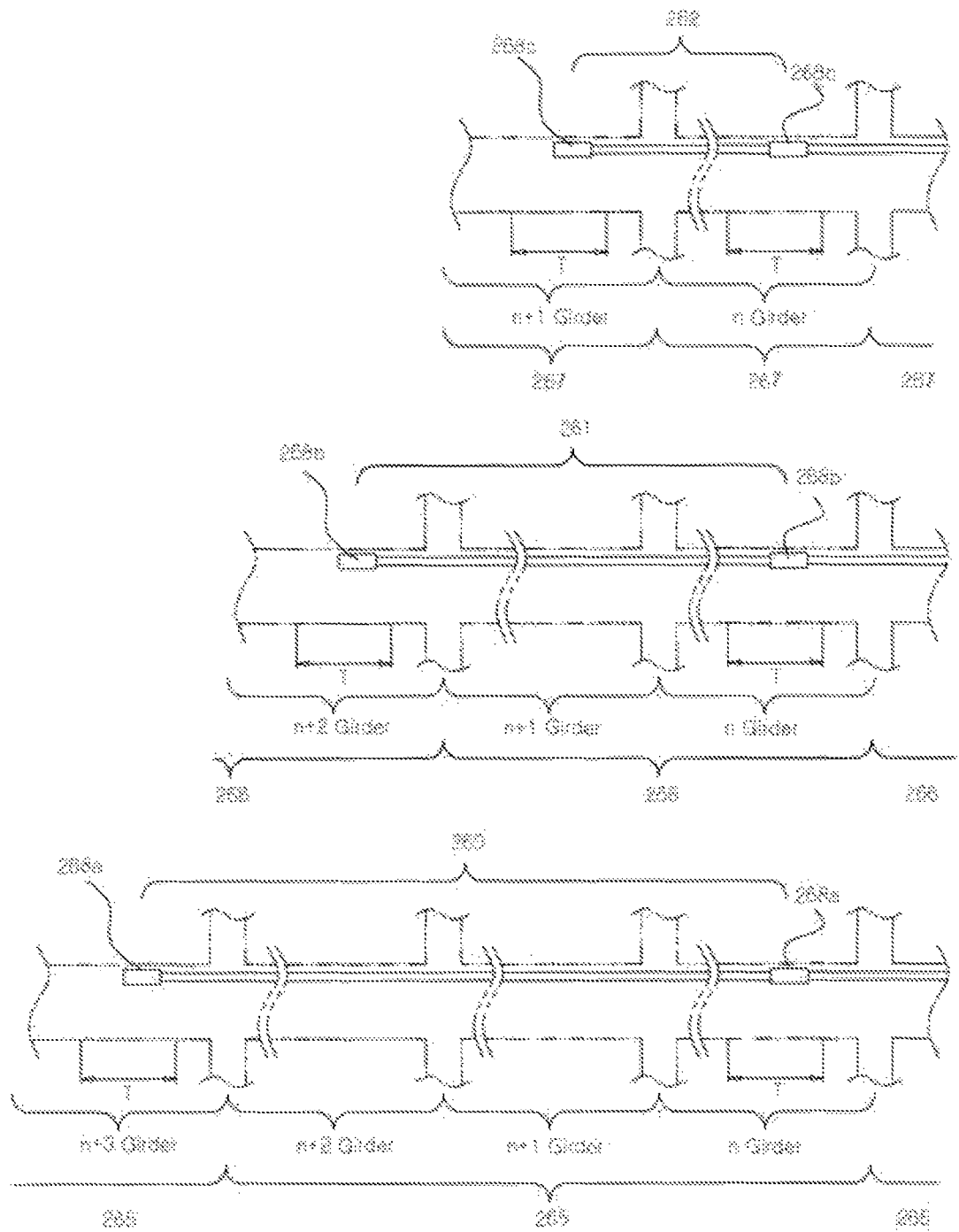

【Figure 27】
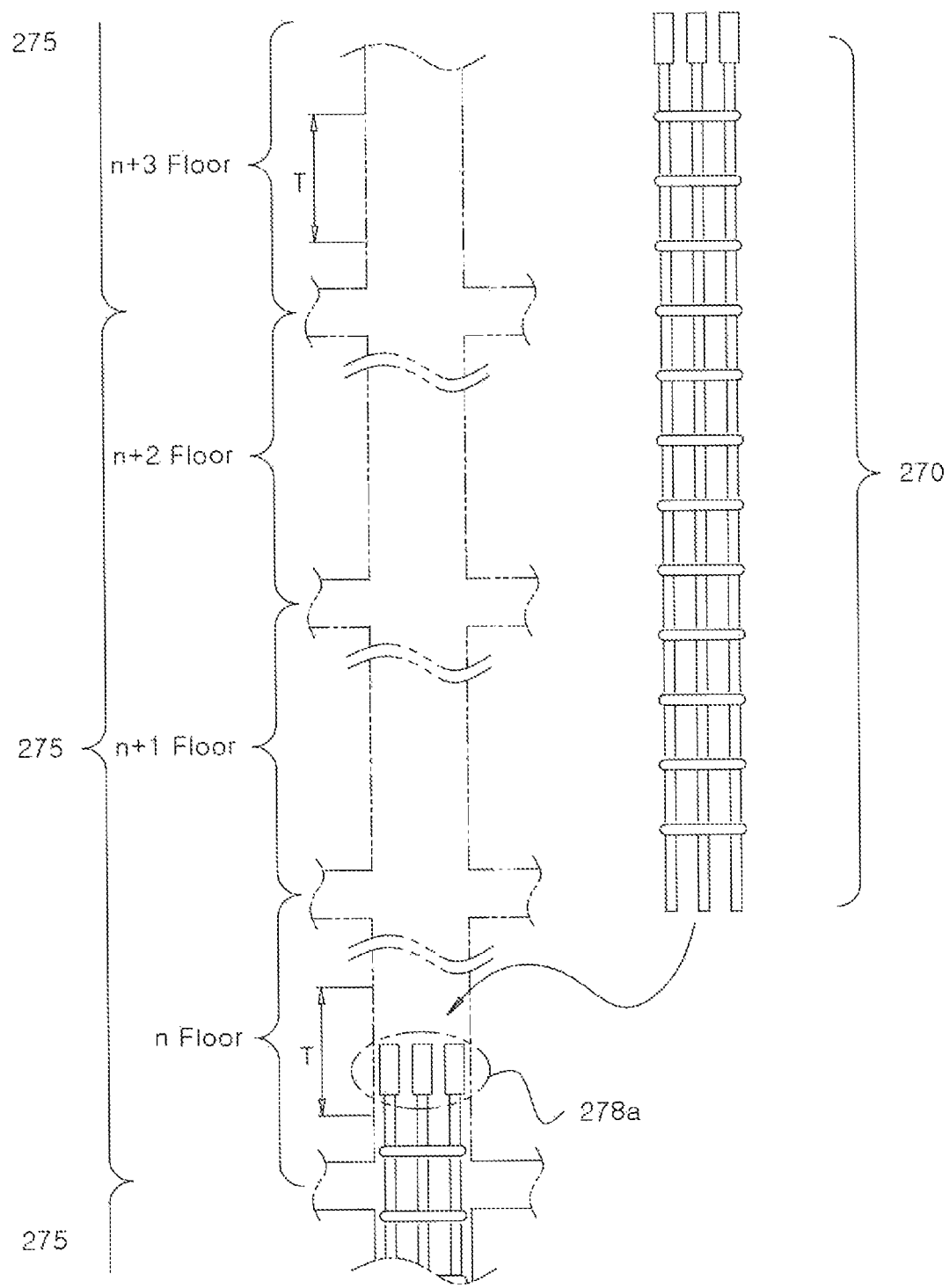

[Figure 28]
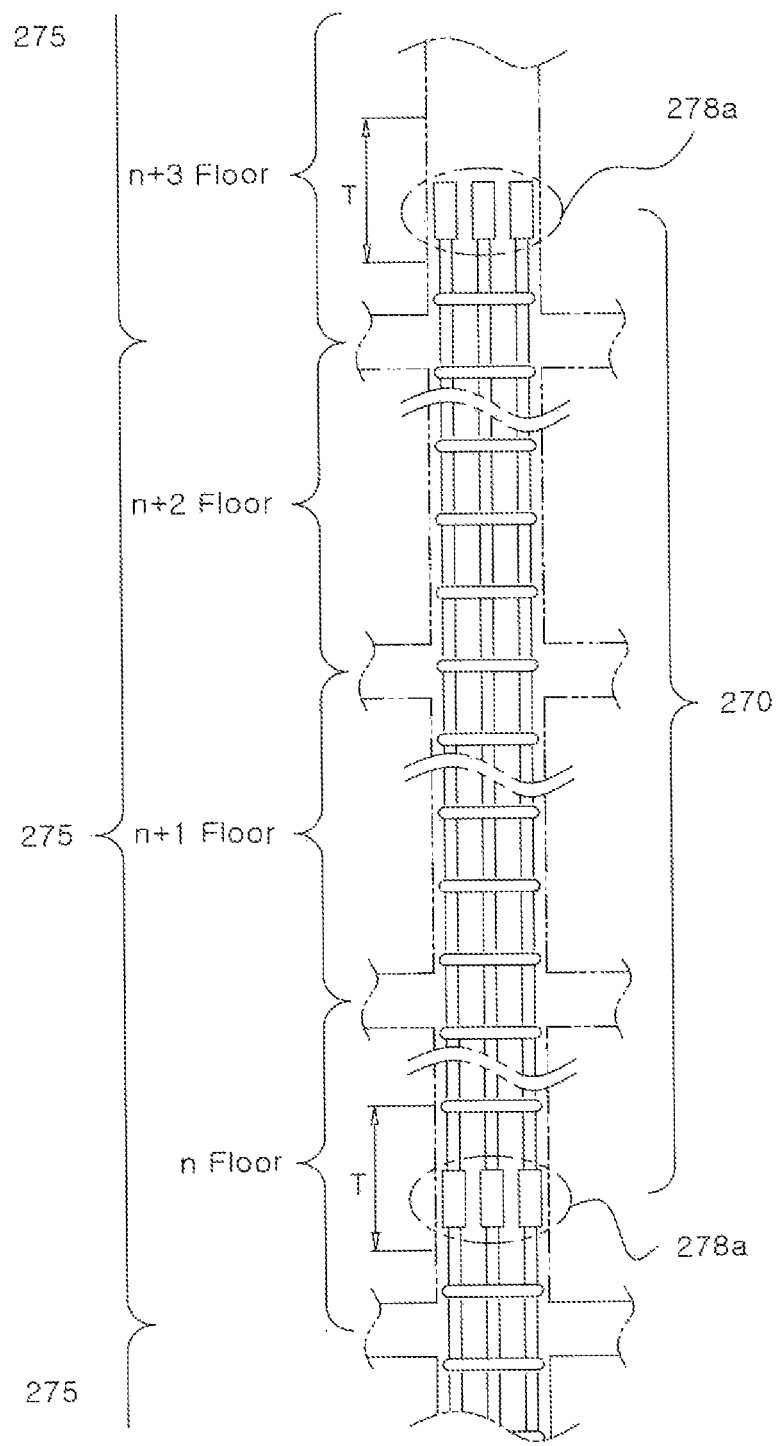

[Figure 29]
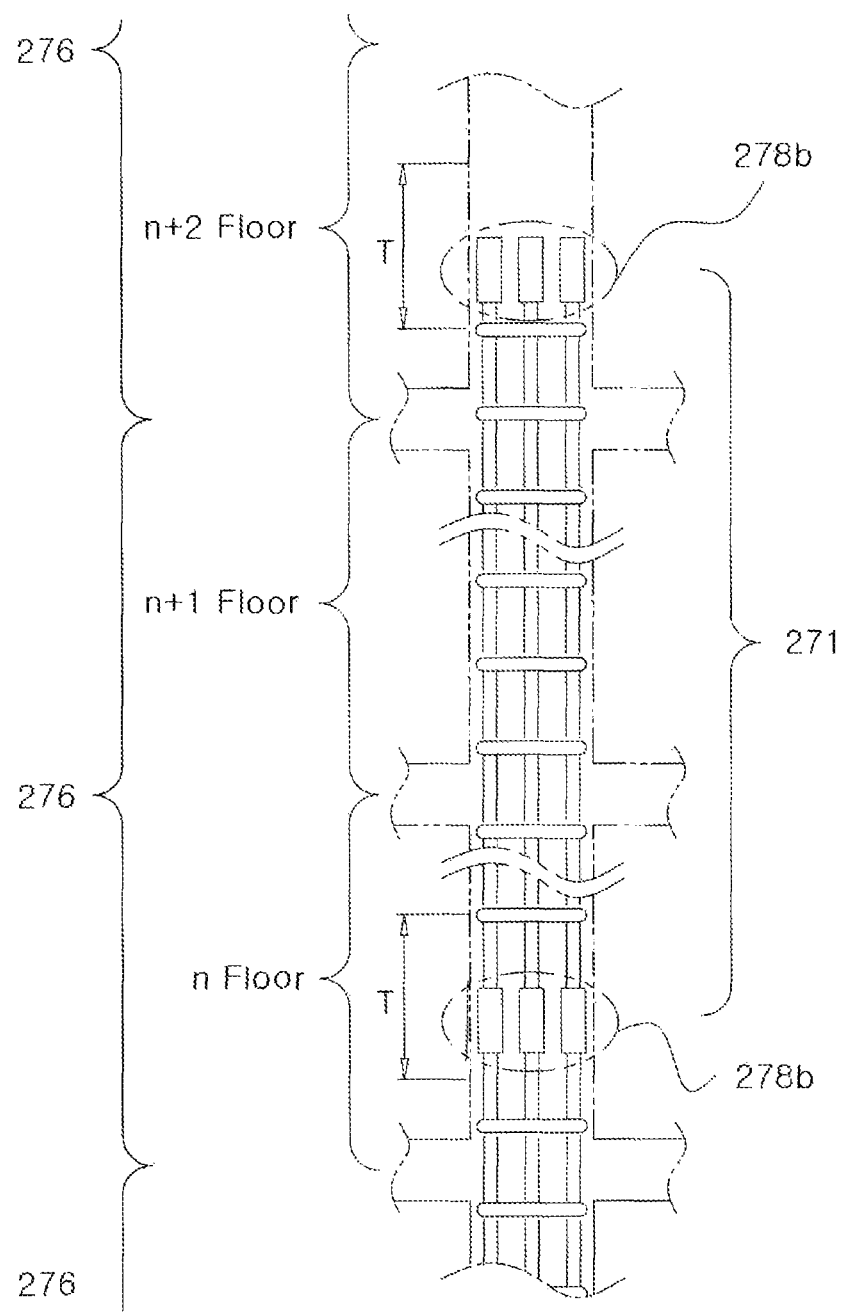

【Figure 30】
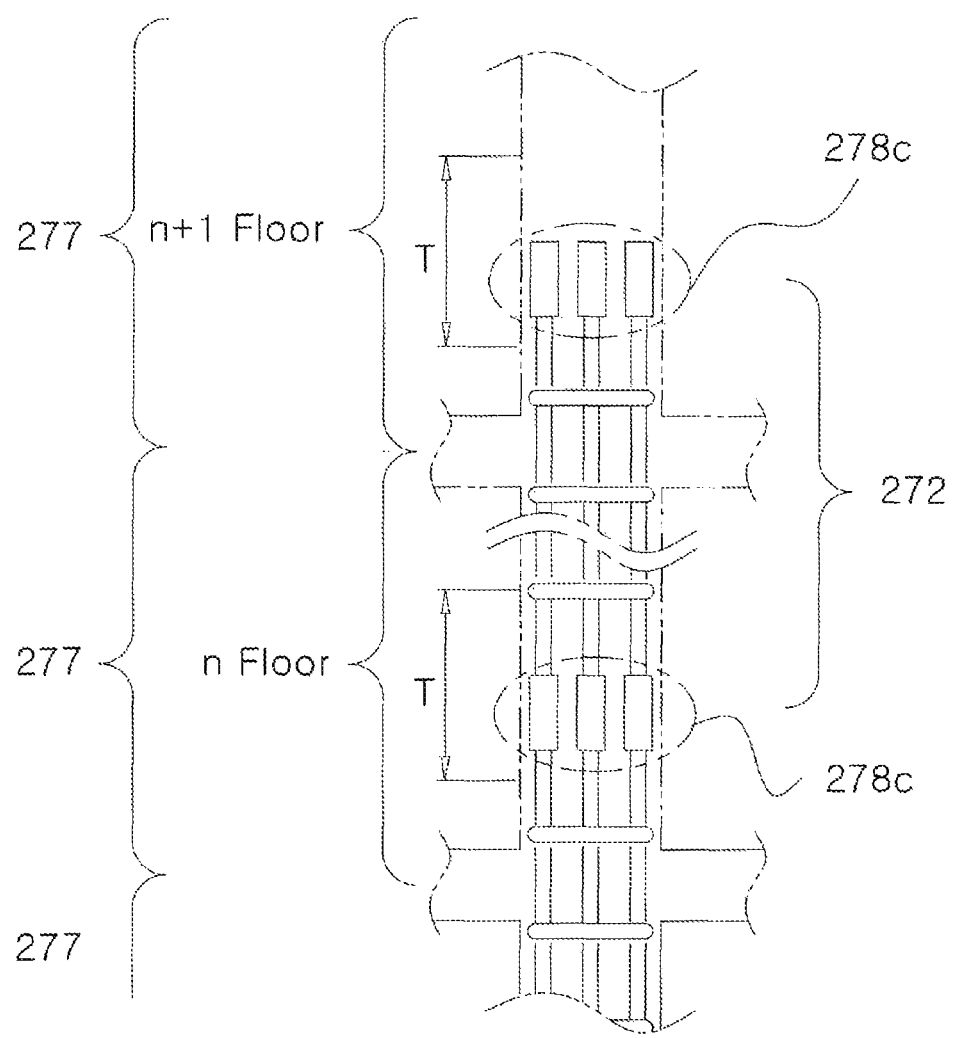

【Figure 31】
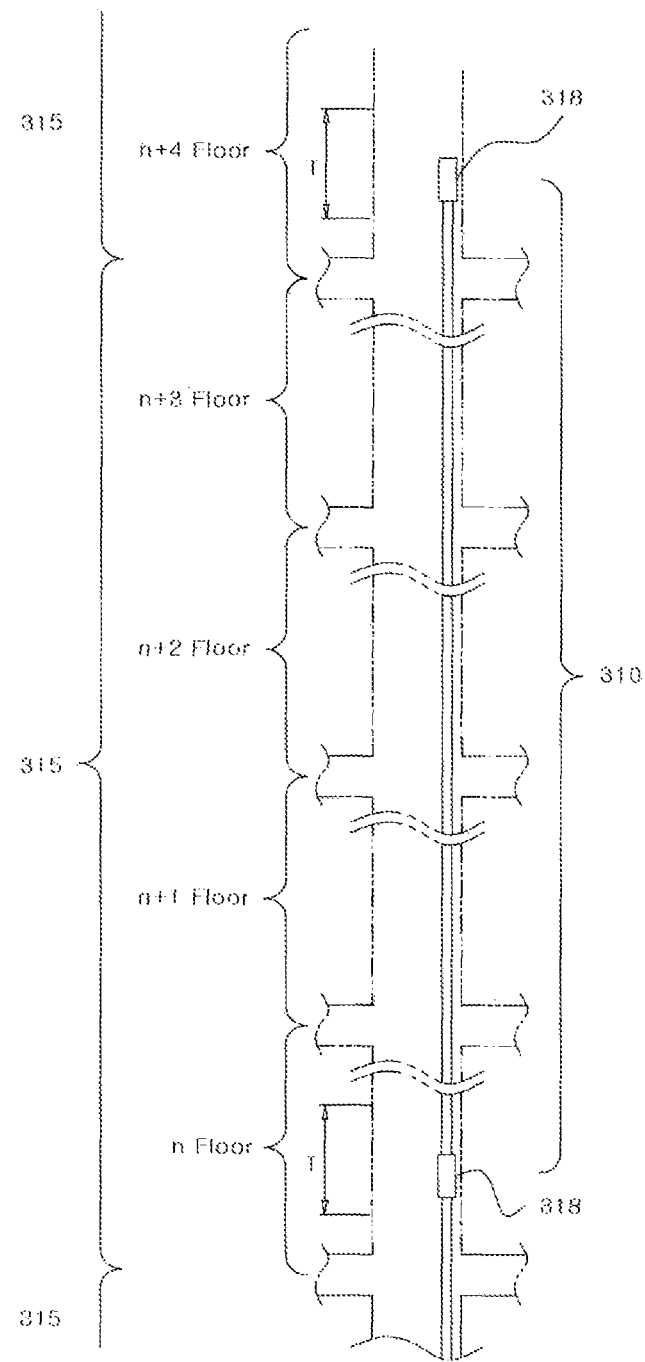

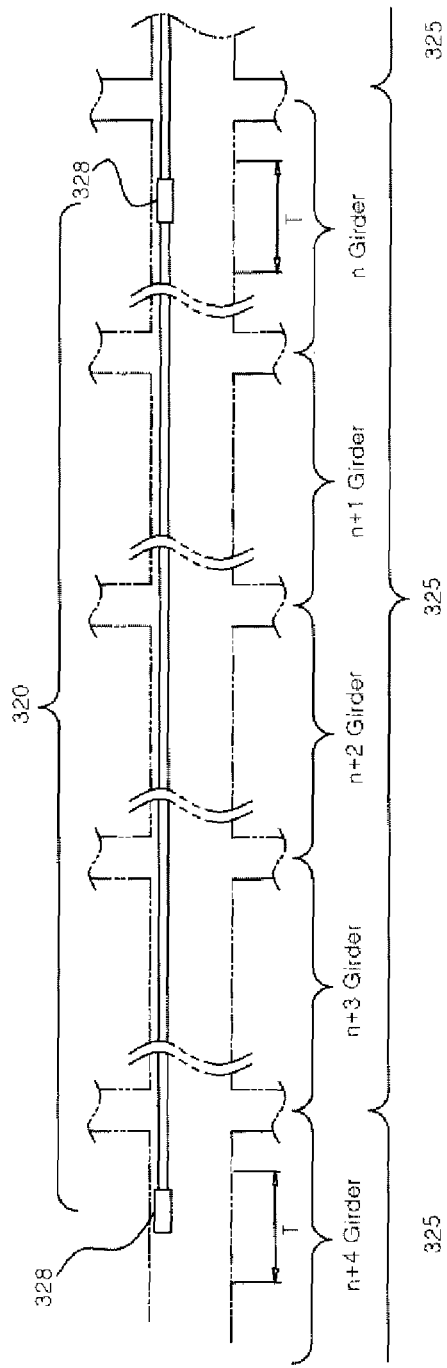
[Figure 32]

【Figure 33】
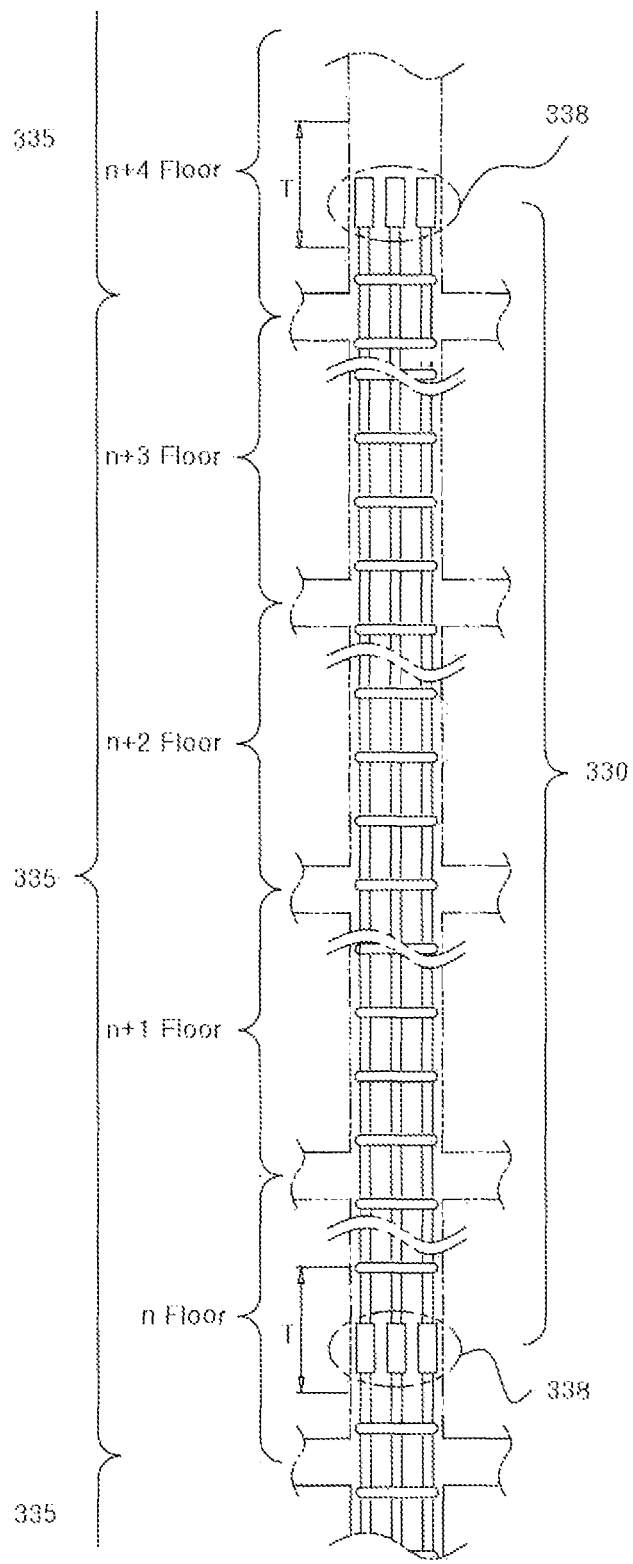

[Figure 34]
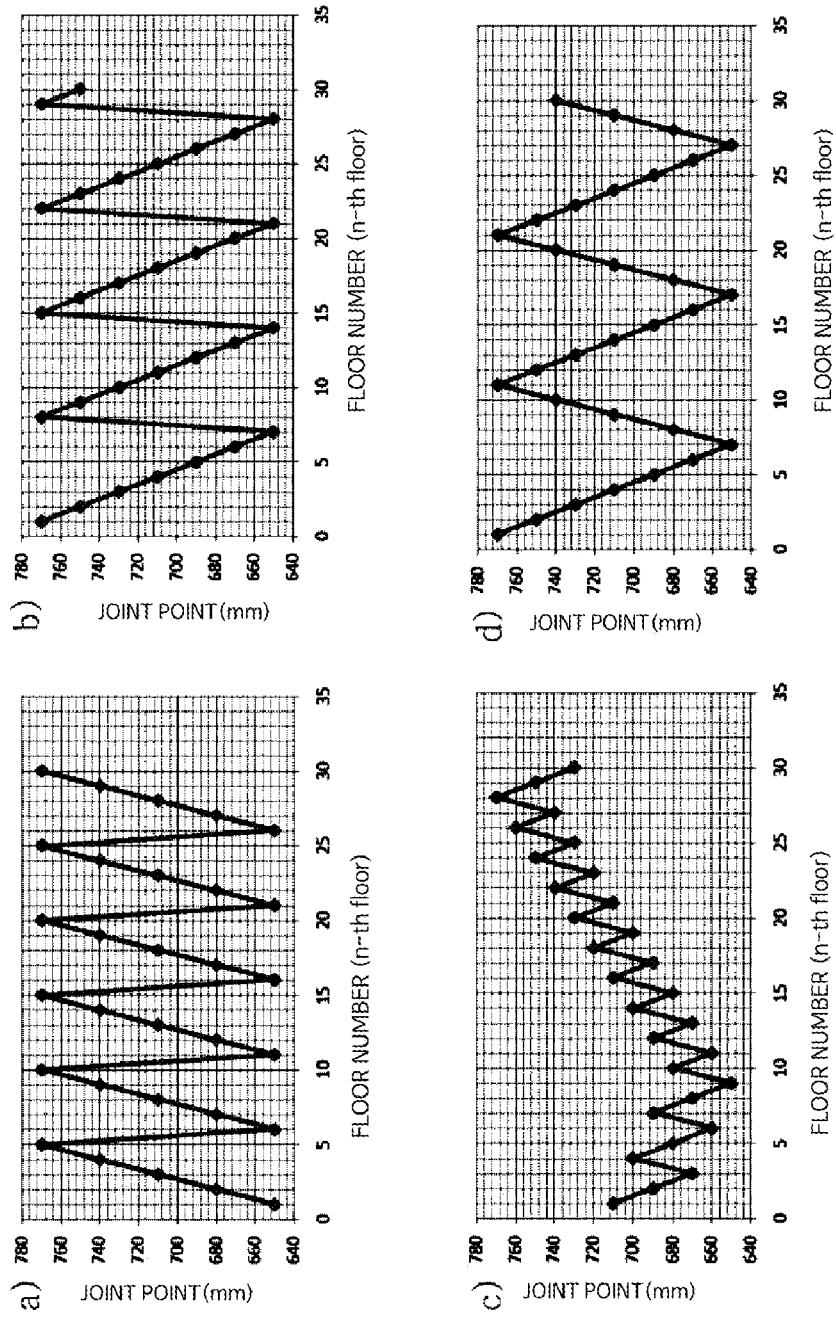

[Figure 35]
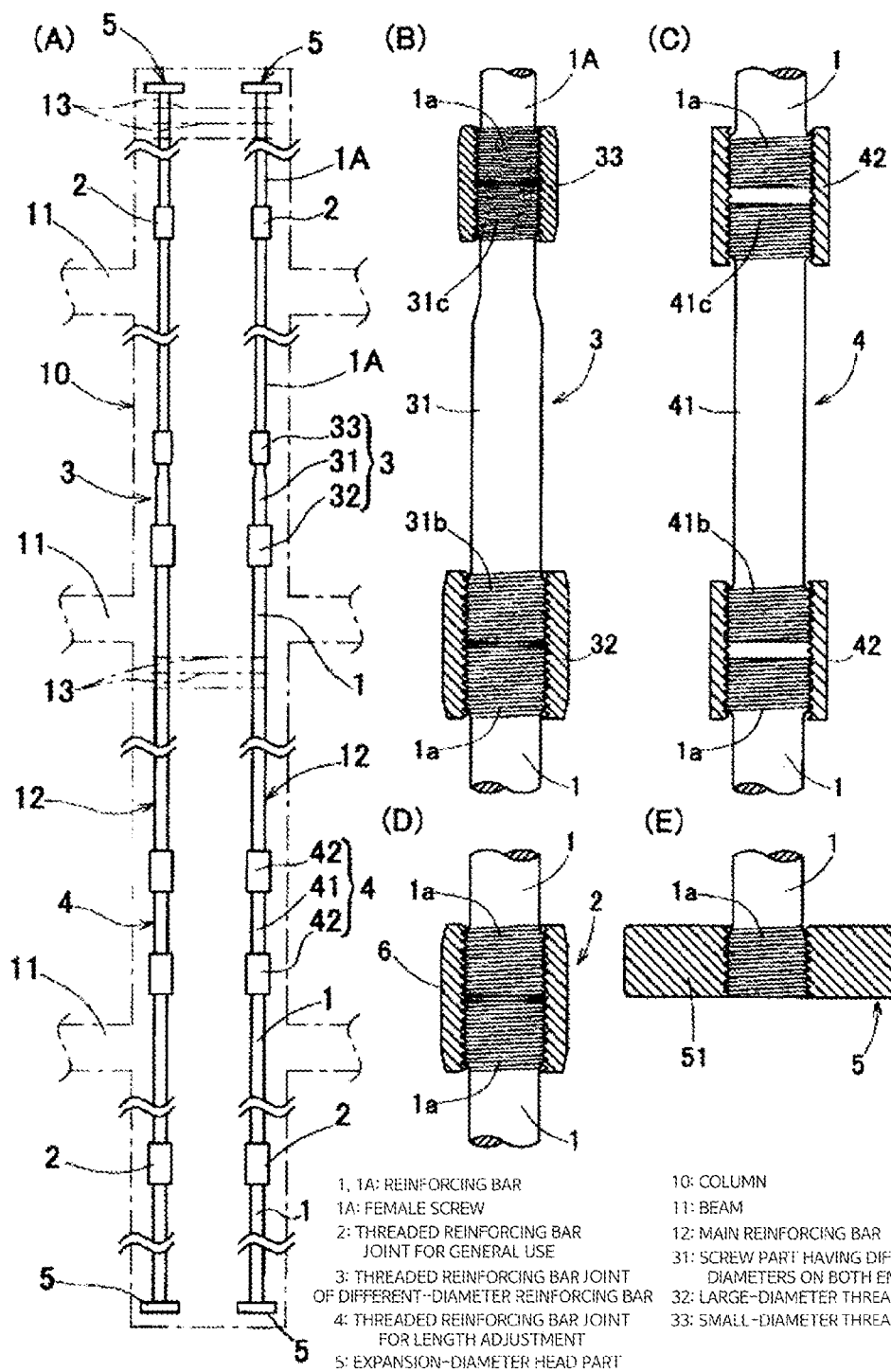

LENGTH-DETERMINED STANDARDIZED REINFORCING BAR INTEGRATED WITH BUTT JOINT DEVICE, AND METHOD FOR CONSTRUCTING REINFORCING BAR STRUCTURE BY USING SAME

TECHNICAL FIELD

The present invention relates to a length-determined standardized reinforcing bar integrated with a butt joint device and a method for constructing a reinforcing bar structure by using the same, and more particularly, to a length-determined standardized reinforcing bar that is mass-manufactured and ready-made in a determined standardized length in a state in which a joint device is integrated and a construction method capable of manufacturing a reinforcing bar structure continuously connected by a butt joint by repeatedly using the length-determined standardized reinforcing bar.

BACKGROUND ART

Reinforcing bars are usually distributed according to standard bundle weights in units of tons in standard lengths such as 12 m and 15 m, and are cut short and used according to specifications such as columns and beams according to individual building designs.

Due to the nature of field work during reinforcing bar construction, there are many cases in which materials need to be procured and used urgently during the construction process. However, in the case of the reinforcing bar, since the standardized reinforcing bar in which a joint device is integrated is not sold in units of lengths, it is impossible to immediately purchase and use a reinforcing bar having a specific length.

Therefore, in the field, the reinforcing bars are individually cut to a specific length using a cutter or the like according to the length actually required.

In the reinforcing bar processing process, a reinforcing bar loss of 2% to 5% occurs, resulting in economic loss.

In addition, construction costs such as labor costs may increase even in a reinforcing bar cutting process.

In addition, since there is no standardized reinforcing bar in which a joint device such as a coupler is integrated with a reinforcing bar, a reinforcing bar sold in a length that is easy to transport is mainly purchased at the field, cut to the required length, and subjected to lap-splice joint construction.

Accordingly, as a reinforcing bar of the lap-spliced length becomes longer, more and more unnecessary material costs may increase, and the load may unnecessarily increase as much as the load of the reinforcing bar of the lap-spliced length.

In addition, due to the lap-splice joint, a bar arrangement spacing is narrowed, which may be an obstacle during filling of concrete and degrade the fillability of concrete.

In addition, when delamination occurs due to cracks in concrete by aging, earthquakes, etc., columns in which reinforcing bars are lap-spliced may pose a great risk due to a sudden loss of load capacity.

Nevertheless, it is considered that the main reason for using the lap-splice joint is that there is no standardized reinforcing bar integrated with a joint device that may easily connect the reinforcing bars.

In addition, reinforcing bar couplers for on-site fastening are also used, but it is considered that since there are many cases where there are problems such as the occurrence of initial slip at a joint and a manufacturing process and a large number of required parts are required, the economic feasibility is also reduced, such as the increase in production cost of the coupler.

In addition, in the case of a threaded joint performed by directly threading an end portion of the reinforcing bar, it is considered that, since it is necessary to wait until a delivery date due to custom manufacturing etc., by a processing professional company, which may cause a setback in the construction schedule and separate factory logistics costs, the economic feasibility is reduced.

In addition, since gas pressure welding should be performed by requesting a professional company, it is considered that economic feasibility is reduced, the heat deflection occurs at the joint, and there are parts that may cause setbacks to the construction schedule, such as having to reserve a separate work schedule, when the work is requested by a professional company.

Therefore, it is considered that there was no choice but to do a lap-splice joint despite various chronic problems.

In addition, in the case of the custom-manufacturing method, the conventional method for forming a screw directly on a reinforcing bar includes a) preparing a reinforcing bar suitable for a material and a diameter of the reinforcing bar according to a request of a customer, b) cutting the reinforcing bar according to a required length of the customer, c) cold forging swaging an end portion of the cut reinforcing bar, cutting the end portion, or blowing and then inflating the end portion, d) chamfering the end portion, e) rolling threading or cutting threading a male screw, and f) transporting the reinforcing bar to a desired construction site of the customer.

A method for welding other screw members to an end portion of a reinforcing bar includes a) preparing a reinforcing bar suitable for a material and a diameter of the reinforcing bar according to a request of a customer, b) cutting the reinforcing bar according to a requested length of the customer, c) welding a female screw or a male screw member of the prepared standard to the reinforcing bar, d) transporting the reinforcing bar to a designated construction site of the customer, and e) performing joint construction on a plurality of reinforcing bars ordered in the same length according to a floor height of a corresponding building in a case of a column reinforcing bar.

As a result, the process from ordering a reinforcing bar to construction after transportation is cumbersome and takes a lot of time, which delays the construction period, and it is difficult to individually respond to the lengths or standards of the reinforcing bars required for each site.

In addition, referring to FIG. 35, Japanese Laid-Open Patent Publication No. 2011-102488 discloses a different-diameter reinforcing bar threaded reinforcing bar joint which is a reinforcing bar joint connecting between end portions of a large-diameter reinforcing bar and a small-diameter reinforcing bar having different-diameters, and includes a pair of screw parts having different diameters each formed in an enlarged shape at end portions of the large-diameter reinforcing bar and the small-diameter reinforcing bar connected to each other, a male screw component having different diameters on both ends that has a large-diameter side screw part and a small-diameter side screw part having the same diameter and lead as a screw part of the large-diameter reinforcing bar and a screw part of the small-diameter reinforcing bar, respectively, on both sides thereof, a large-diameter side thread sleeve that has a female screw part on an inner surface thereof and spiral-fits across the large-diameter side screw part and the screw part of the large-diameter reinforcing bar of the male screw component having different diameters on both ends, and a small-diameter side thread sleeve that has a female screw part on an inner surface thereof and spiral-fits across the small-diameter side screw part and the screw part of the small-diameter reinforcing bar of the male screw component having different diameters on both ends, and a joint-attached reinforcing bar structure.

The related art is to prepare, select, and use a threaded reinforcing bar joint 4 for length adjustment of various lengths, and is configured to obtain a main reinforcing bar 12 that is a reinforcing bar arrangement body having a desired total length even if lengths of male screw attached reinforcing bars 1 and 1A are constant.

However, the related art performs jointing to fit the total length of the reinforcing bar net through the threaded reinforcing bar joint 4 for length adjustment, and is not configured to manage a reserved section of joint work of a length-determined standardized reinforcing bar. Due to the fact that threaded both ends for adjusting a length, which are very short in length compared to a reinforcing bar, should be connected to the reinforcing bar for each reference length (e.g., one floor), a jointing operation should inevitably be accompanied twice or more, so it is impossible to minimize the number of joint places to one point for each reference length (e.g., one floor) like the invention of the application. As a result, the number of joints increases unnecessarily, making the joint work complicated, reducing economic feasibility, and inevitably degrading construction workability.

That is, at least one additional joint device and joint man-hours are required for each standard length, which unnecessarily increases material costs and inevitably increases the number of joint man-hours.

In addition, the threaded reinforcing bar joint 4 for length adjustment simply joints separate members to fit lengths, making it difficult to perform direct joint work between standardized reinforcing bars and making it difficult to standardize the member itself due to the use of the members by changing the lengths of the members differently for each reinforcing bar structure.

However, the present invention is configured to enable continuous construction by the direct joint work between the length-determined standardized reinforcing bars, and easily a reinforcing bar structure while constructing by butt-jointing joint position adjustment reinforcing bars so that a joint point is intermittently returned to the reserved section of the joint work when joint position adjustment is required.

Due to the intermittent use of the joint position adjustment reinforcing bar, the joint work of only the continuous length-determined standardized reinforcing bar is performed in other sections, except for a use section of the joint position adjustment reinforcing bar.

In this case, the joint position adjustment reinforcing bar may also be a length-determined standardized reinforcing bar.

DISCLOSURE

Technical Problem

The present invention is to increase safety of a structure and reduce the required amount of a reinforcing bar.

The present invention is to ensure that stress is transmitted from a reinforcing bar to a reinforcing bar.

The present invention is to continuously joint reinforcing bars with a butt joint rather than a lap-splice joint.

The present invention is to enable continuous construction by performing direct joint work between length-determined standardized reinforcing bars.

The present invention is to minimize a joint point per reference length.

The present invention is to continuously joint reference length sections with only a length-determined standardized reinforcing bar used as a reference reinforcing bar and a joint position adjustment reinforcing bar.

The present invention is to overcome joint point errors for each floor that is an obstacle to using a length-determined standardized reinforcing bar.

The present invention is to facilitate work for jointing reinforcing bars by immediately supplying the reinforcing bars to the field, if necessary.

The present invention is to easily identify a reinforcing bar.

Technical Solution

To solve the above problems, the present invention provides:

A method for constructing a reinforcing bar structure by a length-determined standardized reinforcing bar integrated with a butt joint device, the method may comprise: a) determining a reference length of the reinforcing bar to be butt-jointed; b) selecting a length-determined standardized reinforcing bar used as the reference reinforcing bar by determining a length of the length-determined standardized reinforcing bar equal to the reference length or shorter or longer than the reference length, and a material and a diameter of the length-determined standardized reinforcing bar; and c) performing a construction by repeatedly using one or more length-determined standardized reinforcing bars used as the selected reference reinforcing bar, in which the step c) comprises: (i) installing a start-section reinforcing bar; (ii) repeatedly butt jointing the length-determined standardized reinforcing bar used as the reference reinforcing bar to the start-section reinforcing bar; and (iii) repeating steps (i) to (ii) to reach a final section, and within each reference length, each butt joint is made in a section excluding 150 mm from both ends of a column or excluding 150 mm from both ends of a beam, and the joint device is any one selected from a selection group of a case where a male screw part is formed only in one end portion, a case where a female screw part is formed only in one end portion, a case where the male screw part is formed in both end portions, a case where the female screw part is formed in both end portions, and a case where the male screw part is formed in one end portion and the female screw part is formed in the other end portion, and the male screw part and the female screw part are a cylindrical screw coupling structure, a conical screw coupling structure, or a cylindrical-conical integrated screw coupling structure.

The reference length in step a) may comprise a reserved section of joint work at the butt joint point, and in step (iii), when an n-th butt joint point deviates from the range of the reserved section of joint work, the n-th joint point may be returned into the range of the reserved section of joint work by butt-jointing the joint position adjustment reinforcing bar to any joint point before the n-th butt joint point.

The joint position adjustment reinforcing bar may be a length-determined standardized reinforcing bar having a different length from the length-determined standardized reinforcing bar used as the reference reinforcing bar.

The length-determined standardized reinforcing bars may be two reinforcing bars having a difference in length, and one reinforcing bar may be a shortened length-determined standardized reinforcing bar shorter than the reference length, and the other reinforcing bar may be an extended length-determined standardized reinforcing bar longer than the reference length, and during the constructing, a case where the shortened length-determined standardized reinforcing bar and the extended length-determined standardized reinforcing bar are alternately jointed one by one, a case where the shortened length-determined standardized reinforcing bars are jointed once and the extended length-determined standardized reinforcing bars are jointed twice or more, a case where the shortened length-determined standardized reinforcing bar is jointed twice or more and the extended length-determined standardized reinforcing bar is jointed once, or a case where the shortened length-determined standardized reinforcing bar is jointed twice or more and the extended length-determined standardized reinforcing bar is also jointed twice or more may be selectively performed to reach the final section.

The reference length may be 1 floor height length, 2 floor height lengths, 3 floor height lengths, or 4 floor height lengths, or may be 1 time, 2 times, 3 times the length or 4 times a length of the beam connecting between columns.

In step c), the length-determined standardized reinforcing bars used repeatedly may have the same length.

One joint point may be generated for each reference length.

The cylindrical screw coupling structure may be formed in a case where a cylindrical female screw part is formed in an end portion of one reinforcing bar and a cylindrical male screw part is formed in an end portion of the other reinforcing bar so that the male and female cylindrical screw parts are screwed together, or formed in a case where a cylindrical male screw part is formed in each of the end portions of the two reinforcing bars to be jointed facing the end portions and a separate coupler is formed so that the cylindrical male screw part is screwed to both ends.

The cylindrical-conical integrated screw coupling structure may include a cylindrical-conical integrated female screw part in which a cylindrical female screw part formed with a cylindrical screw thread on an inner diameter and a conical female screw part having a narrower inner diameter are integrally formed at one end of the cylindrical female screw part, and a cylindrical male screw part formed of a cylindrical screw thread on an outer diameter and a cylindrical-conical integrated male screw part integrally formed with a conical male screw part having a narrower outer diameter at one end of the cylindrical male screw part, an inner diameter of the cylindrical female screw part may be formed to be greater than a maximum inner diameter of the conical female screw part, an outer diameter of the cylindrical male screw part may be formed to be greater than a maximum outer diameter of the conical male screw part, a screw thread discontinuous part may be formed between the cylindrical female screw part and the conical female screw part and between the cylindrical male screw part and the conical male screw part, respectively, and the inner diameter of the cylindrical female screw part may be formed to be greater than the maximum outer diameter of the conical female screw part, A screw protection cap may be coupled to the male screw part or the female screw part, and an information providing unit providing unique information related to the length-determined standardized reinforcing bar may be formed in the screw protection cap.

The joint device may be any one selected from the selection group of a case where a first jointing end member is formed only in one end portion, a case where a second jointing end member is formed only in one end portion, a case where the first jointing end member is formed in both end portions, a case where the second jointing end member is formed in both end portions, and a case where the first jointing end member is formed in one end portion and the second jointing end member is formed in the other end, wherein the first jointing end member may be a member which is jointed to the end portion of the length-determined standardized reinforcing bar and have a male screw part for coupling a fastening socket formed on an outer surface in a longitudinal direction, and the second jointing end member may be a member in which one end portion has a shape corresponding to a shape of the end portion of the first jointing end member, and the other end portion may be jointed to the end portion of the length-determined standardized reinforcing bar and provided with one or a plurality of steps spaced apart from the one end portion and forming an angle selected from an acute angle, a right angle, and an obtuse angle with respect to the longitudinal direction of the one end portion in an axial direction.

The fastening socket may be temporarily coupled to the second jointing end member side, and the fastening socket may be a hollow-shaped member that is open in the longitudinal direction and extending in the longitudinal direction to accommodate an outer surface of the second jointing end member and an outer surface of the first jointing end member, and include the female screw part for coupling a coupling socket, which is screwed to the male screw part for coupling a fastening socket of the first jointing end member, formed in the longitudinal direction on an inner surface, and one or a plurality of engaging steps engaging with a step of the second jointing end member and forming an angle selected from an acute angle, a right angle, and an obtuse angle with respect to the longitudinal direction.

One sleeve or the other sleeve may be coupled to the male screw part, which may be any one selected from the selection group of a case where one sleeve is coupled to a male screw part of one end portion, a case where the other sleeve is coupled to a male screw part of one end portion, a case where one sleeve is coupled to male screw parts of both end portions, a case where the other sleeve is coupled to male screw parts of both end portions, and a case where one sleeve is coupled to a male screw part of one end portion and the other sleeve is coupled to the male screw part in the other end portion, wherein the one sleeve is a member that has a female screw part formed on an inner surface and a male screw part formed on an outer surface, and the other sleeve is a member in which the female screw part is formed on an inner surface and which is formed with a first engaging step having one end portion formed in a parallel plane perpendicular to a central axis line in an axial direction.

A coupling socket may be temporarily coupled to the other sleeve, and the coupling socket may have a female screw part screwed into the male screw part of the one sleeve on the inner surface, and a member in which an engaging step protrudes in a circle center direction on the inner surface of one end portion so as to perform an engaging action while engaging with the first engaging step of the other sleeve.

The length-determined standardized reinforcing bar used for the column may be used for the beam, or the length-determined standardized reinforcing bar used for the beam is used for the column.

A plurality of the length-determined standardized reinforcing bar integrated with a butt joint device may be pre-assembled to form a pre-assembled reinforcing bar net by the length-determined standardized reinforcing bar.

There is provided a length-determined standardized reinforcing bar integrated with a butt joint device, in which, after determining a material and a diameter of a reinforcing bar, a length-determined standardized length measurement, which is a length standard from one end to the other end, is determined and imparted to a reinforcing bar to be cut, and the reinforcing bar is cut to a length-determined standardized length in accordance with the imparted length measurement, wherein once the type of a butt joint device for butt-jointing the reinforcing bar cut to a determined standardized length is determined, the butt joint device is formed at, and integrated with, one end or both ends of the reinforcing bar cut to the determined standardized length by the length-determined standardized length.

The length-determined standardized reinforcing bars may be formed in plurality with differentiated lengths so that they are applied to 1 to 4 times a floor height or 1 to 4 times a length of a beam connecting between columns.

A plurality of the length-determined standardized reinforcing bar integrated with a butt joint device may be pre-assembled to form a pre-assembled reinforcing bar net by the length-determined standardized reinforcing bar.

Advantageous Effects

According to a method for constructing a reinforcing bar structure by a length-determined standardized reinforcing bar integrated with a butt joint device, it is possible to continuously jointing the reinforcing bars with a butt joint rather than a lap-splice joint in a section where the reinforcing bars should be continuously jointed.

It is possible to minimize a lap-splice joint section where tensile force is greatly affected by concrete.

It is possible to realize economic feasibility by reducing the required amount of reinforcing bar.

It is possible to ensure that stress is transmitted from a reinforcing bar to a reinforcing bar.

It is possible to enable continuous construction by performing direct joint work between length-determined standardized reinforcing bars.

It is possible to continuously joint reference length sections with only a length-determined standardized reinforcing bar used as a reference reinforcing bar and a joint position adjustment reinforcing bar.

It is possible to generate one joint point for each reference length.

By integrating a butt joint device, mass-manufacturing a reinforcing bar in a determined standardized length in advance and making the reinforcing bar ready-made, it is possible to easily supply materials and shorten a construction period by immediately supplying the reinforcing bar to the field, if necessary.

It is possible to convert reinforcing bar materials having raw material properties into materials into ready-made properties through mass production.

By directly displaying unique information on a screw protection cap detachable from a standardized reinforcing bar, it is possible to easily identifying the standardized reinforcing bar.

It is possible to reduce the cost and time required for processes such as cutting a reinforcing bar and reduce a loss of remnants of the reinforcing bar.

It is possible to increase filling property of concrete of the reinforcing bar joint by minimizing a lap-splice joint.

It is possible to form a reinforcing bar structure only with a length-determined standardized reinforcing bar net.

It is possible to form a reinforcing bar structure with only two types of reinforcing bars, a pre-assembled reinforcing bar net using a length-determined standardized reinforcing bar used as a reference reinforcing bar and a pre-assembled reinforcing bar net using a joint position adjustment reinforcing bar even when joint position adjustment is required.

Due to an intermittent use of a pre-assembled reinforcing bar net by a joint position adjustment reinforcing bar, except for a use section of the pre-assembled reinforcing bar net by the joint position adjustment reinforcing bar, it is possible to perform a joint work of only the pre-assembled reinforcing bar net by a continuous length-determined standardized reinforcing bar.

BRIEF DESCRIPTION OF THE DRAWINGS

FIG. 1 is a flow chart illustrating an embodiment of the present invention.

FIG. 2 is a diagram illustrating a joint position change in an embodiment related to a joint point height of a start-section reinforcing bar and a joint position change in a reserved section of joint work shown in an upper floor.

FIGS. 3 to 5 are diagrams illustrating an embodiment of a butt joint device of a length-determined standardized reinforcing bar by a cylindrical screw coupling structure.

FIGS. 6 and 7 are diagrams illustrating an embodiment of the butt joint device of the length-determined standardized reinforcing bar by a conical screw coupling structure.

FIGS. 8 and 9 are diagrams illustrating an embodiment of a butt joint device of a length-determined standardized reinforcing bar to which a reinforcing bar connector by a threaded sleeve is applied.

FIGS. 10 and 11 are diagrams illustrating an embodiment of the butt joint device of the length-determined standardized reinforcing bar to which a socket fastening type reinforcing bar connector by a jointing end member is applied.

FIGS. 12 to 15 are diagrams illustrating an example of an embodiment of the butt joint device of the length-determined standardized reinforcing bar by the cylindrical-conical integrated screw coupling structure.

FIG. 16 is a diagram illustrating a state in which a reinforcing bar coupler is temporarily coupled to the length-determined standardized reinforcing bar.

FIGS. 17 to 21 are diagrams illustrating an embodiment in which a joint position adjustment reinforcing bar is applied when constructing a reinforcing bar structure using the length-determined standardized reinforcing bar.

FIG. 22 is a diagram illustrating an embodiment of a screw protection cap and an information providing unit of the length-determined standardized reinforcing bar.

FIGS. 23 to 25 and 31 are diagrams illustrating an embodiment in which a reference length is 1 to 4 times a floor height and an embodiment of a column reinforcing bar by the length-determined standardized reinforcing bar according to the embodiment.

FIGS. 26 and 32 are views showing an embodiment in which the reference length is 1 to 4 times a length of a beam and an embodiment of a beam reinforcing bar by the length-determined standardized reinforcing bar according to the embodiment.

FIGS. 27 to 30 and 33 are diagrams illustrating an embodiment of various reference lengths and an embodiment of a pre-assembled reinforcing bar nets by the length-determined standardized reinforcing bar.

FIG. 34 is a graph illustrating a joint point change according to the change in the floor number in first to fourth embodiments.

FIG. 35 is a diagram illustrating the related art.

BEST MODE

In this specification, a length-determined standardized reinforcing bar is a member in which after determining the material and diameter of a reinforcing bar, a length-determined standardized length measurement, which is a length standard from one end to the other end, is determined and imparted to a reinforcing bar to be cut, and the reinforcing bar is cut to a length-determined standardized length in accordance with the imparted length measurement, wherein once the type of a butt joint device for butt-jointing the reinforcing bar cut to a determined standardized length is determined, the butt joint device is formed at, and integrated with, one end or both ends of the reinforcing bar cut to the determined standardized length by the length-determined standardized length, and refers to a member that a member that is ready-made and mass-produced and can be supplied and used immediately when demand for each length-determined standardized reinforcing bar arises at any time.

In addition, in the present specification, the meaning of integrating a butt joint device with a length-determined standardized reinforcing bar means refers to, as an embodiment, including both cases where a male screw part is directly processed and formed on a length-determined standardized reinforcing bar or a male screw member or a female screw member is welded to an end portion of the length-determined standardized reinforcing bar, respectively.

Hereinafter, a method for constructing a reinforcing bar structure by a length-determined standardized reinforcing bar integrated with a butt joint device will be described.

In general, a section in which a reinforcing bar, which is a length member, should be jointed continuously, may be connected with a lap-splice joint or butt joint.

However, when reinforcing bars are jointed with a lap-splice joint, a material loss may increase as much as a lap-splice length compared to the butt joint, and a load may increase as much as the lap-splice length.

In addition, since the lap-splice joint exerts tensile force only when concrete is maintained in a hardened state, a rapid loss of load capacity may occur when a concrete attachment crack fracture is formed.

Therefore, it is considered that it is not suitable for earthquake-resistant structures that should withstand lateral forces such as earthquakes.

In addition, due to the lap-splice joint, a bar arrangement spacing is narrowed, which may be an obstacle during filling of concrete and degrade the filling property of concrete.

In particular, depending on the site, reinforcing bars of D29 or D35 or higher are prohibited from being lap-spliced. In these cases, the butt joint is considered essential.

When the butt joint section increases, compared to the lap-splice joint, it is possible to reduce the material loss, reduce the unnecessary load, and exert the load capacity suitable for an earthquake-resistant structure.

In addition, in the case of the lap-splice joint, stress may be transmitted through concrete, but in the case of the butt joint, stress may be transmitted from a reinforcing bar to a reinforcing bar, so the joint of the reinforcing bar may exert load capacity independently of the condition or strength of concrete. This is expected to improve the safety of the structure.

That is, it is possible to minimize the lap-splice joint section where tensile force is greatly affected by concrete.

Therefore, it is considered that the load capacity of the reinforcing bar concrete structure against other external forces such as earthquakes and strong winds may further increase by making the reinforcing bar structure by the butt joint having guaranteed joint performance.

Referring to FIG. 1, the construction method of the reinforcing bar structure by length-determined standardized reinforcing bar integrated with a butt joint device will be described step by step.

In the case of the reinforcing bar structure, this method can be applied to a variety of places where the reinforcing bar concrete is used, including the construction and civil engineering field.

For example, it is possible to arbitrarily select a horizontal reinforcing bar section or a vertical reinforcing bar section where the butt joints continue on the shop drawing, and it can be applied to various sections connected by butt joints, such as column reinforcing bars and beam reinforcing bars.

It can also be applied to bridge and port construction, and can be effectively used in bridge pier construction. It is considered that the application of this method is urgent since the lap-splice joint is mainly constructed until recently in the construction of piers.

First, a step (S1) of determining a reference length of a reinforcing bar to be butt-jointed is performed.

The present invention may be implemented by setting a reference length in various reinforcing bar concrete frames such as reinforcing bar concrete civil engineering structures.

If necessary, the reference length may be set differently for each section, and in this case, a length difference occurs for each reference length.

When the reference lengths are set to be the same as in the following embodiment, the same reference lengths are arranged continuously.

Since the length of the length-determined standardized reinforcing bar is determined to correspond to the reference length, the length from one end to the other end of one length-determined standardized reinforcing bar is similar to the reference length.

The reference length is formed so that each reference length is formed continuously, and since each reference length is jointed once, one joint point occurs for each reference length.

Therefore, it is possible to minimize the number of joint points per reference length.

A method for setting a reference length is not limited, and the reference length may be set, for example, by referring to each floor height of a reinforcing bar structure or by referring to a length of a beam connecting between columns.

That is, the reference length may be determined as one or a plurality of floor heights when a length-determined standardized reinforcing bar is used as a column reinforcing bar. In this case, it becomes a structure in which a joint point occurs once for each floor or multiple floors.

Referring to FIGS. 23 to 25, when a reference length 237 is 1 floor height, a length-determined standardized reinforcing bar 232 is also set to correspond to the reference length 237.

Accordingly, as one length-determined standardized reinforcing bar 232 is used for each floor (n-th floor), which is the reference length, one joint point 238c is generated at one place, that is, once.

Even when the reference length 236 is 2 floor heights (n-th floor to n+1-th floor), as one length-determined standardized reinforcing bar 231 is used for each 2 floors, which are the reference length 236, a joint point 238b is generated at one place, that is, once.

Even when the reference length 235 is 3 floor heights (n-th floor to n+2-th floor), as one length-determined standardized reinforcing bar 230 is used for each 3 floors, which are the reference length 235, a joint point 238a is generated at one place, that is, once.

Referring to FIG. 31, even when the reference length 315 is 4 times a floor height (n-th floor to n+3-th floor), as one length-determined standardized reinforcing bar 310 is used for each 4 floors, which are a reference length 315, a joint point 318 is generated at one place, that is, once. The same description is also referred to the reference length of more than 4 times a floor height.

Preferably, the length-determined standardized reinforcing bars by individual reinforcing bars are mainly jointed up to 1 to 2 floor heights, and when working with pre-assembled reinforcing bar nets by the length-determined standardized reinforcing bars, the length-determined standardized reinforcing bars can be jointed 3 to 4 times a floor height or more.

Referring to FIG. 26, when the reference lengths 265, 266, and 267 of the length-determined standardized reinforcing bar is set based on the length of the beam, the reference lengths 265, 266, and 267 may be formed in a multiple of the length of the beam connecting between the columns, that is, 1 time (n-th girder), 2 times (n-th girder to n+1-th girder) or 3 times (n-th girder to n+2-th girder).

In addition, referring to FIG. 32, the reference length of the length-determined standardized reinforcing bar may be formed in 4 times (n-th girder to n+3-th girder) or more than the length of the beam connecting between the columns.

Accordingly, the length-determined standardized reinforcing bar is set to 1 time 267, 2 times 266, 3 times 265, or 4 times 320 of the length of the beam to correspond to each reference length 265, 266, 267, and 325. As one length-determined standardized reinforcing bar is used for each reference length, joint points 268a, 268b, 268c, and 328 are generated at one place, that is, once for each reference lengths 265, 266, 267, and 325.

Referring to FIGS. 27 to 30 and 33, preferably, the length-determined standardized reinforcing bar may form pre-assembled reinforcing bar nets 270, 271, 272, and 330 which are surrounded by bands, stirrups, or the like.

Even in this case, the pre-assembled reinforcing bar net by the length-determined standardized reinforcing bar is set to 1 time 272, 2 times 271, 3 times 270, or 4 times 335 to correspond to each reference length 275, 276, 277, and 335, and as one length-determined standardized pre-assembled reinforcing bar net 270, 271, 272, and 330 is used for each reference length, joint points 278a, 278b, 278c, and 338 are generated at one place, that is, once each.

During on-site construction, the reinforcing bar structure is manufactured using one length-determined standardized reinforcing bar 230, 231, 232, 265, 266, 267, and 320 formed of individual reinforcing bars or the individual reinforcing bars are pre-assembled, so the reinforcing bar structure may be formed by manufacturing the pre-assembled reinforcing bar nets 270, 271, 272, and 330 by the length-determined standardized reinforcing bars.

That is, the length-determined standardized reinforcing bars 230, 231, 232, 265, 266, 267, and 320 are jointed by the individual reinforcing bars one by one, or by continuously connecting the pre-assembled reinforcing bar nets 270, 271, 272, and 330 by the length-determined standardized reinforcing bars in which the plurality of length-determined standardized reinforcing bars are assembled into the pre-assembled reinforcing bar nets, the reinforcing bar structure is formed.

In logistics, for example, since a length of a cargo area of the long or extra-long wheelbase 25-ton truck is 10,100 mm, and a floor height of a residential-commercial complex or apartment is approximately 2,300 mm to 2,400 mm in most cases, 4 times a floor height are around 9,600 mm, so logistics of length-determined standardized reinforcing bar or pre-assembled reinforcing bar net by length-determined standardized reinforcing bar is possible.

A reference length of more than 5 floor heights is also possible, but since the length of the reinforcing bar is more than 5 floor heights, logistics work is difficult, so set the reference length is set up to 4 floor heights. If necessary, an embodiment of a length-determined standardized reinforcing bar having a length of 5 floors or more or a pre-assembled reinforcing bar net by the length-determined standardized reinforcing bar may also be considered.

In addition, although not illustrated, it does not deviate from the above embodiment even when a different-diameter joint is required, such as between different-diameter reinforcing bars of length-determined standardized reinforcing bars or between different-diameter reinforcing bar nets.

Next, a step (S2) of selecting a length-determined standardized reinforcing bar used as the reference reinforcing bar by determining a length of the length-determined standardized reinforcing bar equal to the reference length, shorter or longer than the reference length, and a material and a diameter of the length-determined standardized reinforcing bar is performed.

Based on the reference length, the length of the length-determined standardized reinforcing bar used as the reference reinforcing bar is selected.

When there is the length-determined standardized reinforcing bar having the same length as the reference length, only the material and diameter of the length-determined standardized reinforcing bar are selected.

In other words, it is not necessary to technically define and use a reserved section T of joint work, and the reserved section T is used by being set to a position where a worker's hand may reach easily when working, for example, a section excluding each 150 mm from both ends of a column in the case of the column reinforcing bar joint work or used by being set to the most convenient position among sections excluding each 150 mm from both ends of a beam in the case of the beam reinforcing bar joint work.

If necessary, the range of the reserved section of joint work range of the butt joint point may be set within the reference length.

Referring to FIG. 17, that is, within the reference length, the range of the reserved section T of joint work at the butt joint point is set.

The reserved section T of joint work is a section where a joint place may occur within the reference length, and after setting this reserved section T of joint work, the joint place is managed so that the joint does not deviate from the reserved section T of joint work.

Even when the joint position adjustment reinforcing bar needs to be used, the joint work of only a continuous length-determined standardized reinforcing bar is possible to some extent by using the joint position adjustment reinforcing bar intermittently.

Therefore, except for the use section of the joint position adjustment reinforcing bar, there is an effect that the joint work of only the continuous length-determined standardized reinforcing bar is performed in other sections.

In addition, a plurality of length-determined standardized reinforcing bars integrated with a butt joint device may be pre-assembled to form a pre-assembled reinforcing bar net by the length-determined standardized reinforcing bar, and a plurality of joint position adjustment reinforcing bars may also be pre-assembled to form the pre-assembled reinforcing bar net by the joint position adjustment reinforcing bar.

For the method for constructing pre-assembled reinforcing bar nets 270, 271, and 272 by the length-determined standardized reinforcing bars, the same method as in the embodiment of jointing length-determined standardized reinforcing bars one by one is referenced.

A method for constructing a reinforcing bar structure using pre-assembled reinforcing bar net by a length-determined standardized reinforcing bar integrated with a butt joint device includes: a) determining a reference length of the pre-assembled reinforcing bar net by the length-determined standardized reinforcing bar to be butt-jointed; b) selecting the pre-assembled reinforcing bar net by the length-determined standardized reinforcing bar used as the reference reinforcing bar by determining a length of the pre-assembled reinforcing bar net by the length-determined standardized reinforcing bar equal to the reference length or shorter or longer than the reference length, and a material and a diameter of the pre-assembled reinforcing bar net by the length-determined standardized reinforcing bar; and c) performing a construction by repeatedly using one or more pre-assembled reinforcing bar net by the length-determined standardized reinforcing bar used as the selected reference reinforcing bar, in which the step c) includes: (i) installing a start-section reinforcing bar; (ii) repeatedly butt jointing the pre-assembled reinforcing bar net by the length-determined standardized reinforcing bar used as the reference reinforcing bar to the start-section reinforcing bar; and (iii) repeating steps (i) to (ii) to reach a final section.

In the case of using the pre-assembled reinforcing bar net by the joint position adjustment reinforcing bar, the reference length in step a) includes a reserved section of joint work at the butt joint point, and in step (iii), when an n-th butt joint point deviates from the range of the reserved section of joint work, the n-th joint point is returned into the range of the reserved section of joint work by butt-jointing the pre-assembled reinforcing net by the joint position adjustment reinforcing bar to any joint point before the n-th butt joint point.

When the joint position adjustment is required, even in the joint points 278a, 278b, 278c, and 338 of the pre-assembled reinforcing bar nets 270, 271, 272, and 330 by the length-determined standardized reinforcing bar, the joint points 278a, 278b, 278c, and 338 of the pre-assembled reinforcing bar nets 270, 271, 272, and 330 by the length-determined standardized reinforcing bar may be managed by the reserved section T of joint work set for each reference length 275, 276, 277, and 335.

In this case, due to an intermittent use of a pre-assembled reinforcing bar net by a joint position adjustment reinforcing bar, except for a use section of the pre-assembled reinforcing bar net by the joint position adjustment reinforcing bar, it is possible to perform a joint work of only the pre-assembled reinforcing bar net by a continuous length-determined standardized reinforcing bar.

Therefore, it is possible to form a reinforcing bar structure with only two types of reinforcing bars, a pre-assembled reinforcing bar net using a length-determined standardized reinforcing bar used as a reference reinforcing bar and a pre-assembled reinforcing bar net using a joint position adjustment reinforcing bar even when joint position adjustment is required.

Furthermore, when the joint position adjustment reinforcing bar is also the length-determined standardized reinforcing bar, the result is that the reinforcing bar structure is composed only of the pre-assembled reinforcing bar net by the length-determined standardized reinforcing bar or the pre-assembled reinforcing bar net.

In addition, an embodiment in which any combination selected from the selection group of the length-determined standardized reinforcing bar by the individual reinforcing bars, the joint position adjustment reinforcing bar by the individual reinforcing bars, the pre-assembled reinforcing bar net by the length-determined standardized reinforcing bar, and the pre-assembled reinforcing bar net by the joint position adjustment reinforcing bar, for example, the pre-assembled reinforcing bar net by the length-determined standardized reinforcing bar is used, but the joint position adjustment reinforcing bars by the individual reinforcing bars are jointed and used when adjusting the joint position is also possible.

Since the purpose of setting the reserved section T of joint work is to basically promote the convenience of the worker's work and shorten the construction period by enabling the use of the length-determined standardized reinforcing bar corresponding to the reference length, a worker may arbitrarily set the reserved section T of joint work for the convenience of work in the field.

It may also be set for each site during design by other designers, shop drawing, or construction.

In addition, for example, during seismic design, in general, the joint point of the column reinforcing bar 30 avoids joints within a quarter of the column length and may be jointed within $2/4$ to $3/4$ of the column length.

Alternatively, it is possible to avoid joints within the lower 500 mm range of the column length, avoid joints within the upper $1/4$ of the column length, and perform joints within 500 mm to $3/4$ of the column length. For example, in a doubly reinforced beam, a horizontal top reinforcement may be jointed in a length of $2/4$ of the center of the beam, and a horizontal bottom reinforcement may be jointed in a range of $1/4$ of the length of both ends.

The range of the reserved section of joint work may be set so that the joint point is located in the section where this stress concentration is relieved.

Within the reserved section T of joint work, even if the joint point is changed to an arbitrary point such as rising or falling, the reserved section T of joint work itself avoids a section where stress is concentrated, and thus, may be a preferable joint point.

Therefore, during construction, the length-determined standardized reinforcing bar or the joint position adjustment reinforcing bar is selectively used in combination so that the butt joint point does not deviate from the reserved section T of joint work. The construction method will be described in detail below.

Next, a construction step (S3) of repeatedly using one or more length-determined standardized reinforcing bars used as the selected reference reinforcing bar is performed. Therefore, it is possible to construct by repeatedly using one or more length-determined standardized reinforcing bars having the same or different lengths.

When the length of the length-determined standardized reinforcing bar used as the reference reinforcing bar is set equal to the reference length, the reinforcement may be completed naturally by continuously repeatedly butt-jointing the length-determined standardized reinforcing bar.

In addition, even if there is some error, when there is no major problem, the reinforcement is completed simply by continuously jointing the length-determined standardized reinforcing bars.

Preferably, the length-determined standardized reinforcing bar having a length most similar to the reference length may be selected and used. Therefore, the length and reference length of the length-determined standardized reinforcing bar are almost similar, and there is only a slight difference in length corresponding to the standardization interval of the length-determined standardized reinforcing bar.

That is, as in this embodiment, for example, it is assumed that reinforcing bars of 2,530 mm, 2,580 mm, 2,630 mm, 2,680 mm, and 2,730 mm are each ready-made at intervals of 50 mm.

However, when the reference length should be 2,600 mm, 2,580 mm or 2,630 mm, which is most similar to 2,600 mm, is selected and used. Therefore, the difference between the reference length and the length-determined standardized reinforcing bar is only 20 mm or 30 mm.

In addition, the length of the length-determined standardized reinforcing bar used repeatedly may have the same length. The length-determined standardized reinforcing bar of a single length may be used repeatedly in the reinforcing bar structure.

That is, even when the length of the length-determined standardized reinforcing bar and the reference length are different, the length of the length-determined standardized reinforcing bar used repeatedly may be the same. Accordingly, it is thought that material management may be facilitated. That is, in the above example, 2,580 mm may be selected and used repeatedly, or 2,630 mm may be selected and used repeatedly.

In addition, a reinforcing bar shorter or longer than the length-determined standardized reinforcing bar may be selected and used in combination with the length-determined standardized reinforcing bar.

That is, by using the reinforcing bar shorter or longer than the length-determined standardized reinforcing bar, a length-determined standardized reinforcing bar used as a reference reinforcing bar and a reinforcing bar having a different length from the length-determined standardized reinforcing bar used as the reference reinforcing bar may be selectively and continuously butt-jointed and constructed.

The reinforcing bar shorter or longer than the length-determined standardized reinforcing bar does not necessarily have to be a length-determined standardized reinforcing bar.

When jointing the reinforcing bar that is shorter than the length-determined standardized reinforcing bar, the joint point changes as much as the length decreases. Conversely, when jointing the reinforcing bar that is longer than the length-determined standardized reinforcing bar, the joint point changes as much as the length increases.

Using these characteristics, the joint point may be flexibly managed when the length-determined standardized reinforcing bar and the reinforcing bar shorter or longer than the length-determined standardized reinforcing bar are selectively used in combination and jointed than when only the length-determined standardized reinforcing bars are jointed as a whole.

Using these characteristics, it is possible to flexibly respond to all reference lengths using the length-determined standardized reinforcing bars.

A reinforcing bar that is shorter or longer than the length-determined standardized reinforcing bar is not necessarily used once or the number of uses per butt joint is not fixed, and during construction, the most preferred embodiment from the related combination group may be used to derive the optimal joint point through any combination.

For example, as in this embodiment, for example, it is assumed that reinforcing bars of 2,530 mm, 2,580 mm, 2,630 mm, 2,680 mm, and 2,730 mm are each ready-made in advance at intervals of 50 mm.

However, the case where the reference length should be 2,600 mm becomes a problem.

In this case, when the length-determined standardized reinforcing bar is set as a 2,630 mm standard product and the actual butt joint occurs, an error as much as +30 mm, which is the difference between the reference length and the length-determined standardized reinforcing bar, occurs.

The amount of error continues to accumulate when the jointing continues n times in continuous sections, so the butt joint point advances as much as +30 mm×n times in the entire section.

Conversely, the length of the length-determined standardized reinforcing bar may be selected about 20 mm shorter than the reference length.

For example, as in this embodiment, for example, it is assumed that reinforcing bars of 2,530 mm, 2,580 mm, 2,630 mm, 2,680 mm, and 2,730 mm are each ready-made in advance at intervals of 50 mm.

However, there is a problem in the case where the reference distance should be 2,600 mm in design.

In this case, when the length-determined standardized reinforcing bar is set as a 2,580 mm standard product and the actual butt joint occurs, an error as much as −20 mm, which is the difference between the reference length and the length-determined standardized reinforcing bar, occurs.

The amount of error continues to accumulate when the jointing continues n times in continuous sections, so the butt joint point retreats as much as −20 mm×n times in the entire section.

As a result, the reserved section T of joint work is separated, so the joint point of the reinforcing bar should be returned to the reserved section T of joint work.

In the above example, a reinforcing bar as short as −30 mm or a reinforcing bar as long as +20 mm is used in combination with a length-determined standardized reinforcing bar in the middle.

The construction step of repeatedly using one or more length-determined standardized reinforcing bars used as the selected reference reinforcing bar will be described in more detail.

First, referring to FIG. 2, construction starts through the step of installing start-section reinforcing bars 22 and 25 at the point where the reinforcing bar structure is to be constructed (S4).

When the joint position adjustment reinforcing bar is to be used, the reserved section T of joint work is set, and the joint work of the length-determined standardized reinforcing bar is performed on the start-section reinforcing bars 22 and 25.

As in the above example, when a reinforcing bar as short as −30 mm or a reinforcing bar as long as +20 mm in the middle is used in combination with a length-determined standardized reinforcing bar, it is necessary to consider whether initial joint points 21 and 24 are positioned at a certain point in the reserved section T of joint work.

For example, the case 20*a* where a reinforcing bar as long as +20 mm in the middle as the column reinforcing bar needs to be jointed is a case where the length of the length-determined standardized reinforcing bar used as the reference reinforcing bar is shorter than the reference length. In this case, it is necessary to consider the height of the start-section reinforcing bar 25 high so that the first joint point 24 is positioned on the upper end portion of the reserved section T of joint work. This is because the height of the joint point 26 gradually decreases in the reserved section T of joint work as it goes up to the upper floor.

Conversely, the case 20b where a reinforcing bar as short as −30 mm in the middle as the column reinforcing bar needs to be jointed is a case where the length of the length-reinforcing bar is longer than the reference length. In this case, it is necessary to consider the height of the start-section reinforcing bar low so that the first joint point 21 is positioned on the lower end portion of the reserved section T of joint work. This is because the height of the joint point 23 gradually increases in the reserved section T of joint work as it goes up to the upper floor.

Next, a step (S5) of repeatedly butt jointing the length-determined standardized reinforcing bar used as the reference reinforcing bar to the start-section reinforcing bar is performed. Since the butt joint device is already integrated with the length-determined standardized reinforcing bar, fast joint work is possible.

When the reserved section T of joint work is set and the joint position adjustment reinforcing bar should be used, as illustrated in FIGS. 18 to 20, if the butt joint point of the n-th section deviates from the range of the reserved section of joint work, the joint position adjustment reinforcing bar 60 is used to return the joint point to the reserved section of joint work.

The length of the joint position adjustment reinforcing bar 60 is selected by appropriately considering a length P of the reinforcing bar deviating the range of the reserved section of joint work.

That is, when the range of the reserved section T of joint work is deviating from the n-th joint point, by butt jointing the joint position adjustment reinforcing bar 60 at any joint point before the n-th section, through the step (S3) of returning the n-th joint point into the reserved section of joint work, in the n-th section, the butt joint point of the length-determined standardized reinforcing bar is returned to the range of the reserved section T of joint work. In this embodiment, the n−1-th section was used.

That is, referring to FIGS. 20 and 21, instead of the length-determined standardized reinforcing bar 50 applied to the n−1-th section, by butt-jointing the joint position adjustment reinforcing bar 60 shorter than the n−1-th reinforcing bar to the n−1-th section, errors are absorbed in the n-th joint section. As a result, a tolerance amount D is secured again.

The length of the joint position adjustment reinforcing bar 60 is appropriately shorter or longer than that of the length-determined standardized reinforcing bar so that the joint point of the reinforcing bar is returned into the reserved section of joint work.

Preferably, the joint position adjustment reinforcing bar 60 may also be a length-determined standardized reinforcing bar integrated with a joint device as a ready-made reinforcing bar.

That is, the joint position adjustment reinforcing bar may be a length-determined standardized reinforcing bar having a different length from the length-determined standardized reinforcing bar used as the reference reinforcing bar.

Accordingly, the length-determined standardized reinforcing bar is repeatedly butt-jointed to the joint position adjustment reinforcing bar, and the above steps are repeated to reach the final section.

Since the reinforcement is made using the length-determined standardized reinforcing bar, it is possible to immediately procure and use the ready-made reinforcing bars that are mass-produced in advance during construction. Accordingly, it is easy to immediately respond to each material in the field. Rapid procurement of materials at all construction sites is possible, and the construction period may be shortened.

Next, a step (S6) of repeating steps (i) to (ii) to reach a final section is performed.

When the final section is reached, the reinforcing bar of the length of the remaining section is butt jointed with the final section work.

By cutting the reinforcing bar to the length of the remaining section or applying the standardized reinforcing bar as soon as the length is the same as the standardized reinforcing bar, the finishing work is done.

As a result, it is possible to implement a construction method of minimizing a material loss, facilitating a material response, shortening a construction period, and minimizing a lap-splice joint.

Hereinafter, the construction step when setting the column reinforcing bar, for example, the reserved section T of joint work, and using the joint position adjustment reinforcing bar will be described in more detail. First, the reference length required for the continuous joint of the column reinforcing bar is determined.

For the column reinforcing bar to be continuously butt-jointed, when the reference length is determined, the number of times of butt joints and the reserved section of joint work may also be determined.

For example, when the reference length is set to 1 floor height and there is one joint point per floor, the number of joint points coincides with the floor number.

When selecting the length-determined standardized reinforcing bar, if the process is performed floor by floor, it may be a standardized reinforcing bar that is smaller or greater than 1 floor height and has a length closest to the floor height.

When the start-section reinforcing bar is installed at the point where the column reinforcing bar is to be constructed in the preliminary stage, this start-section reinforcing bar may be a reinforcing bar buried in the foundation.

In this case, in order to secure the length-determined standardized length, a bending part for embedding in the foundation may be formed on a lower end portion.

In particular, when constructing the column reinforcing bar with the length-determined standardized reinforcing bar, an embodiment of the joint position adjustment reinforcing bar will be described in more detail as follows.

First, 1 floor height is 2,600 mm, a thickness of slab is 200 mm, and the total length of the length-determined standardized reinforcing bar is 2,630 mm. A first joint point on a first floor is 650 mm from a bottom surface of the slab.

From the first floor to the fifteenth floor, the column reinforcing bar is continuously butt-jointed.

For the convenience of worker's work, the range of the reserved section of joint work is set to 650 mm to 770 mm from the bottom surface of each floor.

That is, when the joint point deviates from the range of 650 mm to 770 mm from the bottom surface of the slab of each floor, the joint position adjustment reinforcing bar is used.

Due to a design height of a top floor, which differs minutely from building to building, an error occurs for each building design when the length-determined standardized reinforcing bar is used.

The joint position adjustment reinforcing bar is a reinforcing bar that absorbs a length error in a specific joint section among the joint sections.

By appropriately using the joint position adjustment reinforcing bar, there is an effect of overcoming the joint point error for each floor that is an obstacle to using the standardized reinforcing bar.

Accordingly, the distance between the joint points from the bottom on each floor is as follows.

TABLE 1

| Floor number | Distance between joint points from bottom | Length of length-determined standardized reinforcing bar |
|---|---|---|
| First floor | 650 mm | +2,630 mm |
| Second floor | 680 mm | +2,630 mm |
| Third floor | 710 mm | +2,630 mm |
| Fourth floor | 740 mm | +2,630 mm |
| Fifth floor | 770 mm | +2,630 mm |
| Sixth floor | 800 mm | Need to adjust (Deviation) |

* Range of reserved section of joint work (based on distance between joint points from bottom surface of each floor) 650 mm ≤ joint point ≤ 770 mm As illustrated above, the joint point cumulatively rises by 30 mm as each floor rises.

On the sixth floor, it deviates from the range of the reserved section of joint work, so on the fifth floor, the joint position adjustment reinforcing bar was applied.

Since the joint point on the sixth floor should be returned to 650 mm by the joint position adjustment reinforcing bar, a reinforcing bar as short as 800 mm−650 mm=150 mm should be used on the fifth floor.

Accordingly, a reinforcing bar having a total length of 2,480 mm is used on the fifth floor.

The joint point is returned to 650 mm on the sixth floor by the joint position adjustment reinforcing bar.

TABLE 2

| Floor number | Distance between joint points from bottom | Length of length-determined standardized reinforcing bar |
|---|---|---|
| First floor | 650 mm | +2,630 mm |
| Second floor | 680 mm | +2,630 mm |
| Third floor | 710 mm | +2,630 mm |
| Fourth floor | 740 mm | +2,630 mm |
| Fifth floor | 770 mm | +2,480 mm (joint position adjustment reinforcing bar) |
| Sixth floor | 650 mm | (Return) |

The same 2,630 mm length-determined standardized reinforcing bar is repeatedly butt-jointed for the seventh floor on top of the sixth floor.

TABLE 3

| Floor number | Distance between joint points from bottom | Length of length-determined standardized reinforcing bar |
|---|---|---|
| Sixth floor | 650 mm | +2,630 mm |
| Seventh floor | 680 mm | +2,630 mm |
| Eighth floor | 710 mm | +2,630 mm |

TABLE 3-continued

| Floor number | Distance between joint points from bottom | Length of length-determined standardized reinforcing bar |
|---|---|---|
| Ninth floor | 740 mm | +2,630 mm |
| Tenth floor | 770 mm | +2,630 mm |
| Eleventh floor | 800 mm | Need to adjust (Deviation) |

On the eleventh floor, it deviates again the range of the reserved section of joint work, so on the tenth floor, the joint position adjustment reinforcing bar was applied. Accordingly, a joint position adjustment reinforcing bar having a total length of 2,480 mm is used on the tenth floor.

The joint point is returned to 650 mm on the eleventh floor by the joint position adjustment reinforcing bar.

TABLE 4

| Floor number | Distance between joint points from bottom | Length of length-determined standardized reinforcing bar |
|---|---|---|
| Sixth floor | 650 mm | +2,630 mm |
| Seventh floor | 680 mm | +2,630 mm |
| Eighth floor | 710 mm | +2,630 mm |
| Ninth floor | 740 mm | +2,630 mm |
| Tenth floor | 770 mm | +2,480 mm (Joint position adjustment reinforcing bar) |
| Eleventh floor | 650 mm | (Return) |

In the end, the distance between the joint points from the first floor to the fifteenth floor and the length of the length-determined standardized reinforcing bar length are shown in a table as follows.

TABLE 5

| Floor number | Distance between joint points from bottom | Length of length-determined standardized reinforcing bar |
|---|---|---|
| First floor | 650 mm | +2,630 mm |
| Second floor | 680 mm | +2,630 mm |
| Third floor | 710 mm | +2,630 mm |
| Fourth floor | 740 mm | +2,630 mm |
| Fifth floor | 770 mm | +2,480 mm (Joint position adjustment reinforcing bar) |
| Sixth floor | 650 mm | (Return) |
| Seventh floor | 680 mm | +2,630 mm |
| Eighth floor | 710 mm | +2,630 mm |
| Ninth floor | 740 mm | +2,630 mm |
| Tenth floor | 770 mm | +2,480 mm (Joint position adjustment reinforcing bar) |
| Eleventh floor | 650 mm | (Return) |
| Twelfth floor | 680 mm | +2,630 mm |
| Thirteenth floor | 710 mm | +2,630 mm |
| Fourteenth floor | 740 mm | +2,630 mm |
| Fifteenth floor | 770 mm | (Final section) |

In the final section on the fifteenth floor, considering the joint point height of 770 mm at the floor height of 2,600 mm, the remaining length is 1,830 mm. In the case of forming a hook for fixing the top floor here, when the bending length is 200 mm, the total length of the finishing reinforcing bar is 2,030 mm. In the end, when deviating from the sixth floor, the joint position adjustment reinforcing bar is jointed to the fifth floor, and when deviating from the eleventh floor, the joint position adjustment reinforcing bar is jointed to the 10th floor. Therefore, when the joint position adjustment reinforcing bar is jointed to the n−1-th floor when deviating from the range of the reserved section of joint work in the n-th floor, the joint point is returned into the range of the reserved section of joint work in the n-th floor and does not deviate from the range of the reserved section of joint work.

The position of the joint position reinforcing bar does not have to be on the n−1-th floor, and may be adjusted to a predetermined position below the n−2-th floor.

The above embodiment is an embodiment in which the length of the length-determined standardized reinforcing bar is selected longer than 1 floor height which is the reference length.

That is, the above embodiment is an embodiment in which the length of the length-determined standardized reinforcing bar is selected to be about 30 mm longer than the reference length.

Unlike the above embodiment, the length of the length-determined standardized reinforcing bar may be selected shorter than 1 floor height which is the reference length.

Hereinafter, an embodiment in which the length of the length-determined standardized reinforcing bar is selected about 20 mm shorter than the floor height, contrary to the above embodiment, will be briefly described.

For example, as in this embodiment, for example, it is assumed that reinforcing bars of 2,530 mm, 2,580 mm, 2,630 mm, 2,680 mm, and 2,730 mm are each ready-made in advance at intervals of 50 mm.

However, there is a problem in the case where the reference distance should be 2,600 mm in design.

In this case, when the length-determined standardized reinforcing bar is set as a 2,580 mm standard product and the actual butt joint occurs, an error as much as −20 mm, which is the difference between the distance between the joint points and the length-determined standardized reinforcing bar, occurs.

The amount of error continues to accumulate when the jointing continues n times in continuous sections, so the height of the joint point is lowered as much as −20 mm×n times in each section.

As a result, the joint point in the n-th floor deviates from the reserved section of joint work.

Then, referring to FIGS. 20 and 21, instead of the length-determined standardized reinforcing bar applied to the n−1-th section, by butt-jointing the joint position adjustment reinforcing bar longer than the n−1-th reinforcing bar to the n−1-th section, errors are absorbed in the n-th joint section. As a result, the tolerance is secured again.

In the end, it is considered that error absorption is possible even if the length of the length-determined standardized reinforcing bar is shorter or longer than the reference length.

As a result, for each reference length, one joint point occurs according to each joint.

Each butt joint is formed within the set range of the reserved section of joint work so that each continuously connected butt joint does not deviate from the reserved section of joint work set in each reference length.

Furthermore, an embodiment in which two floor heights are determined as a reference length will be described.

First, for the reference length, two floor heights are a thickness of slab is 200 mm, and the total length of the length-determined standardized reinforcing bar is 5,230 mm. A first joint point on a first floor is 650 mm from the bottom surface of the slab.

From the first floor to the fifteenth floor, the column reinforcing bar is continuously butt-jointed.

For the convenience of worker's work, the range of the reserved section of joint work is set to 650 mm to 770 mm from the bottom of each floor.

That is, when the joint point deviates from the range of 650 mm to 770 mm from the bottom surface of the slab of each floor, the joint position adjustment reinforcing bar is used.

For example, as in this embodiment, for example, it is assumed that reinforcing bars of 5,080 mm, 5,130 mm, 5,180 mm, and 5,280 mm are each ready-made in advance at intervals of 50 mm.

However, this is a case where the reference length should be 5,200 mm.

In this case, when the length-determined standardized reinforcing bar is set as a 5,230 mm standard product and the actual butt joint occurs, an error as much as +30 mm, which is the difference between the reference length and the length-determined standardized reinforcing bar, occurs.

The amount of error continues to accumulate when the jointing continues n times in continuous sections, so the butt joint point advances as much as +30 mm×n times in the entire section.

As a result, the reserved section T of joint work is separated, so the joint point of the reinforcing bar should be returned to the reserved section T of joint work.

TABLE 6

| Floor number | Distance between joint points from bottom | Length of length-determined standardized reinforcing bar |
| --- | --- | --- |
| First floor | 650 mm | +5,230 mm |
| Second floor | No joint | |
| Third floor | 680 mm | +5,230 mm |
| Fourth floor | No joint | |
| Fifth floor | 710 mm | +5,230 mm |
| Sixth floor | No joint | |
| Seventh floor | 740 mm | +5,230 mm |
| Eighth floor | No joint | |
| Ninth floor | 770 mm | +5,180 mm (Joint position adjustment reinforcing bar) |
| Tenth floor | No joint | |
| Eleventh floor | 650 mm | (Return) |
| Twelfth floor | No joint | |
| Thirteenth floor | 680 mm | +5,230 mm |
| Fourteenth floor | No joint | |
| Fifteenth floor | 710 mm | (Final section) |

As shown in the table, the joint position adjustment reinforcing bar is used only once in ninth floor. That is, except for joint only once, all joints were made with the length-determined standardized reinforcing bars used as the reference reinforcing bar. The entire joint place is also only 8 times. Furthermore, an embodiment in which 3 floors heights are determined as a reference length will be described.

First, for the reference length, 3 floors heights are 7,800 mm, a thickness of slab is 200 mm, and the total length of the length-determined standardized reinforcing bar is 7,830 mm. A first joint point on a first floor is 650 mm from the bottom surface of the slab.

From the first floor to the fifteenth floor, the column reinforcing bar is continuously butt-jointed.

For the convenience of worker's work, the range of the reserved section of joint work is set to 650 mm to 770 mm from the bottom of each floor.

That is, when the joint point deviates from the range of 650 mm to 770 mm from the bottom surface of the slab of each floor, the joint position adjustment reinforcing bar is used.

For example, as in this embodiment, for example, it is assumed that reinforcing bars of 7,680 mm, 7,630 mm, 7,780 mm, 7,830 mm, and 7,880 mm are each ready-made in advance at intervals of 50 mm.

However, this is a case where the reference length should be 7,800 mm.

In this case, when the length-determined standardized reinforcing bar is set as a 7,830 mm standard product and the actual butt joint occurs, an error as much as +30 mm, which is the difference between the reference length and the length-determined standardized reinforcing bar, occurs.

The amount of error continues to accumulate when the jointing continues n times in continuous sections, so the butt joint point advances as much as +30 mm×n times in the entire section.

As a result, the reserved section T of joint work is separated, so the joint point of the reinforcing bar should be returned to the reserved section T of joint work.

TABLE 7

| Floor number | Distance between joint points from bottom | Length of length-determined standardized reinforcing bar |
| --- | --- | --- |
| First floor | 650 mm | +7,830 mm |
| Second floor | No joint | |
| Third floor | No joint | |
| Fourth floor | 680 mm | +7,830 mm |
| Fifth floor | No joint | |
| Sixth floor | No joint | |
| Seventh floor | 710 mm | +7,830 mm |
| Eighth floor | No joint | |
| Ninth floor | No joint | |
| Tenth floor | 740 mm | +7,830 mm |
| Eleventh floor | No joint | |
| Twelfth floor | No joint | |
| Thirteenth floor | 770 mm | +7,830 mm |
| Fourteenth floor | No joint | |
| Fifteenth floor | No joint | (Final section) |

As shown in the table, no joint position adjustment reinforcing bars needed to be used. All were jointed into a length-determined standardized reinforcing bar used as a reference reinforcing bar. The entire joint place is only 5 times. Furthermore, an embodiment in which 4 floors heights are determined as a reference length will be described.

First, for the reference length, 4 floors heights are a thickness of slab is 200 mm, and the total length of the length-determined standardized reinforcing bar is A first joint point on a first floor is 650 mm from the bottom surface of the slab.

From the first floor to the fifteenth floor, the column reinforcing bar is continuously butt-jointed.

For the convenience of worker's work, the range of the reserved section of joint work is set to 650 mm to 770 mm from the bottom of each floor.

That is, when the joint point deviates from the range of 650 mm to 770 mm from the bottom surface of the slab of each floor, the joint position adjustment reinforcing bar is used.

For example, as in this embodiment, for example, it is assumed that reinforcing bars of 10,280 mm, 10,330 mm, 10,380 mm, and 10,480 mm are each ready-made in advance at intervals of 50 mm.

However, this is a case where the reference length should be 10,400 mm.

In this case, when the length-determined standardized reinforcing bar is set as a 10,430 mm standard product and the actual butt joint occurs, an error as much as +30 mm, which is the difference between the reference length and the length-determined standardized reinforcing bar, occurs.

The amount of error continues to accumulate when the jointing continues n times in continuous sections, so the butt joint point advances as much as +30 mm×n times in the entire section.

As a result, the reserved section T of joint work is separated, so the joint point of the reinforcing bar should be returned to the reserved section T of joint work.

TABLE 8

| Floor number | Distance between joint points from bottom | Length of length-determined standardized reinforcing bar |
| --- | --- | --- |
| First floor | 650 mm | +10,430 mm |
| Second floor | No joint | |
| Third floor | No joint | |
| Fourth floor | No joint | +10,430 mm |
| Fifth floor | 680 mm | |
| Sixth floor | No joint | |
| Seventh floor | No joint | +10,430 mm |
| Eighth floor | No joint | |
| Ninth floor | 710 mm | |
| Tenth floor | No joint | +10,430 mm |
| Eleventh floor | No joint | |
| Twelfth floor | No joint | |
| Thirteenth floor | 740 mm | +10,430 mm |
| Fourteenth floor | No joint | |
| Fifteenth floor | No joint | (Final section) |

As shown in the table, no joint position adjustment reinforcing bars needed to be used. All were jointed into a length-determined standardized reinforcing bar used as a reference reinforcing bar. The entire joint place is only 4 times. In the above embodiments, when the reference length is 1 floor height, two joint position adjustment reinforcing bars are required, and when the reference length is two floor heights, one joint position adjustment reinforcing bar is required, and when the reference length is 3 floors heights or 4 floors heights, zero joint position adjustment reinforcing bars were required.

In addition, the length-determined standardized reinforcing bars used as the reference reinforcing bars used repeatedly have the same length, and the reinforcing bar used as the joint position adjustment reinforcing bar was also the length-determined standardized reinforcing bar.

However, the length-determined standardized reinforcing bar used as the joint position adjustment reinforcing bar was a length-determined standardized reinforcing bar that was one step shorter in dimension than the length-determined standardized reinforcing bar used repeatedly.

Accordingly, two types of reinforcing bars having different lengths were used on the fifth and tenth floors when the reference length having joint position adjustment is 1 floor height and on the ninth floor when the reference length was is 2 floors height. Accordingly, in the next floor, the joint point could be returned into the range of the reserved section of joint work.

That is, in the reference length section where joint position adjustment is made, two reinforcing bars with different lengths are used and jointed within one reference length section.

Furthermore, a 15-floor column reinforcing bar could be completed with only a length-determined standardized reinforcing bar without the need for joint position adjustment during construction by using a reference length of more than 3 floors heights.

Of course, the length-determined standardized reinforcing bars used repeatedly have the same length.

Furthermore, in the length-determined standardized reinforcing bar used for the beam and the column, the length-determined standardized reinforcing bar used for the column may be used for the beam, or the length-determined standardized reinforcing bars used for the beam may be used for the column.

For example, when the length-determined standardized reinforcing bar used for the column and the length-determined standardized reinforcing bar used for the beam are of the same length and standard, the length-determined standardized reinforcing bar used for the column is used for the beam as it is or the length-determined standardized reinforcing bar used for the beam may be used for the column as it is.

Therefore, the length-determined standardized reinforcing bars used for the beam and the column may be used and constructed in common without distinction.

Furthermore, it is considered that it may be carried out with reference to the above embodiment not only in the case of sequentially butt-jointing the length-determined standardized reinforcing bars from bottom to top, but also in the case of top-down jointing by sequentially butt-jointing the length-determined standardized reinforcing bars from top to bottom.

Therefore, even if the length-determined standardized reinforcing bar integrated with a joint device is mass-produced and ready-made in advance for each unit of determined standardized length, the reinforcing bar structure may be manufactured using these ready-made reinforcing bars.

As a result, it is possible to reduce the cutting waste loss of the reinforcing bar and also reduce the cost and time required for the cutting process of the reinforcing bar.

Accordingly, it is possible to convert reinforcing bar materials having raw material properties into materials into ready-made properties through mass production. By pre-producing the required quantity in advance according to consumption forecast, it is possible to produce in advance a sufficient quantity for immediate use.

According to a method for constructing a reinforcing bar structure by a length-determined standardized reinforcing bar integrated with a butt joint device of the present invention, it is possible to continuously jointing the reinforcing bars with a butt joint rather than a lap-splice joint in a section where the reinforcing bars should be continuously jointed. Therefore, it is possible to realize economic feasibility by reducing the required amount of reinforcing bar.

Describing in more detail the reinforcing bar, which is standardized with the butt joint device integrated and standardized, first, the material of the reinforcing bar is determined, and the length-determined standardized length dimension, which is the length standard from one end to the other end, is determined and imparted to the reinforcing bar to be cut.

In order to integrate the joint device with the reinforcing bar in advance, it is a prerequisite that the length of the reinforcing bar should be standardized by imparting a length-determined standardized length dimension.

If the length of the reinforcing bar is not standardized, the reinforcing bar must be cut and used, so it is difficult to integrate the joint device with the reinforcing bar in advance.

That is, this is because when cutting the reinforcing bar, the joint device integrated with the reinforcing bar is also cut and removed.

The length-determined standardized length dimension may be determined on the basis of millimeters, centimeters, meters, or inches. Accordingly, it may be formed in a predetermined length dimension or manufactured to have a length dimension system including steps at predetermined intervals.

There are various ways to determine the length-determined standardized length dimension. For example, reinforcing bar producers may arbitrarily predict and set the standard that is expected to have the most demand, or it may be determined by orders from other related parties such as civil engineering and architectural design groups or construction companies.

Alternatively, targeting the length between butt joint points that commonly appear frequently in related reinforcing bar concrete structures, it may be set to lengths that are approximately shorter or longer than the length between the joint points.

For example, as in the embodiment, the reference length may be one-floor length, two-floor length, three-floor length, or four-floor length of a building, or may be formed in once, twice, three times, or four times a length of a beam connecting between columns.

Therefore, after calculating the floor height or beam length that appears most frequently using a statistical analysis method (e.g., standard normal distribution), the length having the most significant value may be set as the length-determined standardized reinforcing bar length.

Next, the reinforcing bar is cut to a length-determined standardized length according to the imparted length dimension. The reinforcing bar is cut to the exact length according to the imparted length dimension, and therefore, becomes a reinforcing bar cut according to the length-determined standardized length dimension.

Alternatively, the reinforcing bar may be customized according to the imparted length dimension, such as adjusting a stopper position of the reinforcing bar production line so that a separate cutting process is not required from the reinforcing bar manufacturing step.

Next, the butt joint device is formed at one end or both ends of the reinforcing bar cut into a determined length by the standardized length to produce the length-determined standardized reinforcing bar integrated with a joint device into the ready-made product.

Depending on the type of device that butt-joints the reinforcing bar, works such as threading, screw member jointing, threaded sleeve coupling, jointing end member jointing, etc., should be performed, so the most appropriate type of joint device is selected. There are various types of devices for butt-jointing the reinforcing bar.

Next, the butt joint device is formed at one end or both ends of the reinforcing bar cut into a determined length by the standardized length to produce the length-determined standardized reinforcing bar integrated with a joint device into the ready-made product.

In a state where the length is standardized according to the material and diameter of the reinforcing bar, the joint device is integrally formed at one or both ends.

In the length-determined standardized reinforcing bar integrated with a joint device, there are various types of reinforcing bars such as reinforcing bars with deformed joints.

There are various joint methods, but in particular, in the mechanical joint method, a means for butt jointing should be formed separately at the end portion of the reinforcing bar.

However, according to the present invention, a length-determined standardized reinforcing bar integrated with a joint device are mass-produced and ready-made, so they may be immediately supplied to the site as needed, thereby facilitating all works for jointing of the reinforcing bar and shortening the construction period.

When constructing the length-determined standardized reinforcing bar, it is possible to minimize the work of cutting the reinforcing bar.

The process is a standardization method by a length-determined standardized reinforcing bar. For example, the reinforcing bar structure may be formed through a) arbitrarily determining and preparing, by a producer, a material and a diameter of a reinforcing bar, regardless of an orderer, b) arbitrarily determining, by the producer, a length and cutting the reinforcing bar, c) determining a material, a diameter, and a length dimension to ready-make the reinforcing bar, d) selecting a type of joint coupler at a producer's discretion and directly screwing the reinforcing bar or screw part welding connection to the reinforcing bar to form a joint device, thereby completing a length-determined standardized reinforcing bar, e) retaining or storing, by a producer or a seller, length-determined standardized reinforcing bars for each material, diameter, and length, f) arbitrarily determining, by the producer, the length according to the material and diameter and forming a joint device to provide standardized information on the standardized reinforcing bar member, thereby a purchaser immediately purchasing a desired product, g) transporting, by the purchaser, the product to a desired place, and h) since there is almost no matched length desired in the field, selecting a reinforcing bar closest to the desired length, setting a safe and convenient section to perform joint work to execute the joint, and when an error range causes inconvenience to joint work, performing jointing with a long or short joint position adjustment reinforcing bar.

Therefore, in order to form a reinforcing bar structure having a column and a beam into a length-determined standardized reinforcing bar, preferably, a plurality of length-determined standardized reinforcing bars may each be formed with a differentiated length according to a predetermined standard difference to apply to 1 to 4 times a floor height or 1 to 4 times a length of a beam connecting between columns.

If necessary, a plurality of length-determined standardized reinforcing bars integrated with a butt joint device may be pre-assembled to form a pre-assembled reinforcing bar net by the length-determined standardized reinforcing bar, and a plurality of joint position adjustment reinforcing bars may also be pre-assembled to form the pre-assembled reinforcing bar net by the joint position adjustment reinforcing bar.

Therefore, by using a pre-assembled reinforcing bar net that is fabricated on-site as a length-determined standardized reinforcing bar or joint position adjustment reinforcing bar or pre-assembled reinforcing bar net by a length-determined standardized reinforcing bar that is transported to the site after factory production or a pre-assembled reinforcing bar net by a joint position adjustment reinforcing bar, it is possible to rapidly form the reinforcing bar structure.

In the above embodiment, the length of the length-reinforcing bar is the same, but is not limited to the above embodiment.

In other words, the length of the length-determined standardized reinforcing bar used as the reference reinforcing bar may be used differently between the length-determined standardized reinforcing bars used as the reference reinforcing bar in various cases such as on-site situations and excessive or insufficient inventory of the length-determined standardized reinforcing bars.

Similarly, even in the case of joint position adjustment reinforcing bars, the length of the joint position adjustment reinforcing bars used may be used differently between the joint position adjustment reinforcing bars.

Another embodiment will be described below.

A first embodiment is a bottom-up joint method. First, in the case of modifying the above-described embodiment and jointing up to the 30th floor, a joint is performed starting from a joint point of 650 mm using a 2,630 mm length-determined standardized reinforcing bar and a 2,480 mm joint position adjustment reinforcing bar, and a joint position adjustment reinforcing bar is used on sixth, eleventh, sixteenth, 21th, and 26th floors.

This is shown in graph, which is as illustrated in FIG. 34A. In other words, whenever the joint position adjustment reinforcing bar is used, as can be seen on the graph, there is a rapid change in the joint point. In other words, it is an embodiment in which the joint position is gradually increased and then rapidly adjusted by using the bottom-up joint method.

A second embodiment is a top-down joint method. A joint is performed starting from a joint point of 770 mm using a 2,580 mm length-determined standardized reinforcing bar and a 2,720 mm joint position adjustment reinforcing bar, and a joint position adjustment reinforcing bar is used on eighth, fifteenth, 22th, and 29th floors.

This is shown in graph, which is as illustrated in FIG. 34B. In other words, whenever the joint position adjustment reinforcing bar is used, as can be seen on the graph, there is a rapid change in the joint point. In other words, it is an embodiment in which the joint position is gradually increased and then rapidly adjusted by using the top-down joint method.

The length-determined standardized reinforcing bar used as the reference reinforcing bar may be selected from two reinforcing bars having different lengths. That is, one reinforcing bar may be a shortened length-determined standardized reinforcing bar shorter than the reference length, and the other reinforcing bar may be an extended length-determined standardized reinforcing bar longer than the reference length. In this case, the length standard deviation from the reference length may have the same deviation or different deviations.

During the constructing, a case where the shortened length-determined standardized reinforcing bar and the extended length-determined standardized reinforcing bar are alternately jointed one by one, a case where the shortened length-determined standardized reinforcing bars are jointed once and the extended length-determined standardized reinforcing bars are jointed twice or more, a case where the shortened length-determined standardized reinforcing bar is jointed twice or more and the extended length-determined standardized reinforcing bar is jointed once, or a case where the shortened length-determined standardized reinforcing bar is jointed twice or more and the extended length-determined standardized reinforcing bar may also be jointed twice or more is selectively performed to reach the final section.

In the third embodiment and the fourth embodiment, 2,580 mm products and 2,630 mm products are continuously jointed according to a basic alternating pattern.

Compared to the reference length of 2,600 mm, the shortened length-determined standardized reinforcing bar of 2,580 mm is −20 mm shorter, and the extended length-determined standardized reinforcing bar of 2,630 mm is +30 mm longer. Therefore, since the length dimension deviation is equal, the joint point gradually increases when simply jointing the two length-determined standardized reinforcing bars alternately once each.

Accordingly, the third embodiment is an embodiment in which when the joint point is lowered and then reached near 650 mm point by jointing the shortened length-determined standardized reinforcing bar twice and jointing the extended length-determined standardized reinforcing bar once, starting from the joint point 710 mm, the extended length-determined standardized reinforcing bars are jointed once and the shortened length-determined standardized reinforcing bar are jointed once to gradually increase the joint length again.

This is shown in graph, which is as illustrated in FIG. 34C. In other words, the joint point may be managed by selectively combining patterns of alternating the shortened, extended length-determined standardized reinforcing bars.

A fourth embodiment is a case where the shortened length-determined standardized reinforcing bars are jointed twice or more and the extended length-determined standardized reinforcing bars are jointed twice or more.

This is shown in graph, which is as illustrated in FIG. 34D.

The jointing may begin from the start-section reinforcing bar selected from the shortened or extended length-determined standardized reinforcing bars, and structural performance of the reinforcing bar structure may be the same whether the jointing is first started with either a shortened or extended length-determined standardized reinforcing bar.

The fifth embodiment is a case where a shortened length-determined standardized reinforcing bar and an extended length-determined standardized reinforcing bar are alternately jointed one by one.

This is an embodiment in which the reference length is 2,600 mm, the shortened length-determined standardized reinforcing bar of 2,550 mm and the extended length-determined standardized reinforcing bar of 2,650 mm are used. That is, unlike the one embodiment or the first to fourth embodiments, this is an embodiment using two types of length-determined standardized reinforcing bars having the same length standard deviation of 50 mm away from the reference length. The joint point starts at 710 mm and the shortened length-determined standardized reinforcing bar of 2,550 mm is jointed, and as the jointing proceeds, −50 mm and +50 mm alternately appear in the incremental amount, and 710 mm and 660 mm alternately appear in the joint point as well.

When the reference length is 2,610 mm, the deviation of the shortened length-determined standardized reinforcing bar of 2,550 mm is −60 mm and the deviation of the extended length-determined standardized reinforcing bar of 2,650 mm is +40 mm, but the deviation from the reference length is not a big problem for the joint point management because the jointing is made alternately one at a time.

The third and fourth embodiments are cases in which the shortened length-determined standardized reinforcing bar and the extended length-determined standardized reinforcing bar have different deviations, and the fifth embodiment is a case in which they have the same deviation.

The first to fifth embodiments are also embodiments of the same method even in the case of using the pre-assembled reinforcing bar net by the length-determined standardized reinforcing bar and the pre-assembled reinforcing bar net by the joint position adjustment reinforcing bar.

Furthermore, the length-determined standardized reinforcing bar used as the reference reinforcing bar may be selected from three or more reinforcing bars having different lengths. Accordingly, various embodiments are possible depending on the on-site situations, such as a combination of the extended, shortened, and extended length-determined standardized reinforcing bars or a combination of extended, shortened, and shortened length-determined standardized reinforcing bars.

In addition, the above third to fifth embodiments may also be implemented by further including a joint position adjustment reinforcing bar.

Accordingly, as described above, according to the present invention, by combining the above embodiments in which a reinforcing bar structure is formed in one type of length-determined standardized reinforcing bar, a reinforcing bar structure is formed in two types of reinforcing bars, length-determined standardized reinforcing bar and joint position adjustment reinforcing bar, a reinforcing bar structure is formed in two types of length-determined standardized reinforcing bars, shortened and extended types, three or more length-determined standardized reinforcing bars are used, or shortened and extended length-determined standardized reinforcing bars and joint position adjustment reinforcing bars are combined, it is possible to form the reinforcing bar structure.

Therefore, the alternating pattern for continuous butt joint construction of length-determined standardized reinforcing bars can also be implemented to suit the situation of each site by deriving an application pattern based on the above basic pattern as needed.

On the other hand, there are various types of joint devices, and the method using a screw thread may be selected from the selection group of a case where the male screw part is formed only on one end portion of the reinforcing bar, a case where the female screw part is formed only on one end portion, a case where the male screw part is formed on both end portions, and a case where the female screw part is formed on one end portion and the female screw part is formed on the other end portion.

There are various methods for forming a male screw part on a length-determined standardized reinforcing bar.

For example, it is possible to directly form the screw on the end portion of the reinforcing bar by swaging and rolling the end portion of the length-determined standardized reinforcing bar, or cutting after inflating.

Referring to FIG. 4, a male screw part by a cylindrical screw 85 is directly formed on one end portion of the length-determined standardized reinforcing bar 84, or a cylindrical screw part by a cylindrical screw 87 may be directly formed on both end portions of the length-determined standardized reinforcing bar 86.

Referring to FIG. 6, a male screw part by a conical screw 105 may be directly formed on one end portion of a length-determined standardized reinforcing bar 104, or a male screw part by a conical screw 107 may be directly formed on both end portions of a length-determined standardized reinforcing bar 106.

Alternatively, as illustrated in FIGS. 4, 6, and 12, the screw members 80, 100, and 160 having a screw thread formed in a predetermined section from one end to the other end may be integrated and welded to the end portion of the length-determined standardized reinforcing bars 81, 101, and 161 by extension.

The method of forming a female screw part is to integrally weld members 82, 102, and 162, which is open to one side and has the female screw part formed on the inner circumferential surface, to end portions of length-determined standardized reinforcing bars 83, 103, and 163 by extension.

As the reinforcing bar becomes more and more high-strength, it is difficult to screw directly into the reinforcing bar, and in particular, as cutting screw processing for the reinforcing bar damages the fibrous structure, it is difficult to apply to ultra-high strength reinforcing bars of SD600 or higher.

Accordingly, the ultra-high-strength reinforcing bar preferably forms a male screw part for mechanical jointing by solid-welding the screw member to the reinforcing bar.

There are various welding methods when forming the male screw part and the female screw part, including friction welding, stud welding, electron beam welding, laser welding, $CO_2$ welding, argon welding, butt welding, flash welding, and the like. During the friction welding, the flash 90 may be removed if necessary.

In addition, referring to FIG. 16, the reinforcing bar coupler 180 may be temporarily coupled to the male screw part 181 in advance.

That is, the coupler 180 member having female screws formed in both directions are temporarily coupled in the hollow cylindrical body, and the butt joint is performed using the temporarily coupled reinforcing bar coupler during joint construction.

The screw type of the female screw may be a cylindrical screw, a conical screw, a cylindrical-conical integrated screw, or the like.

Referring to FIG. 5, in the male screw part, a cylindrical screw member 92 having a cylindrical male screw part 91 formed on an outer circumferential surface is integrally welded to an end portion of a length-determined standardized reinforcing bar 93 by extension.

According to the embodiment, in order to increase a ratio of a cross-sectional area of the cylindrical screw member 92 to a cross-sectional area of the reinforcing bar 93 to be jointed, it may be a joint having improved load capacity by forming the reinforcing bar 93 so that a corrugated diameter is expanded compared to the diameter of the reinforcing bar 93.

That is, the cylindrical screw member 92 may be formed to have a corrugated diameter greater than the diameter of the reinforcing bar 93, and the cylindrical screw member 92 having a large corrugated diameter may be integrally welded to the end portion of the length-determined standardized reinforcing bar 93 by extension.

In the case of cutting the reinforcing bar 93, it is necessary to inflate in order not to reduce the bone diameter, but in the case of welding a separate member, a cumbersome inflation process is unnecessary.

When the member with a larger cross-sectional area than the reinforcing bar 93 is welded, it is considered that the load capacity may be improved.

Accordingly, as an embodiment in which the joint device is formed in the standard-sided reinforcing bar 93, an embodiment in a case 94 where a cylindrical male screw part 91 is formed only in one end portion, a case 95 where a cylindrical female screw part 99 is formed only in one end portion, a case 96 where the cylindrical male screw part is formed in both end portions, a case 98 where the cylindrical female screw part is formed on both end portions, a case 97 where the cylindrical male screw part is formed in one end portion and the cylindrical female screw part is formed in the other end portion is possible.

In this case, the length-determined standardized reinforcing bar 93 is jointed to the joint device by a cylindrical screw.

Referring to FIG. 3, the cylindrical screw coupling structure may be a case where a cylindrical female screw part 30 is formed in the end portion of one length-determined standardized reinforcing bar, and a cylindrical male screw part 31 is formed in the end portion of the other length-determined standardized reinforcing bar so that the male and female cylindrical screw parts 30 and 31 are screwed together to form a direct joint between the length-determined standardized reinforcing bar and the length-determined standardized reinforcing bar without a separate coupler or a case where the cylindrical male screw parts 33 are formed in the end portions of the two length-determined standardized reinforcing bars to be jointed facing the end portions, respectively, and a separate coupler 32 is formed by screwing the cylindrical male screw part 33 to both ends.

Referring to FIG. 7, as the embodiment in which the joint device is formed in a length-determined standardized reinforcing bar 110, an embodiment in a case 113 where a conical male screw part 111 is formed only in one end portion, a case 114 where a conical female screw part 112 is formed only in one end portion, a case 115 where the conical male screw part is formed in both end portions, a case 117 where the conical female screw part is formed in both end portions, and a case 116 where the conical male screw part is formed in one end portion and the conical female screw part is formed in the other end portion is possible.

In this case, the length-determined standardized reinforcing bar 110 is jointed to the joint device by a conical screw.

In the case of the conical screw, the angle of inclination may be between 6° and 22° with respect to the central axis line.

In addition, in the case of the conical screw, the screw thread may be formed so that fastening is preferably completed in about 3 and a half to 4 and a half turns.

In addition, the male screw part or the female screw part may be composed of the cylindrical-conical integrated screw coupling structure.

Referring to FIG. 13, the cylindrical-conical integrated screw includes a cylindrical-conical integrated female screw part 21 and a cylindrical-conical integrated male screw part 31.

The cylindrical-conical integrated female screw part 21 is integrally formed with a cylindrical female screw part P1 formed of a cylindrical screw thread on the inner diameter and a conical female screw part T1 having a narrow inner diameter at one end of the cylindrical female screw part P1.

Since the cylindrical female screw part P1 and the conical female screw part T1 are formed side by side on the inside diameter in the inward direction, the conical female screw part T1 is positioned on the inside of the cylindrical female screw part P1.

The cylindrical-conical integrated female screw part 31 is integrally formed with a cylindrical male screw part P2 formed of a cylindrical screw thread on an outer diameter and a conical male screw part T2 having a narrow outer diameter at one end of the cylindrical male screw part P2.

It is a structure in which the conical screw threads T1 and T2 and the cylindrical screw threads P1 and P2, which are formed in mutually corresponding standards for screw coupling, are each screwed into a structure in which male and female are engaged with each other.

To this end, an inner diameter DP1 (minor diameter) of the cylindrical female screw part P1 is formed to be greater than a maximum inner diameter DT1 of the conical female screw part T1.

That is, the conical female screw part T1 is formed so that the inner diameter gradually increases in the direction of the cylindrical female screw part P1, but the maximum inner diameter DT1 of the conical female screw part T1 is smaller than the inner diameter DP1 of the cylindrical female screw part P1.

In addition, an outer diameter DP2 (major diameter) of the cylindrical male screw part P2 is formed to be greater than a maximum outer diameter DT2 of the conical male screw part T2.

That is, the outer diameter of the conical male screw part T2 is formed to gradually increase in the direction of the cylindrical male screw part P2, but the maximum outer diameter DT2 of the conical male screw part T2 is formed to be smaller than the outer diameter DP2 of the cylindrical male screw part P2.

Accordingly, the structure in which the conical screw threads T1 and T2 and the cylindrical screw threads P1 and P2 form a screw thread in which both male and female are engaged with each other may be achieved.

Furthermore, the screw thread discontinuous parts 23 and 33 are formed between the cylindrical female screw part P1 and the conical female screw part T1 and between the cylindrical male screw part P2 and the conical male screw part T2, respectively.

The discontinuous parts 23 and 33 have various shapes and methods as long as the screw threads are discontinuous. For example, it is possible to process and form a recessed part formed in a band shape in the circumferential direction. That is, a series of configurations of the conical screw part-recessed part-cylindrical screw part (T1-23-P1, T2-33-P2) are obtained by the recessed part. As a result, the thread of the conical screw part is not continuous.

However, it is not necessary to form the above recessed part for discontinuity of the screw thread, and various configurations for discontinuity of the screw thread are included.

When the screw thread is discontinuous, the screwing is easy, and the cylindrical female screw part P1 or the cylindrical male screw part P2 may each be formed in any diameter standard without needing to be related to the maximum inner diameter DT1 of the conical female screw part T1 or the maximum outer diameter DT2 of the conical male screw part T2.

Accordingly, the effective sectional area of the conical screw part and the cylindrical screw part are added, so that load capacity such as tensile force may be obtained.

For the efficient and rapid screwing, the inner diameter DP1 of the cylindrical female screw part P1 is formed to be greater than the maximum outer diameter DT2 of the conical male screw part T2.

With this configuration, unnecessary interference between screw threads can be fundamentally avoided during screw coupling work.

Through this, when the cylindrical-conical integrated female screw part 21 and the cylindrical-conical integrated male screw part 31 are screwed together, the male and female cylindrical screw part and the male and female conical screw part are simultaneously coupled, respectively, by using this action, there is an effect of enabling a configuration in which all cylindrical-conical integrated screw threads are coupled without omission while reducing the number of coupling rotations.

In other words, due to the configuration in which the conical screw threads T1 and T2 and the cylindrical screw threads P1 and P2 form screw threads that both male and female are engaged with each other, there is an effect that the male and female cylindrical screw parts P1 and P2 and the male and female conical screw parts T1 and T2 achieves simultaneous coupling.

In addition, when the coupling is completed, the conical screw threads T1 and T2 and the cylindrical screw threads P1 and P2 are mutually tightened, so that the coupling between the screw threads may be locked without a separate locking nut.

Referring to the X1 drawing of FIG. 14, in the case of a conventional embodiment in which a conical screw and a cylindrical screw are simply combined, the maximum outer diameter of the conical screw and the outer diameter of the cylindrical screw are the same, so mutual interference occurred between the female screw 35 and the male screw 34 during insertion (36). As a result, the temporary coupling depth D1 is limited, and the conical screw may not be deeply inserted and temporarily coupled without screw rotation.

However, according to the present invention, as shown in the X2 drawing of FIG. 21, the female screw body and the male screw body are formed so that the inner diameter of the cylindrical female screw part is greater than the maximum outer diameter of the conical male screw part, so the conical screw parts may contact each other (37) and the cylindrical screw parts may be spaced apart from each other upon completion of the temporary coupling (38). In the end, since the depth of temporary coupling is determined depending on whether the conical screw part and the cylindrical screw part are in contact, the depth of the temporary coupling in the X2 drawing is deeper than in the X1 drawing.

That is, the male screw body may be inserted into the female screw body and temporarily coupled without screw rotation up to the coupling start point between the conical screw threads of the male and female conical screw parts, the simultaneous coupling start point between the conical screw thread of the male and female conical screw parts and the cylindrical screw thread of the male and female cylindrical screw parts, or the coupling starting point between the cylindrical screw threads of the male and female cylindrical screw parts (D2). As a result, the coupling depth D2 at the time of the temporary coupling may be increased (D2>D1).

After coupling, the cylindrical-conical integrated female screw part 21 and the cylindrical-conical integrated male screw part 31 are composed of a combination including the coupling by the cylindrical screw threads P1 and P2, so it is considered that it is possible to have straightness by the cylindrical screw threads P1 and P2, and more reduce the straightness distortion than the combination by only the conical screw threads T1 and T2.

Referring to FIG. 15, as the embodiment in which the joint device is formed in a length-determined standardized reinforcing bar 181, an embodiment in a case 183 where a cylindrical-conical integrated male screw part 180 is formed only in one end portion, a case 184 where a cylindrical-conical integrated female screw part 182 is formed only in one end portion, a case 182 where the cylindrical-conical integrated male screw part is formed in both end portions, a case 187 where the cylindrical-conical integrated female screw part is formed in both end portions, and a case 186 where the cylindrical-conical integrated male screw part is formed in one end portion and the cylindrical-conical integrated female screw part is formed in the other end portion is possible.

Referring to FIG. 22, a screw protection cap 200 is coupled to the male screw part or the female screw part, and an information providing unit 202 providing unique information related to the length-determined standardized reinforcing bar 201 to the screw protection cap 200 may be formed.

Since it is difficult to manage materials in the field and it is difficult for workers to identify how many mm the total length of each standardized reinforcing bar is with the naked eye, the reinforcing bar can be identified by displaying unique information directly on the screw protection cap 200 that is detachable from the reinforcing bar.

Examples of the information providing unit 202 include a character display, barcode method, an RFID method, a QR code 202 method, an NFC method, and the like.

For example, it is possible to interwork with an application 204 that recognizes the QR code 202 with a terminal device and provides a reinforcing bar information display unit 203.

As a method of providing unique information related to other determined standardized lengths, various embodiments are possible, such as forming an information providing unit by adding an intaglio or embossed shape to the reinforcing bar directly in the reinforcing bar production step.

The length-determined standardized reinforcing bar may be integrated with the joint device using the jointing socket type reinforcing bar connector by the jointing end member disclosed under Korean Patent No. 10-1378723.

Since the above invention has already been disclosed, a detailed description of the configuration and effects of the invention will be omitted, and the embodiment in which the jointing socket type reinforcing bar connector by the jointing end member to the length-determined standardized reinforcing bar is formed as the joint device will be described.

That is, referring to FIG. 11, the joint device may be any one selected from a selection group of a case 151 where a first jointing end member 150 is formed only in one end portion of a length-determined standardized reinforcing bar 157, a case 153 where a second jointing end member 152 is formed only in one end portion, a case 154 where a first jointing end member is formed in both end portions, a case 156 where a second jointing end member is formed in both end portions, and a case 155 where the first jointing end member is formed in one end portion and the second jointing end member is formed in the other end portion.

Referring to FIG. 10, as disclosed in the above patent, the first jointing end member 140 is a member that is jointed to the end portion of the length-determined standardized reinforcing bar 141a and has a male screw part 142 for fastening socket coupling formed in the longitudinal direction on the outer surface.

The second jointing end member 143 is a member in which one end portion has a shape 144 corresponding to a shape of the end portion of the first jointing end member, and the other end portion is jointed to an end portion 141b of the length-determined standardized reinforcing bar and provided with one or a plurality of steps 145 spaced apart from the one end portion and forming an angle selected from an acute angle, a right angle, and an obtuse angle with respect to the longitudinal direction of the one end portion in an axial direction.

In addition, a fastening socket 146 may be temporarily coupled to the second jointing end member side. Until fastening, the coupling socket 146 is in a state in which free floating is possible.

The fastening socket 146 is a hollow-shaped member that is open in the longitudinal direction and extending in the longitudinal direction to accommodate an outer surface of the second jointing end member 143 and an outer surface of the first jointing end member 140, and includes the female screw part 147 for coupling a fastening socket, which is screwed to the male screw part 142 for coupling a fastening socket of the first jointing end member 140, formed in the longitudinal direction on an inner surface, and one or a plurality of engaging steps 148 engaging with a step 145 of the second jointing end member and forming an angle selected from an acute angle, a right angle, and an obtuse angle with respect to the longitudinal direction.

The configuration of the first jointing end member 140 and the configuration of the second jointing end member 143 may be exchanged and the position of the fastening socket 146 may also be temporarily coupled to the side of the first jointing end member 140.

In addition, the length-determined standardized reinforcing bar may be integrated with a joint device using a reinforcing bar connector by a threaded sleeve of Patent No. 10-1014543.

That is, referring to FIG. 8, the reinforcing bar connector by the threaded sleeve is a reinforcing bar connector using a male screw part 121 formed on the end portion 120 of the reinforcing bar. First, the components of the threaded sleeve are coupled in a state where the male screw part 121 is directly formed on the end portion of the length-determined standardized reinforcing bar 120.

One sleeve 122 or the other sleeve 123 is coupled to the male screw part 121 of the length-determined standardized reinforcing bar.

That is, referring to FIG. 9, it may be any one selected from the selection group of a case 133 where one sleeve 131 is coupled only to the male screw part of the one end portion on the standardized reinforcing bar 130, a case 134 where the other sleeve 132 is coupled only to one end portion, a case 135 where one sleeve is coupled to both end portions, a case 136 where the other sleeve is coupled to both end portions, and a case 137 where one sleeve is coupled to one end portion and the other sleeve is coupled to the other end portion.

Referring to FIG. 8, the one sleeve 122 is a member in which a female screw part 124 is formed on the inner surface and a male screw part 125 is formed on the outer surface, and the other sleeve 123 is a member in which a female screw part 126 is formed on the inner surface and which is formed a first engaging step 127 having one end portion formed in a parallel plane perpendicular to the central axis line in the axial direction.

A coupling socket 128 may be temporarily coupled to the other sleeve 123 side. Until fastening, the coupling socket 128 is in a state in which free floating is possible.

The coupling socket 128 has a female screw part 129 screwed into the male screw part 125 of the one sleeve 122 on the inner surface, and a member in which an engaging step 129b protrudes in a circle center direction on the inner surface of one end portion so as to perform an engaging action while engaging with the first engaging step 127 of the other sleeve 123.

In addition, although not illustrated, in the joint device as a combined embodiment of the above-listed embodiments, a first jointing end member or a second jointing end member, which is a component of a jointing socket type reinforcing bar connector by a jointing end member, may be coupled to one end portion of the standardized reinforcing bar, and one sleeve or the other sleeve, which is a component of reinforcing bar connector by the threaded sleeve, may be coupled to the other end portion.

That is, embodiments such as first jointing end member-one sleeve, first jointing end member-the other sleeve, second jointing end member-one sleeve, and second jointing end member-the other sleeve are possible. Other combinations of the above-listed joint devices are also possible.

Other modified embodiments related to the above are also included in the scope of the present invention.

The invention claimed is:

1. A method for constructing a reinforcing bar structure by a length-determined standardized reinforcing bar integrated with a butt joint device, the method comprising:
   a) determining a reference length of the reinforcing bar to be butt-jointed;
   b) selecting a length-determined standardized reinforcing bar used as a reference reinforcing bar based on the reference length; and
   c) performing a construction by repeatedly using one or more length-determined standardized reinforcing bars used as the selected reference reinforcing bar,
   wherein the step c) comprises:
   (i) installing a first length-determined standardized reinforcing bar for a first floor, wherein a first butt joint device of the first length-determined standardized reinforcing bar is positioned at least 150 mm from a bottom surface of the first floor;
   (ii) butt jointing a second length-determined standardized reinforcing bar to the first length-determined standardized reinforcing bar, wherein the second length-determined standardized reinforcing bar is for a second floor, and a second butt joint device of the second length-determined standardized reinforcing bar is positioned from at least 150 mm from a bottom surface of the second floor; and
   (iii) repeating the steps (i) to (ii) to reach a n-th floor, and the butt joint device is any one selected from the selection group of:
      a case where a male screw part is formed only in one end portion;
      a case where a female screw part is formed only in one end portion;
      a case where the male screw part is formed in both end portions;
      a case where the female screw part is formed in both end portions; and
      a case where the male screw part is formed in one end portion and the female screw part is formed in the other end portion,
   wherein the male screw part and the female screw part are a cylindrical screw coupling structure, a conical screw coupling structure, or a cylindrical-conical integrated screw coupling structure,
   wherein the reference length in the step a) comprises a reserved section of joint work ranging an area where the butt joint device is positioned on the length-determined standardized reinforcing bar, and
   in the step (iii), when an n-th butt joint device deviates from the range of the reserved section of joint work, the n-th butt joint device is returned into the range of the reserved section of joint work by butt-jointing a joint position adjustment reinforcing bar to a n−1th butt joint device before the n-th butt joint device,
   wherein the joint position adjustment reinforcing bar has a different length from the length-determined standardized reinforcing bar used as the reference reinforcing bar.

2. The method of claim 1, wherein the joint position adjustment reinforcing bar includes a shortened length-determined standardized reinforcing bar shorter than the reference length, and an extended length-determined standardized reinforcing bar longer than the reference length, and
   during the step (iii),
   a case where the shortened length-determined standardized reinforcing bar and the extended length-determined standardized reinforcing bar are alternately jointed one by one,
   a case where the shortened length-determined standardized reinforcing bars are jointed once and the extended length-determined standardized reinforcing bars are jointed twice or more,
   a case where the shortened length-determined standardized reinforcing bar is jointed twice or more and the extended length-determined standardized reinforcing bar is jointed once, or
   a case where the shortened length-determined standardized reinforcing bar is jointed twice or more and the extended length-determined standardized reinforcing bar is also jointed twice or more is selectively performed to reach the final section.

3. The method of claim 1, wherein in the step (iii), the length-determined standardized reinforcing bars used repeatedly have the same length.

4. The method of claim 1, wherein one joint point is generated for the reference length.

5. The method of claim 1, wherein the cylindrical screw coupling structure is formed in a case where a cylindrical female screw part is formed in an end portion of one reinforcing bar and a cylindrical male screw part is formed in an end portion of the other reinforcing bar so that the cylindrical male and female screw parts are screwed together, or formed in a case where the cylindrical male screw part is formed in each of the end portions of the two reinforcing bars to be jointed facing the end portions and a separate coupler is formed so that the cylindrical male screw part is screwed to both ends.

* * * * *